US008016060B2

(12) United States Patent
Miki et al.

(10) Patent No.: US 8,016,060 B2
(45) Date of Patent: Sep. 13, 2011

(54) VEHICLE

(75) Inventors: Nobuaki Miki, Tokyo (JP); Munehisa Horiguchi, Tokyo (JP); Takumi Tachibana, Tokyo (JP); Fumihiko Sakakibara, Tokyo (JP); Katsunori Doi, Tokyo (JP); Toshio Fukuda, Nagoya (JP); Takayuki Matsuno, Nagoya (JP)

(73) Assignee: Equos Research Co., Ltd., Tokyo (JP)

( * ) Notice: Subject to any disclaimer, the term of this patent is extended or adjusted under 35 U.S.C. 154(b) by 831 days.

(21) Appl. No.: 11/885,872

(22) PCT Filed: Mar. 9, 2006

(86) PCT No.: PCT/JP2006/304624
§ 371 (c)(1),
(2), (4) Date: Sep. 7, 2007

(87) PCT Pub. No.: WO2006/095823
PCT Pub. Date: Sep. 14, 2006

(65) Prior Publication Data
US 2008/0164083 A1    Jul. 10, 2008

(30) Foreign Application Priority Data

Mar. 11, 2005  (JP) .................. 2005-070116
Mar. 31, 2005  (JP) .................. 2005-103342
Aug. 5, 2005   (JP) .................. 2005-227672
Sep. 2, 2005   (JP) .................. 2005-254879

(51) Int. Cl.
*B60L 3/00*    (2006.01)

(52) U.S. Cl. .................. 180/65.1; 180/282; 180/7.1

(58) Field of Classification Search ............... 180/65.1, 180/282, 701
See application file for complete search history.

(56) References Cited

U.S. PATENT DOCUMENTS

| 6,789,640 B1 | 9/2004 | Arling et al. |
| 7,004,271 B1 * | 2/2006 | Kamen et al. .................. 180/21 |
| 2003/0184071 A1 * | 10/2003 | Tokumaru et al. ............. 280/758 |

FOREIGN PATENT DOCUMENTS

| JP | 61-92906 | 5/1986 |
| JP | 63-305082 | 12/1988 |
| JP | 2003-237665 | 8/2003 |
| JP | 2004-129435 | 4/2004 |
| JP | 2004-276727 | 10/2004 |
| JP | 2005-094898 | 4/2005 |

* cited by examiner

*Primary Examiner* — J. Allen Shriver, II
*Assistant Examiner* — Katy Meyer
(74) *Attorney, Agent, or Firm* — Bacon & Thomas, PLLC

(57) ABSTRACT

A vehicle has a drive wheel, a seat, an attitude sensor, a balancer movable relative to the seat, a drive control, an attitude control for controlling the attitude of the seat by moving the balancer and a main controller. The main controller calculates a torque T1 for tilting the seat and a torque T2 for moving the balancer forward, compares T1 with T2max (the maximum torque which can be generated by the balancer), and outputs commands to the drive control and the attitude control. When the calculated torque T1 exceeds T2max, responsive to a command for T2max, the attitude control moves the balancer to generate a reaction torque corresponding to T2max, and the main controller supplies an adjustment torque value T3 for the drive wheel. The drive control controls the drive wheel in accordance with the drive command and the adjustment torque value T3.

5 Claims, 28 Drawing Sheets

F I G . 2
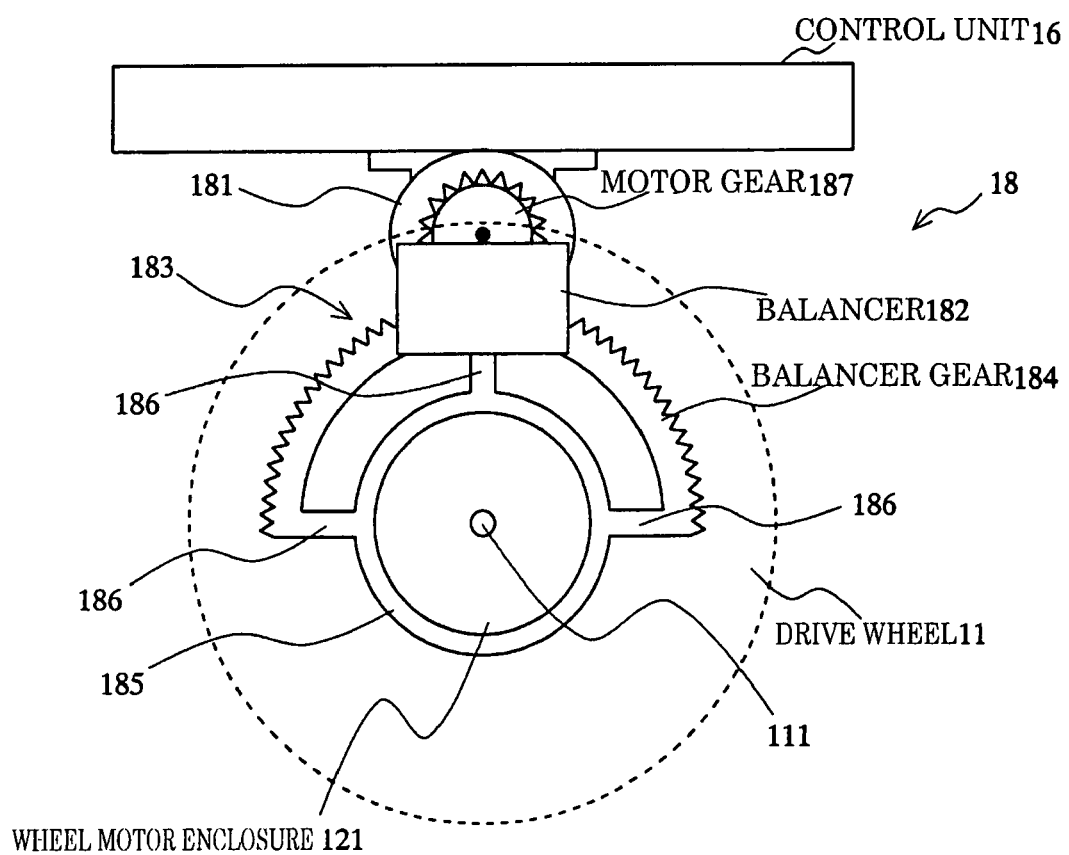

(a) (b)

F I G. 18
(a)
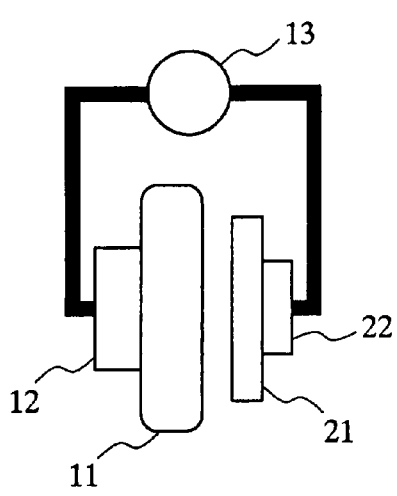
(b)
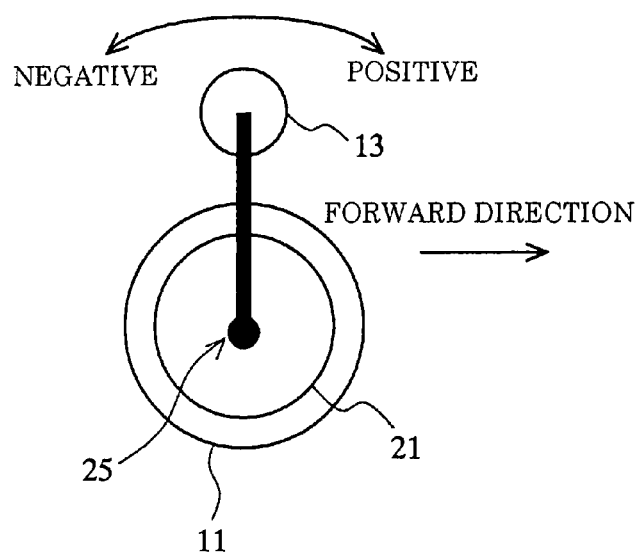

VEHICLE

INCORPORATED BY REFERENCE

The disclosure of Japanese Patent Application No. 2006-304624 filed on Mar. 9, 2006 including the specification, drawings and abstract is incorporated herein by reference in its entirety.

BACKGROUND OF THE INVENTION

1. Field of the Invention

The invention relates to a vehicle, and more particularly, to an attitude control of a vehicle using an attitude control of an inverted pendulum.

2. Description of the Related Art

A vehicle which allows a driver to be seated on drive wheels aligned on a shaft and travels while maintaining the balance like a unicycle with the attitude control of the inverted pendulum (hereinafter referred to simply as an inverted pendulum vehicle) has been focused and put to the practical use.

Japanese Patent Application Publication No. JP-A-2004-276727 proposes the technology for detecting the attitude of the drive wheel resulting from the movement of the gravity center of the driver so as to drive the vehicle having two coaxially arranged drive wheels.

Japanese Patent Application Publication No. JP-A-2004-129435 proposes the vehicle which travels while controlling the attitude of a single drive wheel with circular shape or the spherical shape.

The vehicle using the attitude control of the inverted pendulum is structured to generate the driving force in accordance with the amount of movement of the gravity center of the driver or the operation amount of the remote controller so as to travel while executing the attitude control.

The above-described patent document discloses the technology which employs the weight and the counter weight (hereinafter simply referred to as the balancer) for maintaining the balance by moving the gravity center of the vehicle, which may be moved to displace the gravity center.

As Japanese Patent Application Publication No. JP-A-2005-094898 discloses, the inverted pendulum vehicle maintains the balance using principle of the wheeled inverted pendulum.

In the inverted pendulum vehicle, as the gravity center is above the axle, it is important to maintain the balance. The balance may be maintained by moving the vehicle in the direction where the gravity center moves (the direction where the vehicle tilts). However, it is effective to add the balancer for maintaining the balance.

Japanese Patent Application Publication No. JP-A-2004-129435 proposes the inverted pendulum vehicle equipped with the balancer which assists the balance maintenance.

The above proposed technology is of the balance type having the drive wheel formed as a spherical shape, the principles of which are shown in FIG. 22.

Assuming that a vehicle 100 includes a drive wheel 11, a seat unit 13 and a balancer 101 having an axle in the direction vertical to the traveling direction as shown in the drawing, when the seat unit 13 tilts, the balancer 101 is moved in the direction opposite the tilt so as to maintain the balance.

If the attitude control is executed using the aforementioned balancer 101, such technology as the attitude control using the reaction force (reaction torque) caused by accelerating the balancer 101 may be considered (not as the known technology).

Referring to FIG. 28, the control uses the torque (reaction torque) for turning the seat unit 13 in the direction opposite the direction of the balancer 101 which rotates (tilts) around the axle.

In the aforementioned process, when the external force acts on the seat unit 13 to be tilted forward, the balancer 101 is turned in the direction where the seat unit is tilted such that the attitude is controlled by allowing the torque in the direction opposite the rotating direction of the balancer, that is, the torque in the direction opposite the tilting direction of the external force to act on the seat unit.

Assuming that the seat unit 13 is tilted forward at the angle in excess of the target value, it may be restored by rotating the balancer 101 in the direction opposite the one for restoring the seat unit 13, that is, in the direction to tilt forward such that the seat unit 13 moves toward the restoring direction by the reaction torque generated upon acceleration of the balancer 101.

Referring to FIG. 28, assuming that the balancer 101 is accelerated in the direction of an arrow B, the resultant reaction torque moves the seat unit 13 in the direction of an arrow A.

According to Japanese Patent Application Publication Nos. JP-A-2004-276727 and JP-A-2004-129435, the balancer is moved in the direction opposite the direction where the gravity center of the vehicle moves.

When the balancer is moved, the reaction force in the direction opposite the movement direction acts on the vehicle. As a result, the gravity center of the vehicle (except the gravity center of the balancer) is moved in the direction opposite the one of the balancer.

In the case where the gravity center of the vehicle except the gravity center of the balancer is moved forward, and the balancer is moved backward, the vehicle gravity center is further moved forward by the reaction force, thus failing to take a balance.

The vehicle gravity center and the balancer gravity center as disclosed in the aforementioned patent documents are intended to represent the balance state in which the overall gravity center derived from combining both gravity centers locates on the plumb line of the axle, in other words, the gravity center in the stationary stable state. The aforementioned stationary stable state cannot be realized even if the balancer is moved in the direction opposite the one of the movement of the vehicle gravity center.

In the case where the attitude control is executed by moving the balancer within the limited stroke as the balancer 101 in FIG. 22, the mass of the balancer is required to be increased to a certain degree for obtaining the effect of the balancer.

The weight of the balancer system is also increased for maintaining the strength of the system, thus interfering with the improvement in the fuel efficiency.

When the balancer which is asymmetrical to the axle is rotated around the axle, the vehicle gravity center moves, thus causing the attitude control complicated.

As the balancer is operated above the axle, the space for operating the balancer is required.

As the seating position is required to be above the balancer, the vehicle height is increased, thus enlarging the entire vehicle size.

For the purpose of maintaining the balancer against the gravitational force, the resultant energy consumption is increased.

In the vehicle shown in FIG. 28, the attitude control of the seat unit 13 may be executed with the reaction torque generated by accelerating the balancer 101. However, as the balancer 101 and the seat unit 13 move, the gravity center of the entire vehicle moves.

As the amount for moving the balancer 101 is determined in accordance with the amount required to move the seat unit 13, the overall gravity center of the vehicle cannot be directly controlled.

When the overall gravity center of the vehicle moves as the balancer 101 is driven, the attitude control of the vehicle becomes complicated.

SUMMARY OF THE INVENTION

It is an object of the invention to provide a vehicle using the attitude control of the inverted pendulum, which is capable of dynamically controlling the attitude of the vehicle by moving the balancer.

It is another object of the invention to provide a vehicle using the attitude control of the inverted pendulum, which is capable of starting the vehicle by moving the balancer.

It is another object of the invention to allow the attitude control to be easily executed, to improve the performance of the attitude control, and to reduce the vehicle size.

It is another object of the invention to drive the balancer for maintaining the vehicle gravity center at a predetermined position.

(1) The object may be established by a vehicle which includes a drive wheel arranged on a shaft, a seat unit an attitude sensor for detecting a physical value based on a tilt of the seat unit;

a balancer movably arranged with respect to the seat unit, a drive control unit for controlling to drive the drive wheel in accordance with a drive command from an occupant, and an attitude control unit for executing an attitude control of the seat unit by moving the balancer in a direction where the seat unit tilts based on the detected physical value of the seat unit, and returning the seat unit to a previous attitude with a resultant reaction torque.

(2) The object may be established by a vehicle which includes a drive wheel arranged on a shaft, a seat unit, an attitude sensor for detecting a physical value based on a tilt of the seat unit, a balancer movably arranged with respect to the seat unit, a drive control unit for controlling to drive the drive wheel in accordance with a drive command from an occupant, and an attitude control unit for executing an attitude control of the seat unit by moving the balancer in a direction where the seat unit tilts based on the detected physical value of the seat unit. When the detected physical value exceeds a predetermined value, the attitude control unit moves the balancer to generate a reaction torque corresponding to the predetermined value, and supplies an adjustment torque value of the drive wheel required for the attitude control to the drive control unit. The drive control unit controls the drive wheel to be driven in accordance with the drive command and the adjustment torque value.

(3) In the invention, the attitude control unit executes the attitude control by moving the balancer and supplying the adjustment torque value when the vehicle speed is equal to or smaller than a predetermined value, and by supplying the adjustment torque value when the vehicle speed is larger than the predetermined value.

(4) The objects may be established by a vehicle which includes a drive wheel arranged on a shaft, a seat unit, an attitude sensor for detecting a physical value based on a tilt of the seat unit, a balancer movably arranged with respect to the seat unit, a drive control unit for controlling to drive the drive wheel in accordance with a drive command from an occupant, and an attitude control unit for executing an attitude control of the seat unit based on the detected physical value of the seat unit. When the vehicle starts, the attitude control unit moves the balancer in a direction opposite a traveling direction, and moves a gravity center of the entire vehicle in the traveling direction with a resultant reaction torque.

(5) In the invention, the attitude control unit moves the balancer in a direction opposite the traveling direction upon acceleration of the vehicle, and moves the balancer in the traveling direction upon deceleration of the vehicle.

(6) The object may be established by a vehicle which includes a drive wheel drive unit for driving a drive wheel arranged on an axle, an operation unit disposed above the drive wheel for operating the drive wheel, a plurality of balancers movably arranged with respect to the operation unit, and an attitude control unit for moving the plurality of balancers individually to maintain a gravity center of the vehicle at a predetermined position, and controlling an attitude of the operation unit at a predetermined position with a resultant reaction force.

(7) In the invention, the plurality of balancers are movably arranged around the axle, and the attitude control unit moves the plurality of balancers while being rotated around the axle individually.

(8) In the invention, the attitude control unit moves the balancer at one of an angular acceleration and an angular speed for generating a torque larger than a torque corresponding to the detected physical value.

(9) In the invention, a balancer motor for moving the balancer is provided, and the attitude control unit allows the balancer motor to move the balancer to a direction where the seat unit tilts.

(10) In the invention, the attitude control unit allows the balancer motor and the balancer to be moved to a direction where the seat unit tilts.

(11) In the invention, the balancer is a power source for supplying power to the balancer motor.

(12) The object may be established by a vehicle which includes a drive wheel drive unit for driving a drive wheel arranged on an axle, an operation unit disposed above the drive wheel for operating the drive wheel, a rotary body which rotates around a rotary shaft coaxial with the axle, and an attitude control unit for controlling an attitude of the operation unit at a predetermined position by accelerating a rotation of the rotary body with a resultant reaction force.

(13) In the invention, the attitude control unit accelerates the rotary body in a same direction as a direction where the operation unit tilts around the axle from the predetermined position.

(14) In the invention, when the operation unit is at the predetermined position, the attitude control unit rotates the rotary body freely.

In the invention, the physical value such as the angular acceleration based on the tilt of the seat unit is detected. The attitude control is executed by moving the balancer in the tilting direction of the seat unit in accordance with the detected physical value such that the attitude of the vehicle having the drive wheels arranged on the single shaft is dynamically controlled.

In the invention, when the physical value exceeds the predetermined value, the balancer is moved to generate the reaction torque corresponding to the predetermined value, and the adjustment torque for the drive wheel required for the attitude control is supplied to the drive control unit such that the attitude control is executed with the balancer and the drive wheels. This makes it possible to dynamically control the attitude of the vehicle against the larger external force.

In the invention, upon start of the vehicle, the attitude control unit is structured to move the balancer in the direction opposite the traveling direction such that the gravity center of the entire vehicle is moved in the traveling direction by the reaction torque. This makes it possible to start the vehicle by moving the balancer.

In the invention, the attitude control is executed by independently driving a plurality of balancers. This makes it possible to maintain the vehicle gravity center at the predetermined position.

In the invention, the attitude control is executed by accelerating rotation of the rotary body which rotates around the rotary shaft in parallel with the axle to simplify the attitude control, improve the performance, and reduce the vehicle size.

BRIEF DESCRIPTION OF THE DRAWINGS

FIG. 2 is a view showing a structure of a balancer drive unit.

FIGS. 18A and 18B show the principle of the attitude control using the balancer according to the fifth embodiment.

DETAILED DESCRIPTION OF THE PREFERRED EMBODIMENTS

Figure 1:
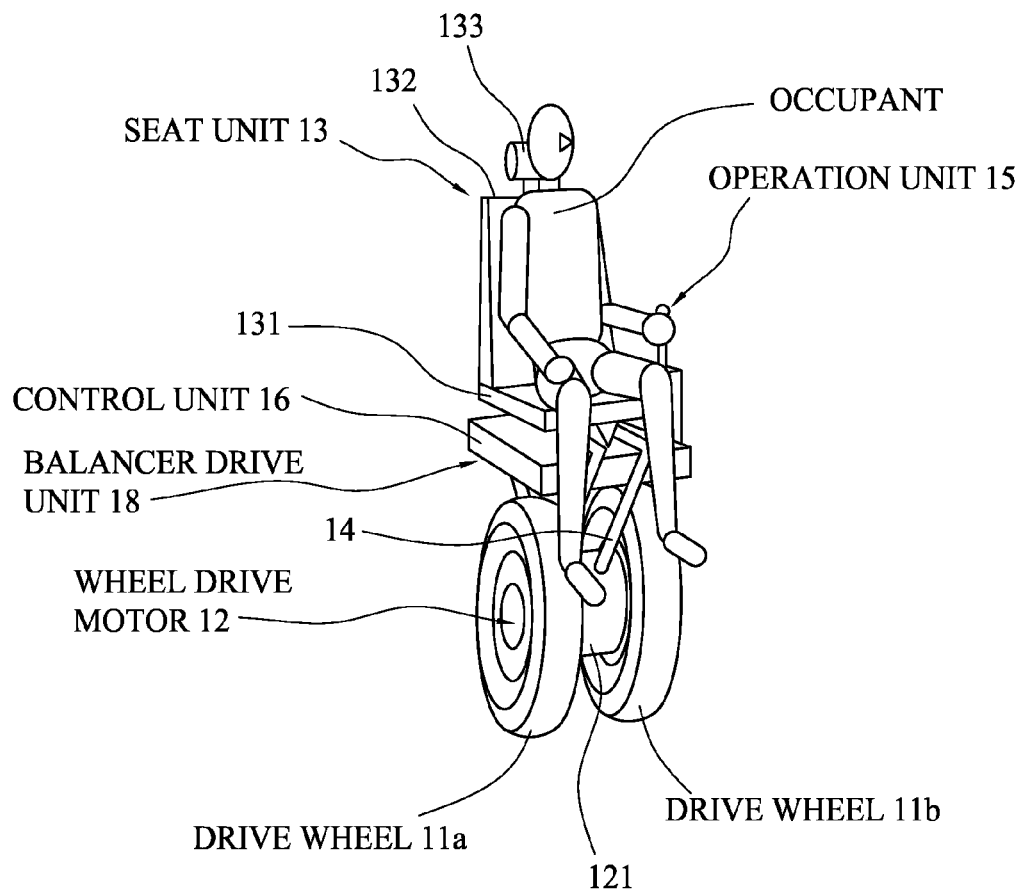
FIG. 1 is a view schematically showing an inverted pendulum vehicle as one embodiment of the vehicle according to the invention.

Embodiments of the vehicle according to the invention will be described in detail referring to the drawings.

(1) Outline of First Embodiment

In a first embodiment, a tilt of a seat unit (vehicle body) is detected by a gyro sensor. A torque T1 corresponding to the tilt of the seat unit is calculated based on the tilting angular acceleration. A torque T2 for negating the torque T1 to restore the seat unit in the direction opposite the tilting direction is generated by moving the balancer.

The balancer is driven with the torque T2 (>T1) in the seat unit tilting direction to allow the reaction torque −T2 corresponding to the torque T2 to act on the seat unit.

The reaction torque −T2 serves to return the seat unit in the direction opposite the originally tilted direction.

As the seat unit is returned in the opposite direction, the angular acceleration when the seat unit is tilted at the side opposite the plumb line is detected by the gyro sensor. The torque T2 corresponding to the detected angular acceleration is used to move the balancer again in the opposite direction (in the seat unit moving direction, that is, the direction opposite the originally balancer moving direction).

In the first embodiment, the balancer is moved in the seat unit tilting direction such that the seat unit is moved in the opposite direction with the reaction torque. As the aforementioned operation is repeatedly performed, the tilt angle of the seat unit is gradually reduced. The operation is repeatedly performed until the overall gravity center of the seat unit and the balancer returns on the plumb line.

(2) Detailed Description of First Embodiment

FIG. 1 is a view schematically showing an inverted pendulum vehicle according to the embodiment.

Referring to FIG. 1, the inverted pendulum vehicle includes two coaxially arranged drive wheels 11a and 11b.

Both the drive wheels 11a and 11b are driven by a drive motor (wheel motor) 12, respectively.

A seat unit 13 on which a driver is seated is provided above the drive wheels 11a and 11b (both the drive wheels 11a and 11b will be simply referred to as a drive wheel 11 hereinafter), and the drive motor 12.

The seat unit 13 is formed of a seating surface 131 on which the driver is seated, a backrest 132 and a headrest 133.

The seat unit 13 is supported at a support member 14 fixed to a wheel motor enclosure 121 which contains the drive motor 12.

An operation unit 15 is disposed at the left side of the seat unit 13. The operation unit 15 is operated by the driver to command acceleration, deceleration, turn, rotation, stop, braking and the like of the inverted pendulum vehicle.

In the first embodiment, the operation unit 15 is fixed to the seating surface 131. However, a remote controller through wired or wireless connection may be employed as the operation unit. Alternatively, an armrest may be provided to allow the operation unit to be disposed thereon.

In the embodiment, the acceleration, deceleration and the like may be controlled based on the operation signal output through the operation of the operation unit 15. As described in Japanese Patent Application Publication No. JP-A-2004-276727, the control operation may be selectable to the attitude control and the travel control of the vehicle in response to the tilt angle to change the front tilt moment by the driver with respect to the vehicle and the longitudinal tilt angle.

In the case where the attitude control and the travel control are executed based on the tilt moment executed by the driver, the attitude control according to the embodiment is not executed.

In the case where different sensors for detecting the tilt moment through the movement of the driver and for detecting the tilt moment through the external force are employed for executing the attitude control based on the tilt moment, the attitude control according to the embodiment may be executed for the purpose of negating the tilt moment through the external force.

A control unit 16 is interposed between the seat unit 13 and the drive wheel 11.

In the embodiment, the control unit 16 is installed in the lower surface of the seating surface 131 of the seat unit 13. However, it may be installed on the support member 14.

A balancer drive unit 18 according to the embodiment is disposed at the lower portion of the control unit 16.

The balancer drive unit 18 is disposed at the position between the drive wheels 11 on substantially center thereof.

FIG. 2 is a view showing the structure of the balancer drive unit 18.

Referring to FIG. 2, the balancer drive unit 18 is formed of a balancer motor 181 installed on the lower portion of the control unit 16, a balancer 182 and a balancer drive mechanism 183.

The balancer drive mechanism 183 includes a balancer gear 184, a bearing 185, a gear support portion 186 and a motor gear 187, which are in mesh with one another.

The balancer gear 184 formed into a semi-circular shape has the longitudinal center to which a balancer 182 is fixed.

Various types of the bearing, for example, a hydrostatic bearing may be employed as the bearing 185. The embodiment employs a roller bearing.

The bearing 185 has an inner ring fixed to an outer surface of the wheel motor enclosure 121, and an outer ring to which the balancer gear 184 is fixed via three gear support portions 186. The semi-circular balancer gear 184 is allowed to rotate coaxially with the drive wheel 11 (rotary shaft 111).

In the embodiment, the balancer gear 184 has the semi-circular shape so as to be used as a partial load to the balancer 182.

In the embodiment, the balancer 182 is fixed to the longitudinal center of the balancer gear 184 so as to be movable in the range of about 180°.

The motor gear 187 is attached to the rotary shaft of the balancer motor 181.

The motor gear 187 is in mesh with the balancer gear 184, and is rotated under the driving force of the balancer motor 181 such that the balancer gear 184 is rotated. The balancer 182 moves on the plane in parallel with the drive wheel 11 with respect to the rotary shaft 111.

The balancer motor 181 is fixed to the control unit 16, which is indirectly fixed to the seat unit 13 (the seating surface 131 in the embodiment).

The balancer motor 181 allows the balancer 182 to be rotated (moved) with the predetermined torque T. The resultant reaction force from the balancer motor 181 acts on the seat unit 13.

Figure 3:
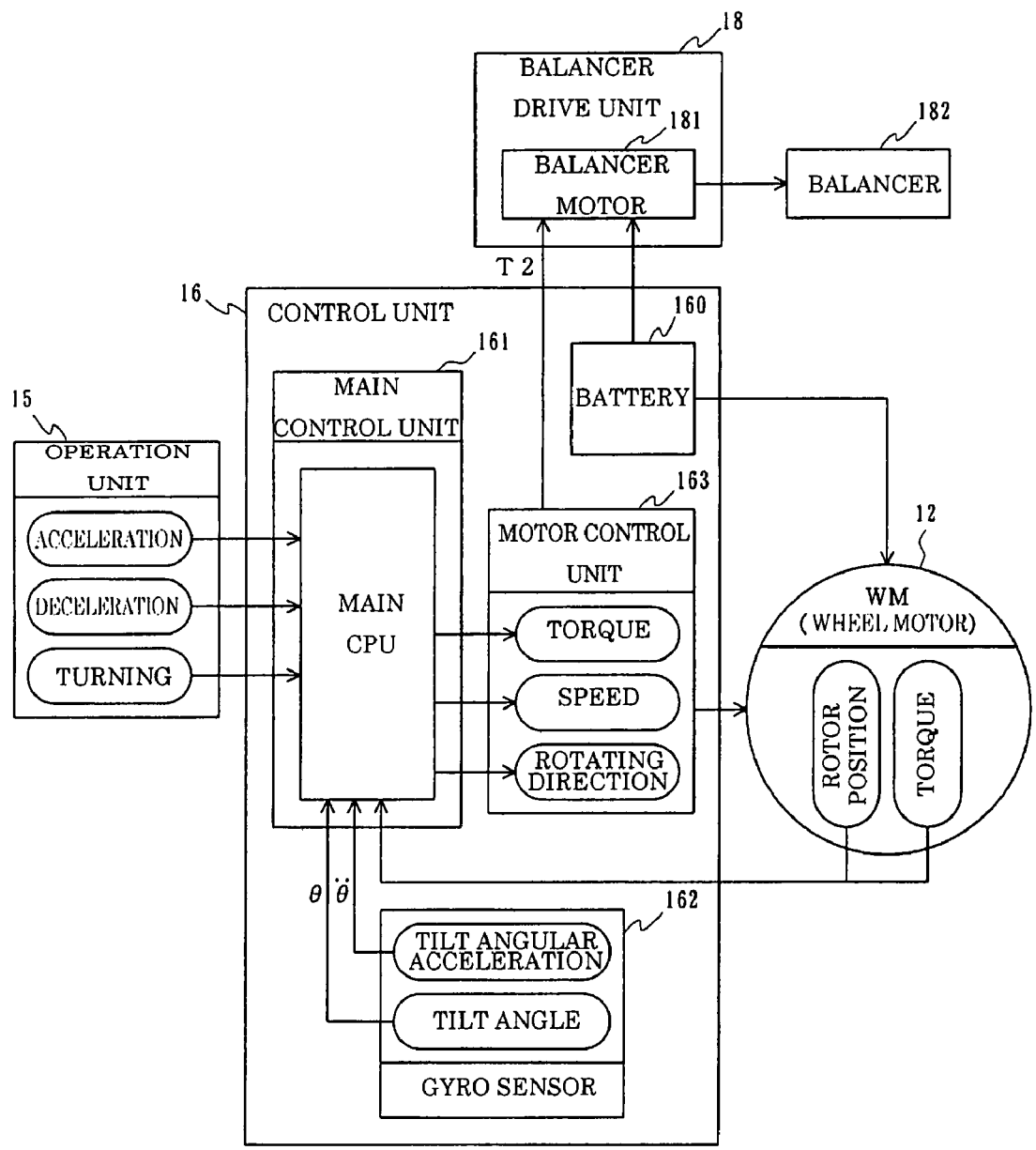
FIG. 3 is view showing a structure of a control unit of the inverted pendulum vehicle.

FIG. 3 is a view showing the structure of the control unit 16 of the inverted pendulum vehicle.

The control unit 16 includes a battery 160, a main control unit 161, a gyro sensor 162, and a motor control unit 163.

The battery 160 supplies power to the drive motor 12 and the balancer motor 181, as well as the low voltage power source to the main control unit 161 for the control purpose.

The main control unit 161 is formed of a computer system including a main CPU as well as ROM which stores various programs and data, RAM used as the working area, an external memory unit, and an interface section, which are not shown.

The ROM (or the external memory unit) stores various programs, for example, the attitude control program for maintaining the attitude of the inverted pendulum vehicle, the travel control program for controlling the travel of the vehicle based on various command signals from the operation unit 15. The main control unit 161 performs the process by executing the aforementioned various programs.

The gyro sensor 162 serves as an attitude sensor for detecting the attitude of the seat unit 13.

The gyro sensor 162 detects the angular acceleration and the tilt angle θ of the seat unit 13 as the physical value based on the tilt of the seat unit 13.

In the description, the angular acceleration is expressed as {θ}, and in the drawing, it is expressed by putting two dots above the θ hereinafter.

The tilt angle θ detected by the gyro sensor 162 establishes the relationship of θ>0 in case of the tilt forward of the vehicle, and the relationship of θ<0 in case of the tilt backward of the vehicle.

The main control unit 161 identifies the tilt direction based on the tilt angle detected by the gyro sensor 162.

In the embodiment, the gyro sensor 162 supplies the detected angular acceleration and the tilt angle to the main control unit 161. However, only the angular acceleration may be detected.

In the aforementioned case, the main control unit 161 accumulates the angular acceleration values supplied from the gyro sensor 162, and calculates the angular speed and the angle to obtain the tilt angle.

As the attitude sensor, various sensors for outputting the signal corresponding to the angular acceleration upon the tilt of the seat unit 13, for example, the liquid rotor type angular acceleration meter, the eddy current angular acceleration meter may be employed instead of the gyro sensor 162.

The liquid rotor type angular acceleration meter detects the flow of the liquid instead of the pendulum of the servo type acceleration meter. The angular acceleration is measured based on the feedback current upon balancing of the liquid flow by the servo mechanism. Meanwhile, the angular acceleration meter using the eddy current forms a magnetic circuit with a permanent magnet. The cylindrical aluminum rotor is disposed in the circuit so as to detect the angular acceleration based on the magnetic electromotive force generated in accordance with the change in the rotating speed of the rotor.

The motor control unit 163 controls the drive motor 12 and the balancer motor 181 of the balancer drive unit 18.

The drive motor 12 is controlled in accordance with the command signals supplied from the main control unit 161 with respect to the drive torque, speed, rotating direction and the like.

The balancer motor 181 is driven to be directed to the commanded direction so as to output the torque corresponding to the rotating direction command and the torque command value T2 supplied from the main control unit 161.

The motor control unit 163 includes torque-current maps for the drive motor 12 and the balancer motor 181, respectively.

The motor control unit 163 outputs the current corresponding to the drive torque supplied from the main control unit 161 to the drive motor 12 in reference to the torque-current map such that the current corresponding to the supplied torque command value T2 is output to the balancer motor 181.

When the vehicle is stopped, the drive torque supplied from the main control unit 161 corresponds to the torque command value T3 for the attitude control. When the vehicle is traveling, the drive torque is obtained by adding or subtracting the torque command value T3 for the attitude control to/from the torque command value in accordance with the drive request of the driver.

The main control unit 161 receives information in accordance with the respective components and equipment from the drive motor 12, the operation unit 15 and the gyro sensor 162. Based on the aforementioned information, various kinds of the control, for example, attitude, traveling and braking may be executed.

The information indicating the torque and the rotor position is supplied from the drive motor 12. The acceleration command information, deceleration command information and turning information indicating the turning direction may be supplied from the operation unit 15. The information with respect to the angular acceleration $\{\theta\}$ of the seat unit may be supplied from the gyro sensor 162.

The operation of the attitude control routine in the above-structured inverted pendulum vehicle will be described hereinafter. The attitude control routine is executed when the vehicle is stopped (not traveling), accelerated/decelerated, and traveling at a constant speed, that is, all the states of the vehicle.

Figure 4:
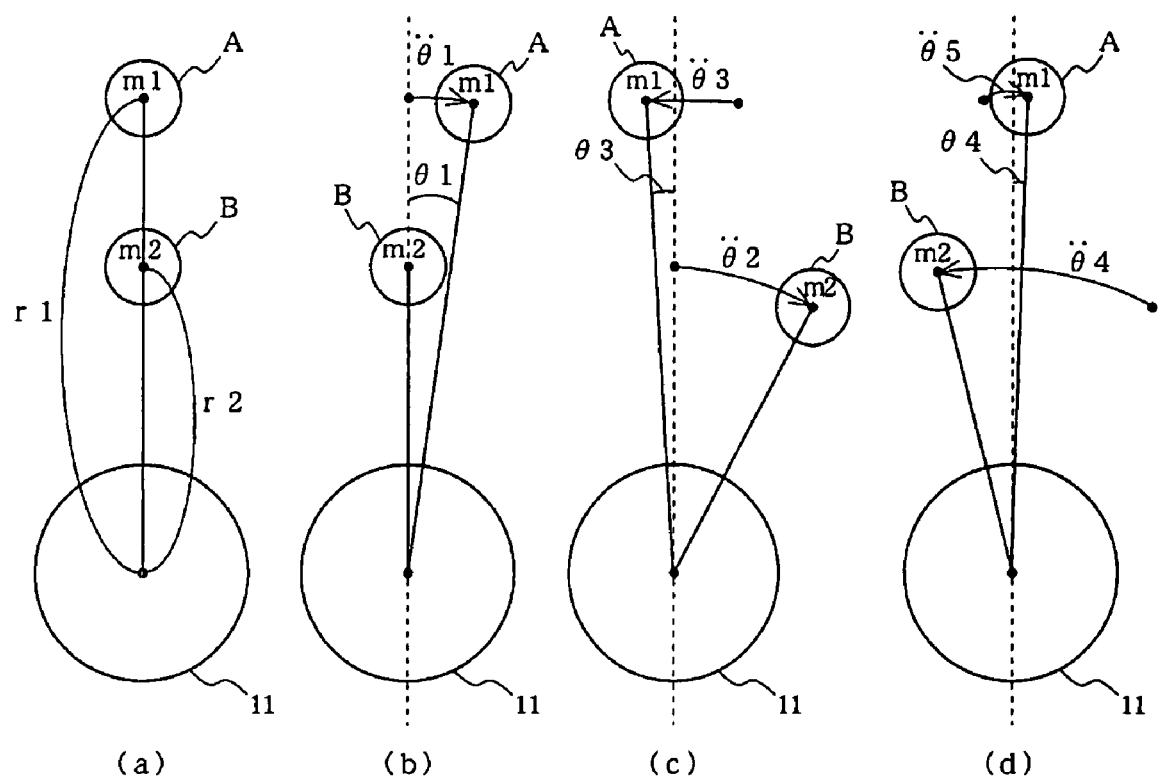
FIGS. 4A to 4D show the principle of the attitude control executed in the inverted pendulum vehicle.

FIG. 4 shows the principle of the attitude control executed in the inverted pendulum vehicle.

Referring to FIG. 4A, it is assumed that the weight of an occupant A is set to m1, the weight of the balancer B is set to m2, the distance from the center of the drive wheel 11 (rotary shaft) to the gravity center of the occupant is set to r1, and the distance from the center of the drive wheel to the gravity center of the balancer is set to r2.

The weight of the balancer B, that is, m2 includes the weight of not only the balancer 182 but also the balancer gear 184 which is used for driving together with the balancer 182.

The weight of the occupant A, that is, m1 is obtained by subtracting the balancer weight m2 from the whole weight M of the rotating portion in the state where the occupant is seated and the drive wheel 11 is fixed.

When the external force is applied to cause the transition of the attitude from FIG. 4A to FIG. 4B where the gravity center of the occupant A (hereinafter referred to as the occupant gravity center) tilts forward at the angular acceleration of $\{\theta 1\}$, the tilt angle $\theta 1$ and the angular acceleration $\{\theta 1\}$ caused by the tilt of the occupant gravity center may be detected by the gyro sensor 162.

When the tilt of the occupant gravity center is detected, the balancer B is moved in the tilting direction of the occupant A at the angular acceleration $\{\theta 2\}$, as shown in FIG. 4C. The tilting direction is determined based on the positive/negative value of the tilt angle $\theta$.

The angular acceleration $\{\theta 2\}$ at which the balancer B is moved establishes the relationship of $\{\theta 2\}>K\{\theta 1\}$. The term K denotes a constant, and the process for deriving the constant will be described later.

When the balancer B is moved at the angular acceleration $\{\theta 2\}$, the reaction force against the torque for moving the balancer B allows the occupant A to move backward (the direction opposite the first tilting direction) as shown in FIG. 4C.

When it is detected that the occupant A moves backward to the angle $\theta 3$ (<0) over the plumb line, that is, the tilt angle $\theta$ is inverted with respect to the plumb line, the balancer B is moved again to the direction of the angle $\theta 3$ (opposite direction).

The angular acceleration $\{\theta 3\}$ upon inversion of the tilt angle of the occupant A is detected by the gyro sensor 162. Then the balancer B is moved backward (moving direction of the occupant A) at the angular acceleration $\{\theta 4\}$ ($\{\theta 4\}>K\{\theta 3\}$) corresponding to the annular acceleration $\{\theta 3\}$.

Referring to FIG. 4D, the occupant A is moved forward again at the angular acceleration $\{\theta 5\}$ under the reaction force against the torque for moving the balancer B backward.

At the angular speed corresponding to the one when the inversion of the tilt angle with respect to the plumb line of the occupant A is detected, the balancer B is moved toward the tilt angle. The operation for returning the occupant A to the plumb line direction under the reaction force resulting from the movement of the balancer B is repeated such that the tilt angle $\theta$ with respect to the plumb line as the center is gradually converged to 0. The attitude may be returned to the normal state as shown in FIG. 4A.

The tilt angle of the occupant A shown in FIG. 4 is made large for the explanation purpose. Actually, it may be negligible to the occupant A as the balancer B is moved immediately upon detection of the tilt angle $\theta 1$ or the angular acceleration $\{\theta 1\}$.

The constant K will be described.

Assuming that the torque required for moving the occupant A forward at the angular acceleration $\{\theta 1\}$ is set to T1, and the torque required for moving the balancer B forward is set to T2, both the torques T1 and T2 are derived from the following formulae (1) and (2).

$$T1 = m1 \times (r1 \times r1) \times \{\theta 1\} \tag{1}$$

$$T2 = m2 \times (r2 \times r2) \times \{\theta 2\} \tag{2}$$

If the torque T2 is larger than the torque T1, the occupant A is returned to the opposite direction (backward) under the reaction force −T2 of the torque T2.

The following relationship is derived from the formulae (1) and (2);

$$\{\theta 2\} > ((m1 \times r1 \times r1)/(m2 \times r2 \times r2))\{\theta 1\}.$$

Finally, the constant K is derived from the following formula:

$$K = (m1 \times r1 \times r1)/(m2 \times r2 \times r2).$$

In the actual control, the balancer motor 181 is driven and controlled to establish the relationship of T2>T1 where T2 denotes the drive torque of the balancer B applied by the balancer motor 181.

The angular acceleration {θ1} is detected by the gyro sensor 162.

The weight of the occupant A, that is, m1 is set by adding the unit weight m1a to the weight of the occupant, that is, m1b. The unit weight m1a is known at every vehicle. The weight of the occupant m1b is preliminarily set to the maximum weight of the occupant to be expected, for example, 90 kg. If the T2 is determined based on the expected maximum weight, the condition of T2>T1 may be established to allow the occupant A to be returned to the opposite direction by moving the balancer B although the actual weight is lighter than the maximum value.

A scale (weight measurement unit) for measuring the occupant weight may be installed in the seating surface 131 of the seat unit 13 on which the driver is seated. The measured value may be used as the weight of the occupant m1b.

Figure 5:
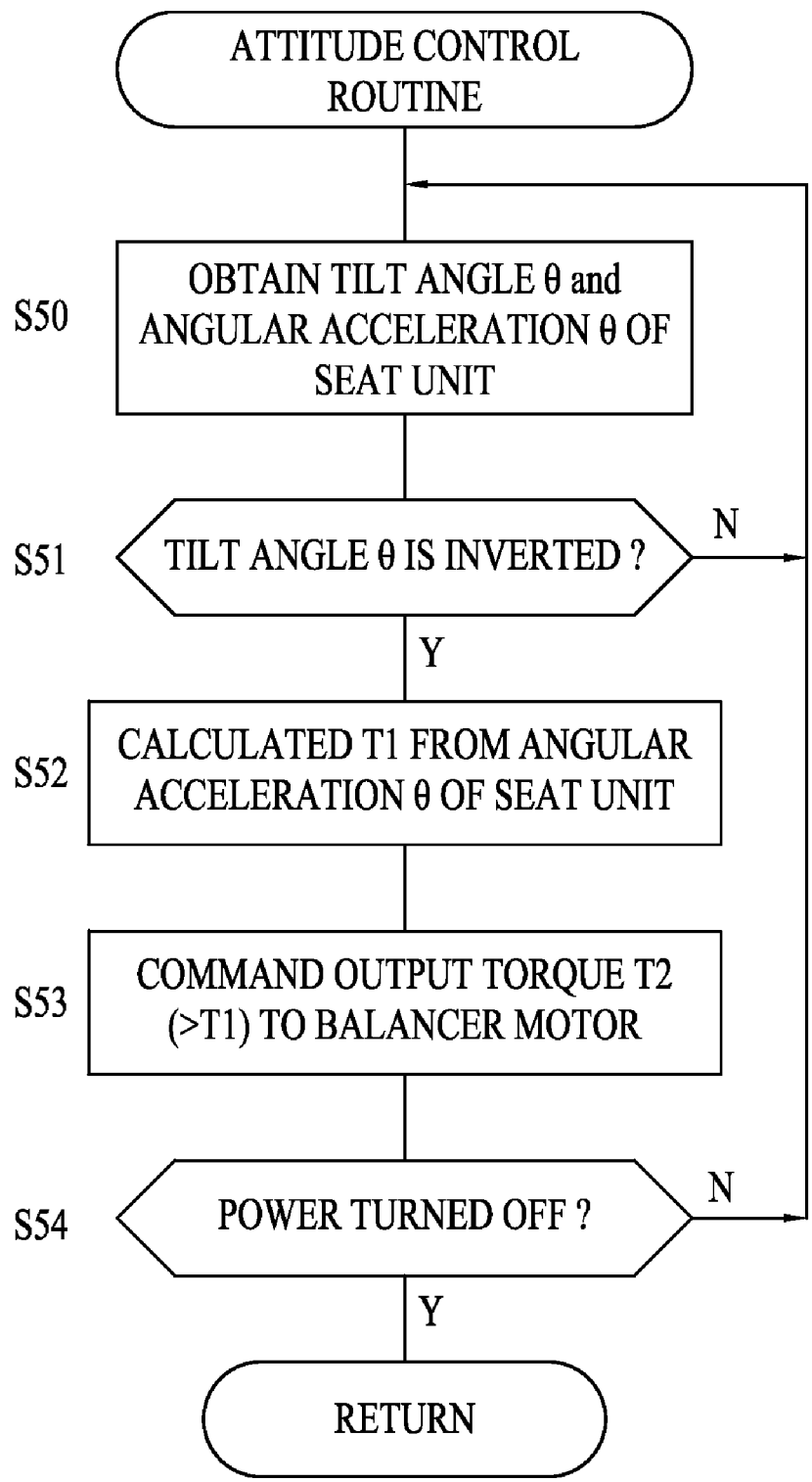
FIG. 5 is a flowchart of the attitude control routine.

FIG. 5 is a flowchart showing an attitude control routine executed in the main control unit 161.

The main control unit 161 obtains the tilt angle θ and the tilt angular acceleration {θ} of the seat unit 13 from the gyro sensor 162 in step S50. It is determined whether or not the tilt angle θ has been inverted in step S51.

The inversion of the tilt angle θ represents the transition between the state where the tilt angle θ>0 and the state where the tilt angle θ<0 as the state transition of the occupant A from FIG. 4B to FIG. 4C, and from FIG. 4C to FIG. 4D, for example.

The inversion of the tilt angle θ also includes the transition of the state from the relationship of the tilt angle θ=0 (stable state) to the relationship of the tilt angle θ>0 or θ<0 as the state transition of the occupant A from FIG. 4A to FIG. 4B.

If no inversion of the tilt angle θ occurs (N in step S51), the main control unit 161 returns the process to step S50 where monitoring of the attitude is continued.

Meanwhile, if the inversion of the tilt angle θ is detected (Y in step S51), the main control unit 161 proceeds to step S52 to calculate the torque T1 for tilting the occupant A at the angular acceleration {θ} in accordance with the aforementioned formula (1) from the angular acceleration {θ} of the seat unit 13 obtained in step S50.

Then in step S53, the output torque T2 is commanded to the balancer motor 181.

The main control unit 161 supplies the torque T2 larger than the calculated torque T1 (T2>T1) to the motor control unit 163 as the torque command value, and the information with respect to the movement direction of the balancer 182 corresponding to the tilt angle θ (θ>0: forward, θ<0: backward).

The motor control unit 163 drives the balancer motor 181 in the direction commanded from the main control unit 161 with the torque T2.

The balancer 182 then is moved in the commanded direction. The reaction torque −T2 which counterbalances the drive torque T2 acts on the seat unit 13 (occupant A) so as to be returned to the opposite direction.

The main control unit 161 determines whether or not the power has been turned OFF in step S54. If the power has been turned OFF (Y), the routine ends. If the power has not been turned OFF (N), the process returns to step S50 where the attitude control is continued.

Figure 6:
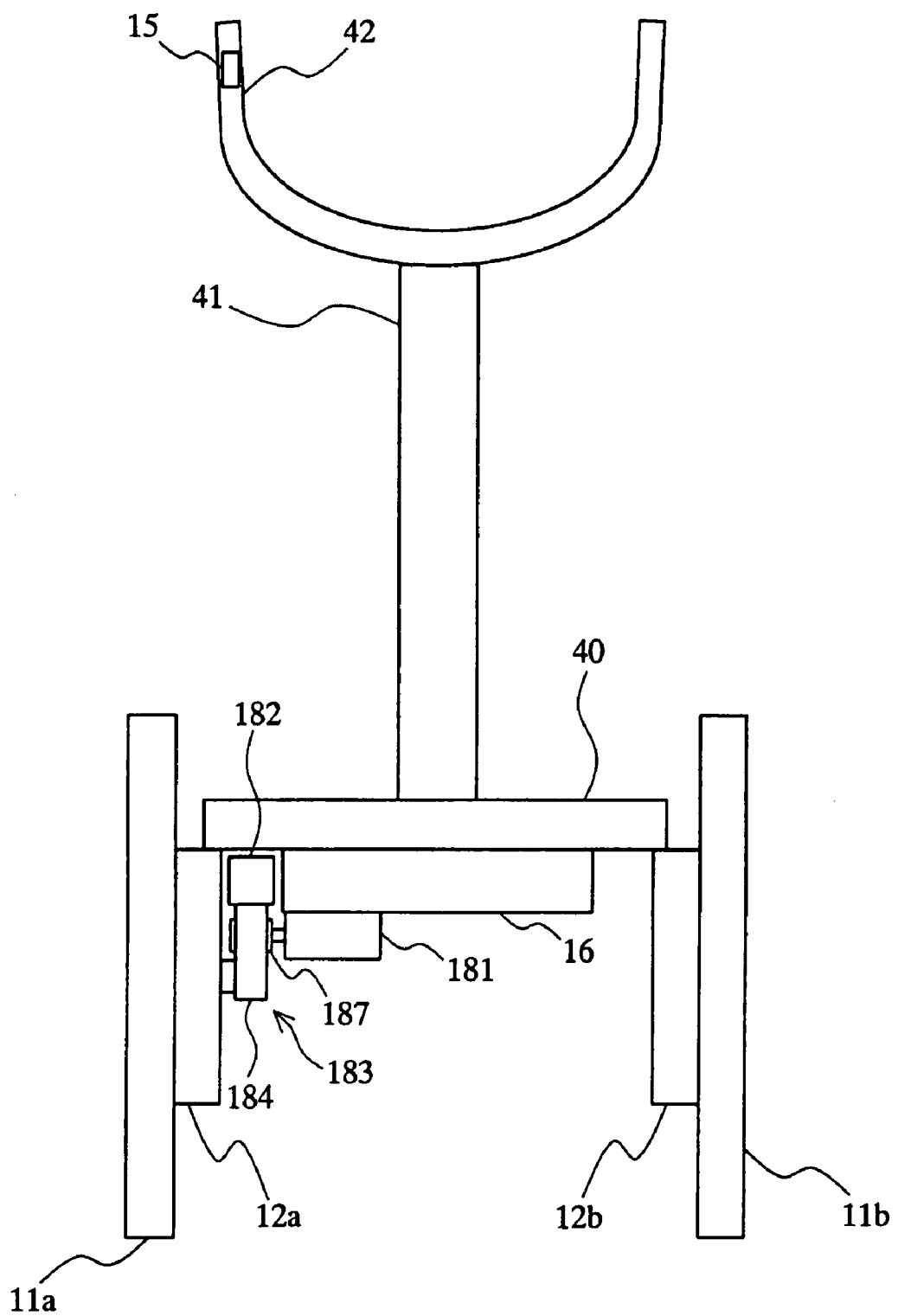
FIG. 6 is a view schematically showing another inverted pendulum vehicle.

FIG. 6 is a view schematically showing the other type of the inverted pendulum vehicle.

The inverted pendulum vehicle of this type includes two coaxially arranged drive wheels 11a and 11b, and wheel motors 12a and 12b for independently driving the respective drive wheels 11a and 11b.

A seat portion 40 is disposed above the enclosure of the wheel drive motors 12 such that the driver is allowed to board while standing. The seat portion 40 may be disposed above or below the drive shaft, which serves to connect the wheel drive motors 12a and 12b.

A support portion 41 is disposed at the front center of the seat portion 40.

A handle 42 is attached to the leading end of the support portion 41. An operation unit 15 is installed in the handle 42.

Likewise the motor-assisted bicycle, the operation unit 15 may be formed of the accelerator and brake. The drive force command may be derived from the rotating angle of the handle, and the stop command may be derived from the braking operation.

A control unit 16 is fixed to the lower surface of the seat portion 40, and has a balancer drive unit 18 attached to the lower portion of the control unit 16.

The basic structure of the balancer drive unit 18 is the same as the one shown in FIG. 2. The explanation with respect only to the different feature of the balancer drive unit will be described hereinafter.

The balancer drive unit 18 has the balancer motor 181 fixed to the control unit 16, and the balancer drive mechanism 183 disposed on the enclosure of the wheel drive motor 12a.

The balancer 182 is disposed at the longitudinal center of the balancer gear 184 of the balancer drive mechanism 183. The balancer gear 184 formed of the internal gear is in mesh with the motor gear 187 attached to the rotary shaft of the balancer motor 181.

In the balancer drive mechanism 183 as the modified example, the balancer gear 184 functions as the internal gear. The gear support portion is supported at the outer ring of the bearing at both ends of the semi-circular balancer gear 184. In the case where the gear support portion is formed in the center as shown in FIG. 2, the motor gear 187 may be located at the position other than in the axial direction.

The inner ring of the bearing is fixed to the enclosure of the wheel drive motor 12a so as to be coaxial with the drive shaft of the wheel drive motor 12a.

In the balancer drive mechanism 183 of the vehicle shown in FIG. 6, the balancer 182 and the balancer gear 184 are disposed above the drive shaft of the wheel drive motor 12a. However, they may be disposed below the drive shaft. In this case, the balancer 182 locates above/below the plumb line of the drive shaft in the case where the occupant A does not tilt (θ=0). The diameter of the motor gear may be increased or the motor mount position may be adjusted such that the balancer is in mesh with the internal gear (or both operations may be performed).

As the balancer 182 and the balancer gear 184 are disposed at the lower side, the distance r2 to the gravity center of the balancer (see FIG. 4) may be increased.

In the vehicle shown in FIG. 6, the balancer drive mechanism 183 is disposed at the side of the wheel drive motor 12a. However, the balancer drive mechanism 183 may be disposed at the center portion between the wheel drive motors 12a and 12b.

The balancer drive mechanism 183 may be disposed not only at the side of the wheel drive motor 12a but also at the side of the other wheel drive motor 12b.

In the aforementioned case, the balancer motor 181 may be commonly used such that the balancers 182a, 182b, and the balancer drive mechanisms 183a, 183b are disposed at the wheel drive motors 12a and 12b, respectively.

The control routine of the other type of the inverted pendulum vehicle which has been described referring to FIG. 6 is the same as the control routine described referring to the flowchart shown in FIG. 5.

In the vehicle according to the embodiment, upon detection of the change in the attitude of the seat unit 13 (tilt of the occupant A), the torque T1 required for tilting the occupant A is derived from the angular acceleration $\{\theta\}$ at which the occupant A tilts. The balancer B is then moved in the tilting direction of the occupant A with the torque T2 larger than the torque T1 to allow the reaction torque −T2 to act on the occupant A for balancing (maintain the attitude in the steady state).

(3) Outline of the Second Embodiment

In the first embodiment, the attitude control of the seat unit is executed by moving the balancer B in the direction where the occupant A tilts.

In the second embodiment, the attitude control is executed using the reaction force generated by driving the drive wheel 11 in addition to the reaction force generated by moving the balancer B.

Under the stability control (attitude control) of the occupant portion (occupant A), the reaction torque generated by moving the balancer and by adjusting the drive torque of the drive wheel 11 may be used for further stabilizing the occupant portion upon stopping/traveling/braking/turning of the vehicle.

The drive torque of the drive wheel 11 may be used for supplementing the torque generated by moving the balancer B.

More specifically, in the case where the movement torque T1 of the occupant A is equal to or smaller than a predetermined torque value, the attitude control is executed by moving the balancer B.

Meanwhile, when the movement torque T1 of the occupant A becomes larger than the predetermined torque value, the balancer B is moved at the angular acceleration for generating the reaction force corresponding to the predetermined torque value so as to adjust the torque of the drive wheel 11 by the insufficient amount of the reaction torque for returning the occupant A toward the plumb line. The attitude of the occupant A, thus, may be controlled.

In the embodiment, the maximum torque value T2max obtained by moving the balancer B may be used as the predetermined torque value.

The vehicle employed in the second embodiment has substantially the same structure as that of the first embodiment and the modified example thereof (including the one shown in FIG. 6) except the attitude control with respect to the drive wheel 11.

In all the embodiments and the respective modified examples, the occupant A expected to board on the vehicle denotes a part derived from excluding the balancer B from the whole rotating portion in the state where rotation of the drive wheel 11 is stopped likewise the first embodiment. The balancer B denotes a part including not only the balancer 182 but also the entire portion having the gravity center displaced together with the balancer 182, for example, the portion including the balancer gear 184.

(4) Detailed Description of Second Embodiment

Figure 7:
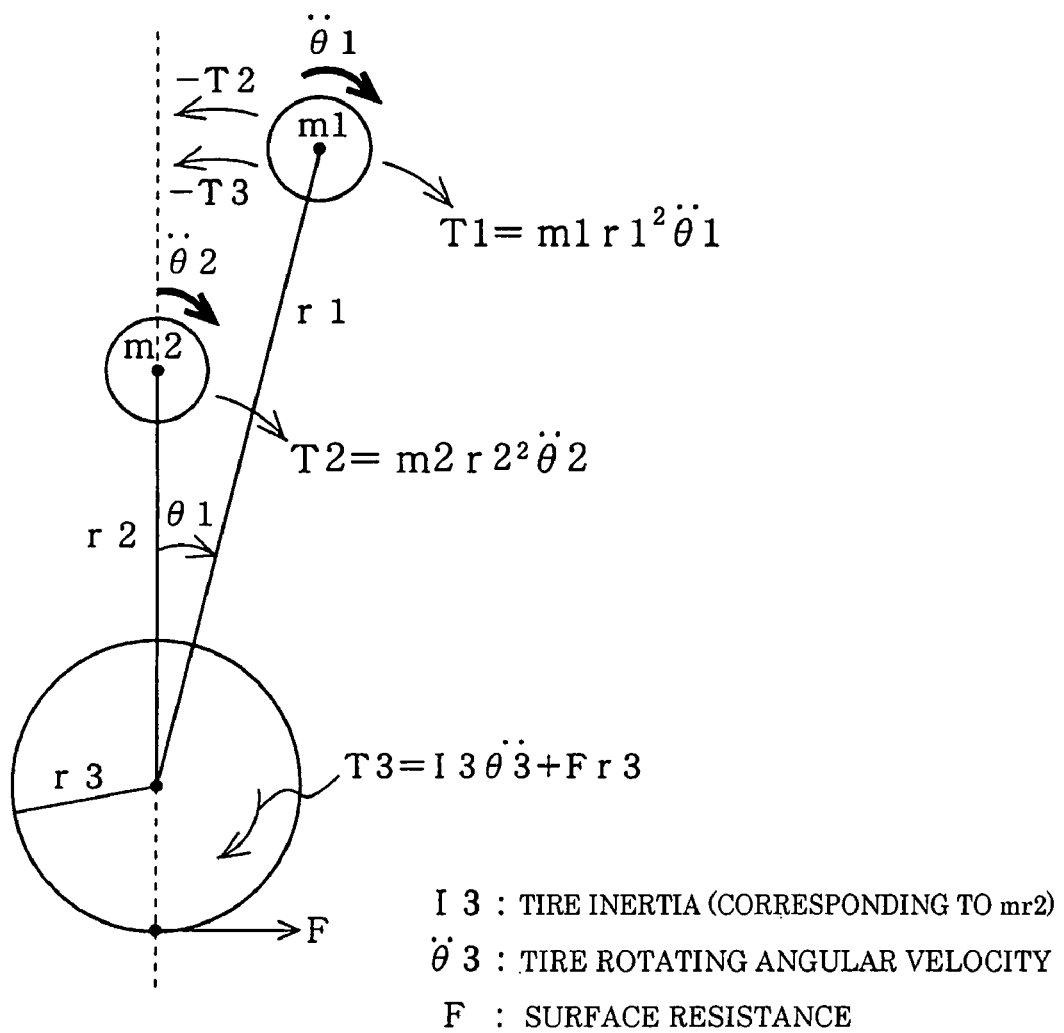
FIG. 7 is an explanatory view showing a torque balance of the inverted pendulum vehicle according to a second embodiment.

FIG. 7 shows the torque balance of the inverted pendulum vehicle according to the second embodiment.

Referring to FIG. 7, in the case where the occupant A on the plumb line as shown by the dotted line moves at the angular acceleration $\{\theta 1\}$ under the external force, the torque T1 of the occupant A by the movement may be expressed in the aforementioned formula (1).

The torque T2 for moving the balancer B at the angular acceleration $\{\theta 2\}$ for returning the attitude of the occupant A in response to the movement of the occupant A to be on the plumb line may be expressed by the aforementioned formula (2).

Meanwhile, the torque T3 required for allowing the drive motor 12 to drive the drive wheel 11 may be expressed by the following formula:

$$T3 = I3 \times \{\theta 3\} + (F \times r3) \tag{3}$$

where r3 denotes the radius of the drive wheel, and $\{\theta 3\}$ denotes the rotating angular acceleration of the drive wheel 11. The term I3 as the inertia (inertia moment) of the tire may be expressed as m3×(r3×r3) where m3 denotes the weight of the drive wheel 11.

The reaction torque −T2 against the torque T2, which is obtained by moving the balancer B in response to the movement of the occupant A under the external force and the reaction torque −T3 against the torque T3 applied to the drive wheel 11 act on the occupant A so as to be returned to the plumb line direction.

The following formula (4) is required to be established for the purpose of returning the occupant A to the vertical direction (the direction opposite the movement direction caused by the external force).

$$(T2 + T3) > T1 \tag{4}$$

Figure 8:
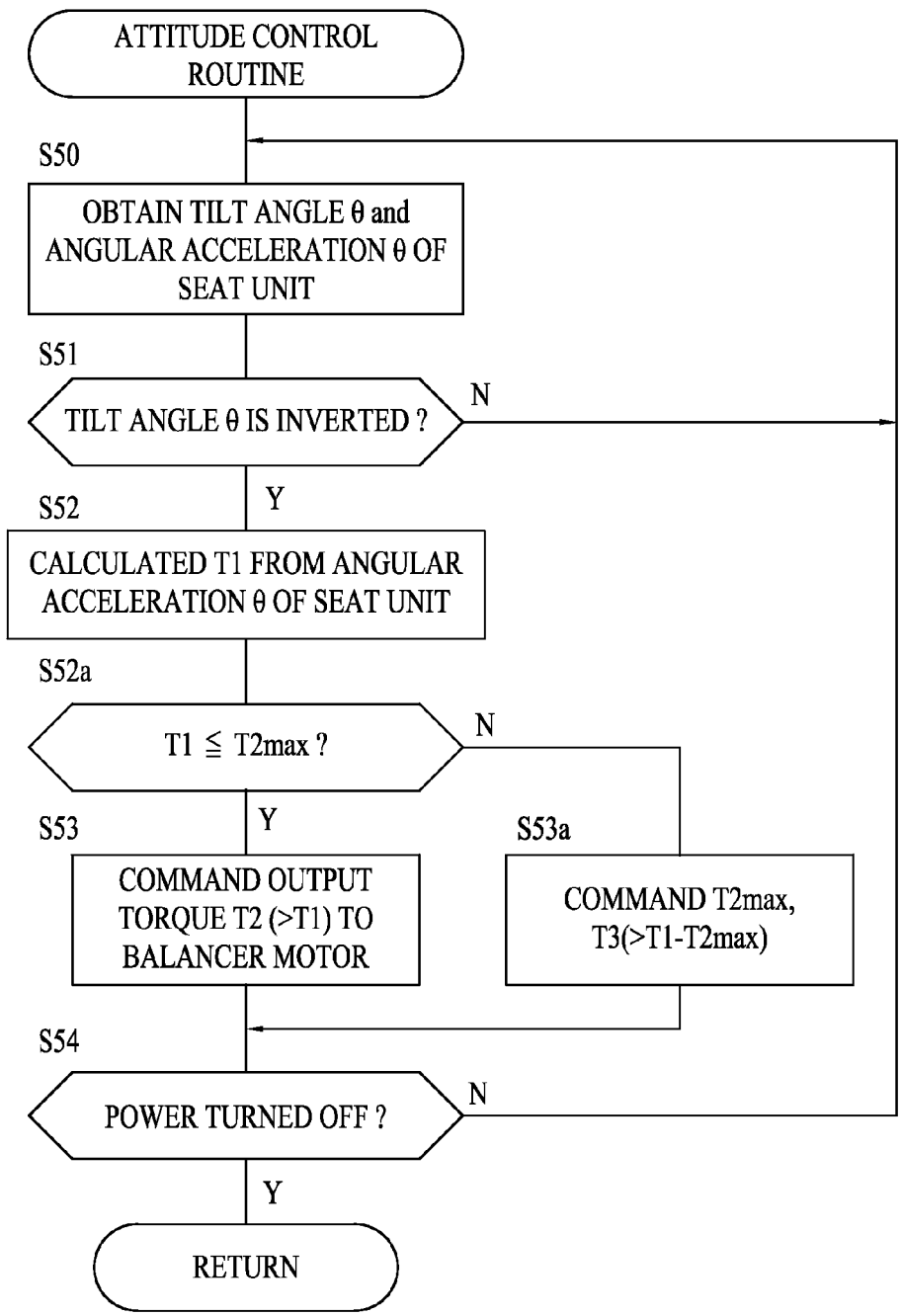
FIG. 8 is a flowchart showing the attitude control routine executed in the main control unit according to the second embodiment.

FIG. 8 is a flowchart of the attitude control routine executed in the main control unit 161 according to the second embodiment.

The same steps shown in FIG. 8 as those of the first embodiment will be designated with the same step numbers, and explanations thereof, thus, will be omitted.

In the attitude control according to the second embodiment, the main control unit 161 calculates the torque T1 for tilting the occupant A at the angular acceleration $\{\theta\}$ from the angular acceleration $\{\theta\}$ of the seat unit 13 in step S52. It is then determined whether or not the calculated torque T1 is equal to or smaller than the maximum value T2max of the torque T2 (reaction torque −T2) which can be generated by moving the balancer B in step S52a.

If T1≦T2max (Y in step S52a), the main control unit 161 proceeds the process to step S53 where the same control as in the first embodiment is executed.

Meanwhile, if T1>T2max (N in step S52a), the main control unit 161 supplies the output torque T2max to the balancer motor 181 and the adjustment torque value T3>T1−T2max to the motor control unit 163 such that the output torque is commanded (step S53a).

Likewise the first embodiment, the motor control unit 163 obtains the required reaction torque −T2max by supplying the current value corresponding to the supplied output torque T2max to the balancer drive unit 18 in reference to the torque-current map for the balancer motor 181.

Meanwhile, the motor control unit 163 obtains the reaction torque −T3 by driving the drive motor 12 (drive wheel 11) at the current value corresponding to the supplied adjustment torque T3 in reference to the torque-current map for the drive motor 12.

When the vehicle is stopped, the main control unit 161 supplies the adjustment torque T3 to the motor control unit 163.

Meanwhile, when the vehicle is traveling, the main control unit 161 supplies the value obtained by adding the adjustment torque T3 to the drive torque TM of the drive motor 12 required for obtaining the output corresponding to the operation signal output from the operation unit 15, that is, TM+T3 to the motor control unit 163.

The motor control unit 163 drives the drive motor 12 at the current corresponding to the torque value supplied from the main control unit 161 (T3, TM+T3, TM (when the attitude control is not executed with the drive motor)).

The occupant A is returned to the plumb line direction using the reaction torque −T2 by moving the balancer B and the reaction torque −T3 by driving the drive motor 12 (drive wheel 11).

Likewise the first embodiment, the process of steps S50 to S54 is performed repeatedly to execute the attitude control for the occupant A.

In the second embodiment, under the stability control of the seating portion A during the stopping or traveling (especially travelling at the steady speed), the drive motor torque is supplementarily used to improve the allowable external force. This makes it possible to further improve the allowable occupant tilt angle upon starting.

(5) Outline of Third Embodiment

In the first to the third embodiment, the balancer is used for the following two effects (a) and (b) under the stability control (attitude control) of the occupant portion (occupant A):
(a) The reaction torque −T2 is allowed to act on the occupant A by moving the balancer B; and
(b) The gravity center is moved by positioning the balancer forward or backward with respect to the plumb line.

As the aforementioned functions may simultaneously occur as physical phenomena, the control law inevitably becomes complicated. In order to generate the reaction force of the balancer drive torque, the gravity center moves simultaneously.

In the embodiment, the control according to the second embodiment is executed when the vehicle is stopped.

When the vehicle is traveling, the balancer B is moved only for controlling the gravity center as described in the effect (b), not for generating the reaction torque.

Meanwhile, the drive torque for the drive motor 12 (drive wheel 11) is adjusted under the attitude control during traveling with respect to the movement of the occupant A under the external force.

(6) Detailed Description of Third Embodiment

Figure 9:
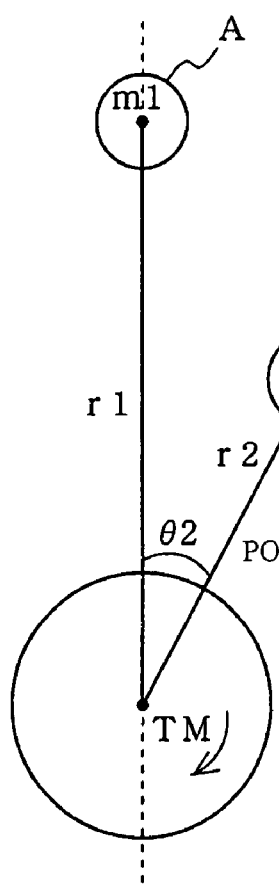
FIGS. 9A and 9B show each state of the respective components during traveling of the vehicle according to a third embodiment.
Figure 9:
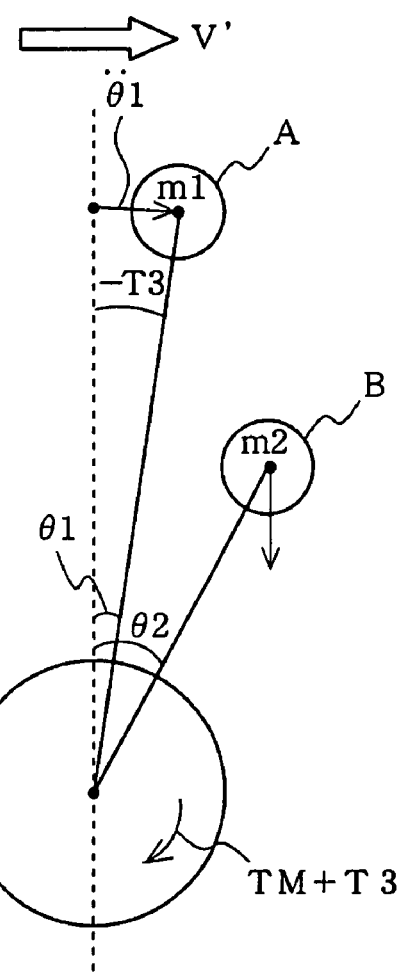

FIG. 9 shows the state of the respective components during traveling of the vehicle according to the third embodiment.

FIG. 9A shows the state where the occupant A is subjected to the attitude control on the plumb line during traveling of the vehicle.

During the traveling, the torque is required to be balanced with respect to the drive torque corresponding to the travel resistance by tilting the gravity center (composite gravity center of the occupant A and the balancer B) of the vehicle toward the traveling direction.

In the embodiment, the balancer B is tilted forward in the traveling direction at θ2 as shown in FIG. 9A.

In the aforementioned case, the reaction torque −TM with respect to the drive torque TM, which is generated by the drive motor 12 for driving the drive wheel 11 is coincided with the torque T2(G) generated by the gravitational force of the balancer B at the tilted position at θ2. The vehicle is allowed to travel while maintaining the position of the occupant A on the plumb line.

Assuming that G denotes the gravitational acceleration, the torque T2(G) may be expressed by the following formula (5):

$$T2(G)=r2 \times m2 \times G \times \sin \theta 2 \quad (5)$$

In the case where the occupant A is displaced from the plumb line by the external force as shown in FIG. 9B in the stable traveling state as shown in FIG. 9A, the drive torque of the drive motor 12 is changed to the value TM+T3 obtained by adding the adjustment torque T3 to the drive torque TM required for traveling so as to restore the position of the occupant A to the plumb line.

As the adjustment torque T3 is set to the value larger than T1, that is, T3>T1, the occupant A is returned to the plumb line with the reaction torque −T3.

Figure 10:
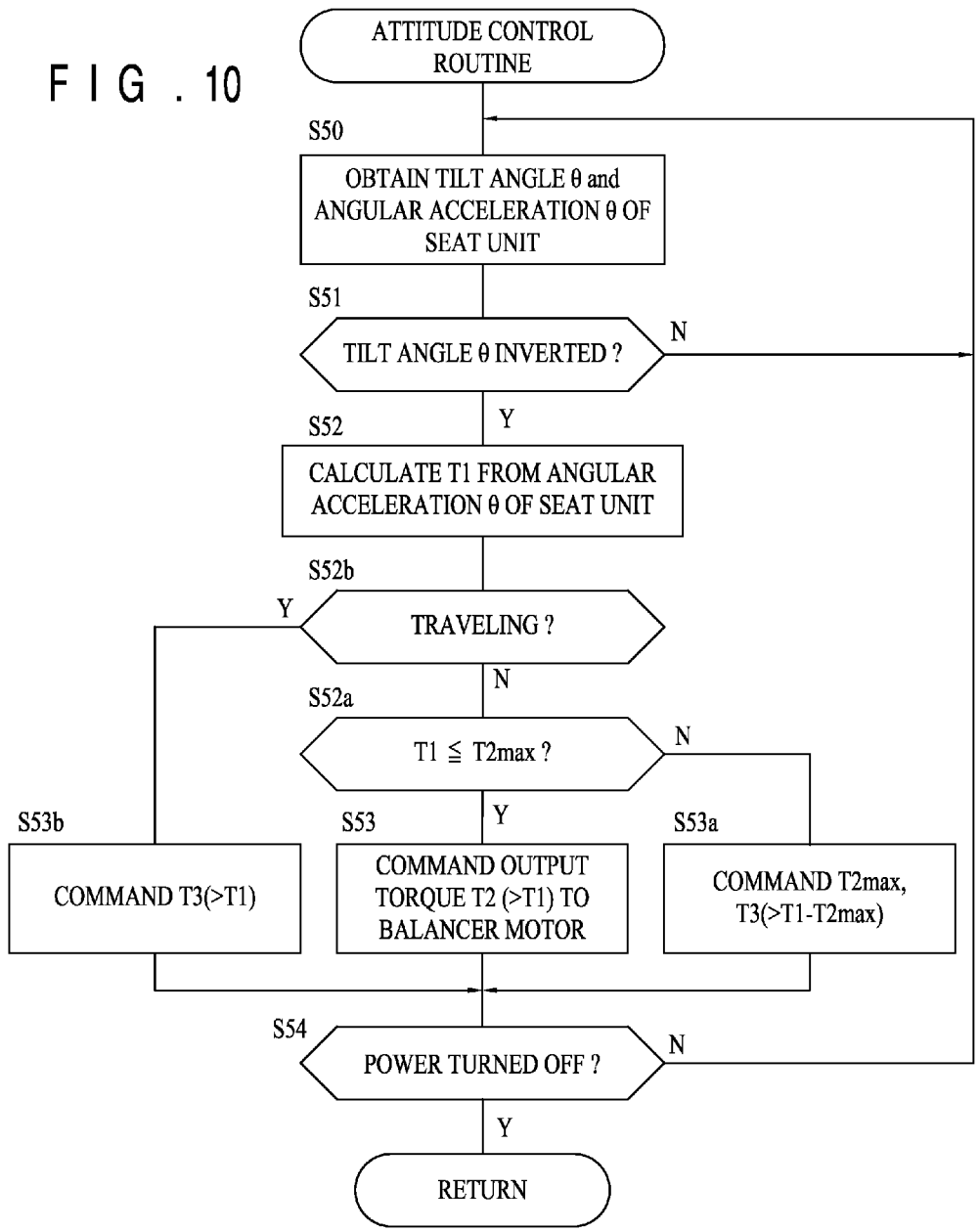
FIG. 10 is a flowchart showing the attitude control routine executed in the main control unit according to the third embodiment.

FIG. 10 is a flowchart of the attitude control routine executed in the main control unit 161 according to the third embodiment.

Referring to FIG. 10, the same explanations as those in the second embodiment will be designated with the same step numbers, and explanations thereof, thus will be omitted.

Under the attitude control according to the third embodiment, the main control unit 161 calculates the torque T1 for tilting the occupant A at the angular acceleration {θ} from the angular acceleration {θ} of the seat unit 13 in step S52. Then it is determined whether or not the vehicle is traveling in step S52b.

The determination with respect to the traveling state of the vehicle may be made by determining whether or not the output from the vehicle speed sensor is larger than 0, or the drive torque TM is supplied to the drive motor 12.

The aforementioned determination may be made by determining whether or not the vehicle speed is equal to or lower than the reduced speed, that is, the output from the vehicle speed sensor is larger than the value, for example, 5 km/h.

If it is determined that the vehicle is not traveling, that is, the vehicle is stopped (N in step S52b), the main control unit 161 proceeds to step S52a where the same process as the second embodiment is executed until step S54.

Meanwhile, if it is determined that the vehicle is traveling (Y in step S52), the main control unit 161 commands the output torque by supplying the adjustment torque value T3 larger than the T1 calculated in step S52 to the motor control unit 163 in step S53b. The process then proceeds to step S54.

As the drive torque TM for the vehicle traveling has been commanded, the main control unit 161 supplies the torque (TM+T3) to the motor control unit 163 as the value obtained by adding the adjustment torque T3 to the drive torque TM of the drive motor 12 required for obtaining the output corresponding to the operation signal sent from the operation unit 15.

The motor control unit 163 actually drives the drive motor 12 at the current corresponding to the torque (TM+T3) supplied from the main control unit 161.

In the third embodiment, the balancer is not moved for the attitude control during traveling of the vehicle. The attitude control is executed by controlling the reaction torque −T3 of the adjustment torque T3 of the drive motor 12 (drive wheel 11).

As the balancer is not moved for the attitude control during traveling of the vehicle, the movement of the gravity center caused by moving the balancer does not have to be considered, thus simplifying the control.

In the embodiment, the reaction force generated by moving the balancer is not used during traveling of the vehicle, but the drive torque of the wheel is changed, thus changing the vehicle speed.

However, the degree of vibration felt by the occupant during traveling of the vehicle may be lower than the case where the vehicle is stopped.

Operations of the embodiment upon starting and acceleration/deceleration of the vehicle will be described.

The starting denotes the state where the vehicle takes off forward or backward from the stopped state. The acceleration/deceleration denotes the state where the vehicle accelerates/decelerates during traveling.

Upon starting or acceleration/deceleration, the tilt angle $\alpha$ of the overall gravity center (composite gravity center of the occupant A and the balancer B) is required to be changed.

Assuming that the line formed by connecting the center of the wheel (rotary shaft) and the overall gravity center just before acceleration/deceleration is set as the reference line, the overall gravity center has to be tilted (tilt angle $\alpha$) in the traveling direction upon the starting and acceleration, and the overall gravity center has to be tilted (tilt angle $\alpha$) in the direction opposite the traveling direction upon deceleration.

Upon starting, the plumb line is set as the reference line which tilts from the plumb line at the tilt angle $\alpha$ required for the traveling in the state just before the acceleration/deceleration.

In the embodiment, a first operation performed by the drive wheel and a second operation performed by moving the balancer B are used for moving the overall gravity center forward or backward of the reference line for the purpose of establishing the starting and the acceleration/deceleration.

FIG. 11A shows the outline of the first operation, and FIG. 11B shows the outline of the second operation.

Figure 11:
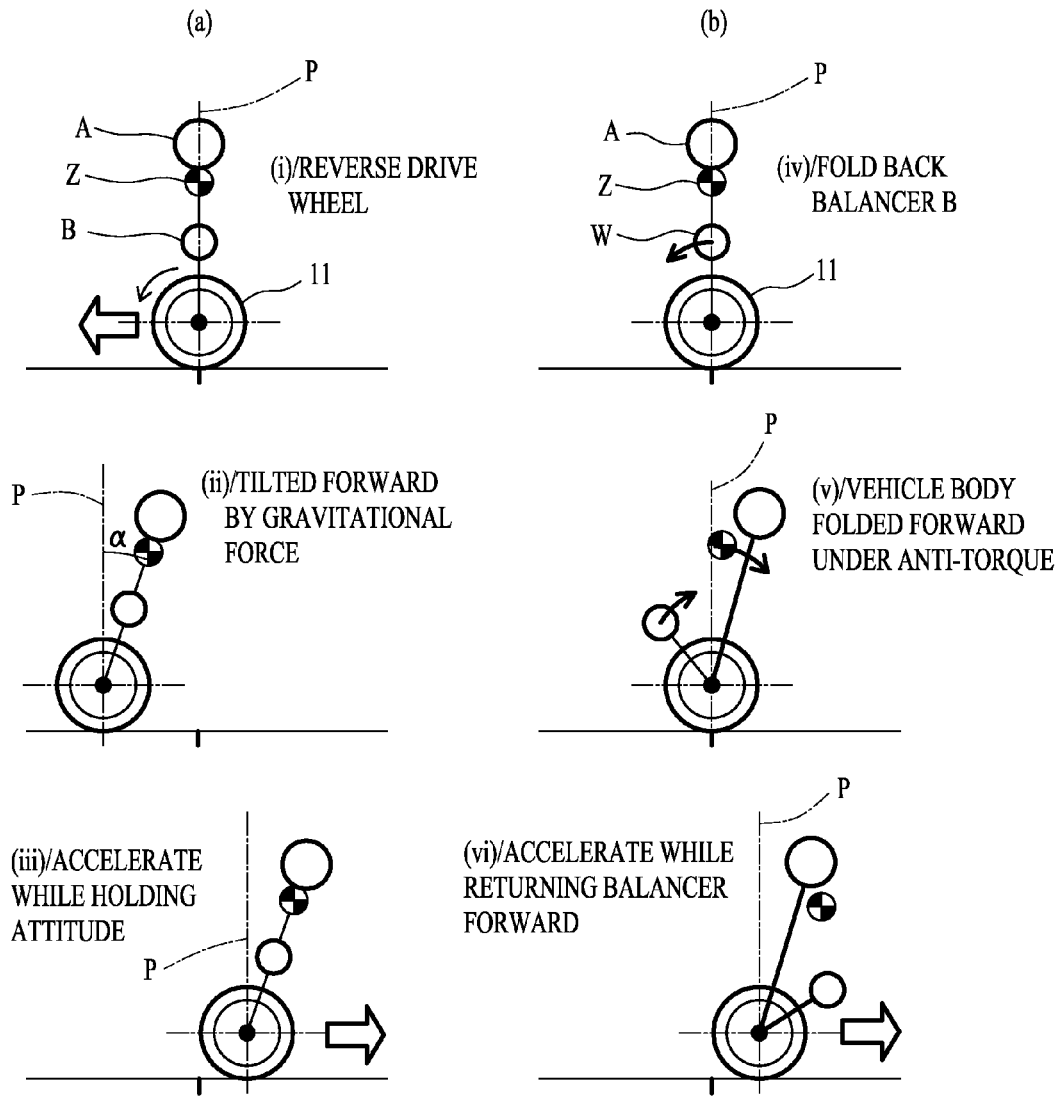
FIGS. 11A and 11B schematically show first and second operations upon start or acceleration/deceleration of the vehicle.

FIG. 11 shows the operation states upon starting of the vehicle which are the same except that the reference line is different, and the tilting direction becomes opposite (decreasing direction) upon deceleration.

(1) First Operation

In the first operation, the occupant A (gravity center), the balancer B (gravity center), and overall gravity center Z are all balanced on the reference line (plumb line) P under the attitude control just before the starting.

In the aforementioned state, the drive wheel 11 is rotated in the direction opposite the traveling direction (rotated leftward opposite the rightward traveling direction) so as to be moved backward as shown in (i) of FIG. 11A.

As (ii) of FIG. 11A shows, the occupant A, the balancer B and the overall gravity center Z on the reference line P tilt forward (at the tilt angle $\alpha$) under the gravitational force while maintaining the same positional relationship (angular relationship).

As (iii) of FIG. 11A shows, the vehicle is started (forward/backward) by acceleration to the designated direction while maintaining the position at the predetermined tilt angle $\alpha$ (tilt angle of the overall gravity center Z).

(b) Second Operation

In the first operation, the occupant A (gravity center), the balancer B (gravity center), and the overall gravity center Z are balanced on the reference line (plumb line) P under the attitude control just before the starting.

In case of acceleration/deceleration, the reference line P tilts at $\alpha 0$ with respect to the plumb line just before acceleration/deceleration. The overall gravity center Z is on the reference line. One of the occupant A and the balancer B is positioned on the reference line P at the front, and the other is positioned on the reference line P at the back. Alternatively, both the occupant A and the balancer B are on the reference line P.

Referring to (iv) of FIG. 11B, the balancer B is moved in the direction opposite the traveling direction, that is, backward.

As shown in (v) of FIG. 11B, the reaction torque generated by the backward movement of the balancer B tilts the occupant A in the direction opposite the balancer B (traveling direction).

The overall gravity center Z is also moved to the point between the reference line P and the occupant A in the direction opposite the balancer B (traveling direction).

As shown in (vi) of FIG. 11B, the vehicle is accelerated while gradually moving the balancer B forward.

In the second operation as described above, the reaction force generated by moving the balancer B serves to move the occupant A in the direction opposite the balancer B. The overall gravity center Z of the occupant and the balancer is also moved in the direction opposite the balancer B.

The condition for allowing the balancer B and the overall gravity center Z to move in the opposite direction may be expressed by the following formula (6).

$$m1 \times r1/(I1+m1\times\{r1\}) > m2 \times r2/(I2+m2\times\{r2\}) \quad (6)$$

where m1 denotes the weight of the occupant A, r1 denotes a distance from the center of the drive wheel 11 (axle) to the gravity center of the occupant A, $\{r1\}$ denotes the angular acceleration of the occupant A, I1 denotes the inertia around the gravity center of the occupant A, m1×$\{r1\}$ denotes the inertia of the occupant A around the axle.

The term m2 denotes the weight of the balancer B, r2 denotes the distance from the axle of the drive wheel 11 to the gravity center of the balancer B, $\{r2\}$ denotes the angular acceleration of the balancer B, I2 denotes the inertia of the balancer B around the gravity center, and m2×$\{r2\}$ in the formula (6) denotes the inertia of the balancer B around the axle.

If the inequality sign is reversed in the formula (6), or the balancer B is moved, the occupant A is moved in the direction opposite the balancer B. However, the overall gravity center Z moves in the same direction as the balancer. In this case, the balancer B is moved in the direction opposite the traveling direction, acceleration direction and the deceleration direction such that the overall gravity center Z is moved in the desired direction. However, the occupant A moves in the direction opposite the movement direction of the gravity center. Accordingly, it becomes opposite the normal riding feel. It is preferable to employ the formula (6).

Upon execution of the attitude control as described in the first to the third embodiments, the occupant A moves in the direction opposite the balancer B. Both the relationship of the formula (6) and that of the reversed inequality sign in the formula (6) may be employed.

The control for starting and acceleration/deceleration of the vehicle by performing the first and the second operations will be described.

The motion equation used for controlling the starting and acceleration/deceleration will be explained.

In the respective formulae, $\{\theta\}$ denotes the angular acceleration, $\lceil\theta\rfloor$ denotes the angular speed, the suffix w denotes the drive wheel, the suffix 1 denotes the occupant A, and the suffix 2 denotes the balancer. The terms g and Rw denote the gravitational acceleration and the radius of the drive wheel, respectively.

(a) The motion equation of the drive wheel 11 is expressed in the following formula (7) where the wheel motor torque is set to T3.

$$T3 = Iw\{\ddot{\theta}w\} + Rw[mw \times Rw \times \{\ddot{\theta}w\} + [(m1 \times Rw \times \{\ddot{\theta}w\}) + (m1 \times r1\{\ddot{\theta}1\} \times \cos\theta1) - (m1 \times r1 \times \lceil\dot{\theta}1\rceil \times \lceil\dot{\theta}1\rceil \times \sin\theta1)] + [(m2 \times Rw \times \{\ddot{\theta}w\}) + (m2 \times r2\{\ddot{\theta}2\} \times \cos\theta2) - (m2 \times r2 \times \lceil\dot{\theta}2\rceil \times \lceil\dot{\theta}2\rceil \times \sin\theta2)]] + (Rw \times Dxw + D\dot{\theta}w) \times \lceil\dot{\theta}w\rfloor] \quad (7)$$

The formula (7) may be expressed as follows.

$$T3 = T31 + T32 + T33$$

$$T32 = Rw \times (T32a + T32b + T32b)$$

$$T33 = (T33a + T33b) \times \lceil\dot{\theta}w\rfloor$$

where T31 denotes the inertia of the drive wheel 11, T32 denotes the moment generated by the frictional force against the ground, Rw×T32a denotes the inertia (translation) of the tire, Rw×T32b denotes the inertia of the vehicle body (acceleration in translation direction+acceleration in the peripheral direction−acceleration in the radial direction), Rw×T32c denotes the inertia of the balancer (acceleration in translation direction+acceleration in the peripheral direction−acceleration in the radial direction), T33 denotes the damping force, T33a×⌈θ̇w⌋ denotes the damping force at air resistance, T33b×⌈θ̇w⌋ denotes the damping force at friction, and R2 denotes the radius of the drive wheel 11.

(b) The motion equation for the vehicle body may be expressed by the following formula (8).

$$T1 = -(T2 + T3) \quad (8)$$
$$= (m1 \times r1 \times r1 + I1) \times \{\ddot{\theta}1\} +$$
$$(m1 \times Rw \times \{\ddot{\theta}w\} \times r1 \times \cos\theta1) -$$
$$(m1 \times g \times r1 \times \sin\theta1) + (D\theta1 \times \lceil\dot{\theta}1\rceil)$$

The formula (8) may be expressed as follows.

T1=inertia of vehicle body (occupant A)+couple acting under the inertia force of vehicle body−gravitational force+damping force (c) The motion equation of the balancer may be expressed by the following formula (9) where the balancer motor torque is set to T2.

$$T2 = (m2 \times r2 \times r2 + I2) \times \{\ddot{\theta}2\} + \quad (9)$$
$$(m2 \times Rw \times \{\ddot{\theta}w\} \times r2 \times \cos\theta2) - (m2 \times g \times r2 \times \sin\theta2)(D\theta2 \times \lceil\dot{\theta}2\rceil)$$

The formula (9) may be expressed as follows.

T2=inertia of balancer+couple acting under the inertia force of balancer−gravitational force+damping force Values of T3, T1 and T2 may be approximated to T3', T1' and T2' as follows by linearly approximating the aforementioned formulae (7) to (9), and having the viscous friction unconsidered (omitted).

$$T3' = Iw' \times \{\ddot{\theta}w\} + Rw(m1 \times R1 \times \{\ddot{\theta}1\} + m2 \times R1 \times \{\ddot{\theta}1\})$$

$$T1' = I1' \times \{\ddot{\theta}1\} + m1 \times Rw \times \{\ddot{\theta}w\} \times r1 - m1 \times g \times r1 \times \theta1$$

$$T2' = I2' \times \{\ddot{\theta}1\} + m2 \times Rw \times \{\ddot{\theta}w\} \times r2 - m2 \times g \times r2 \times \theta2$$

In the aforementioned approximation formulae, Iw', I1' and I2' may be expressed as follows.

$$Iw' = Iw + (m1 + m2 + mw) \times Rw \times Rw$$

$$I1' = I1 + m1 \times r1 \times r1$$

$$I2' = I2 + m2 \times r2 \times r2$$

Figure 12:
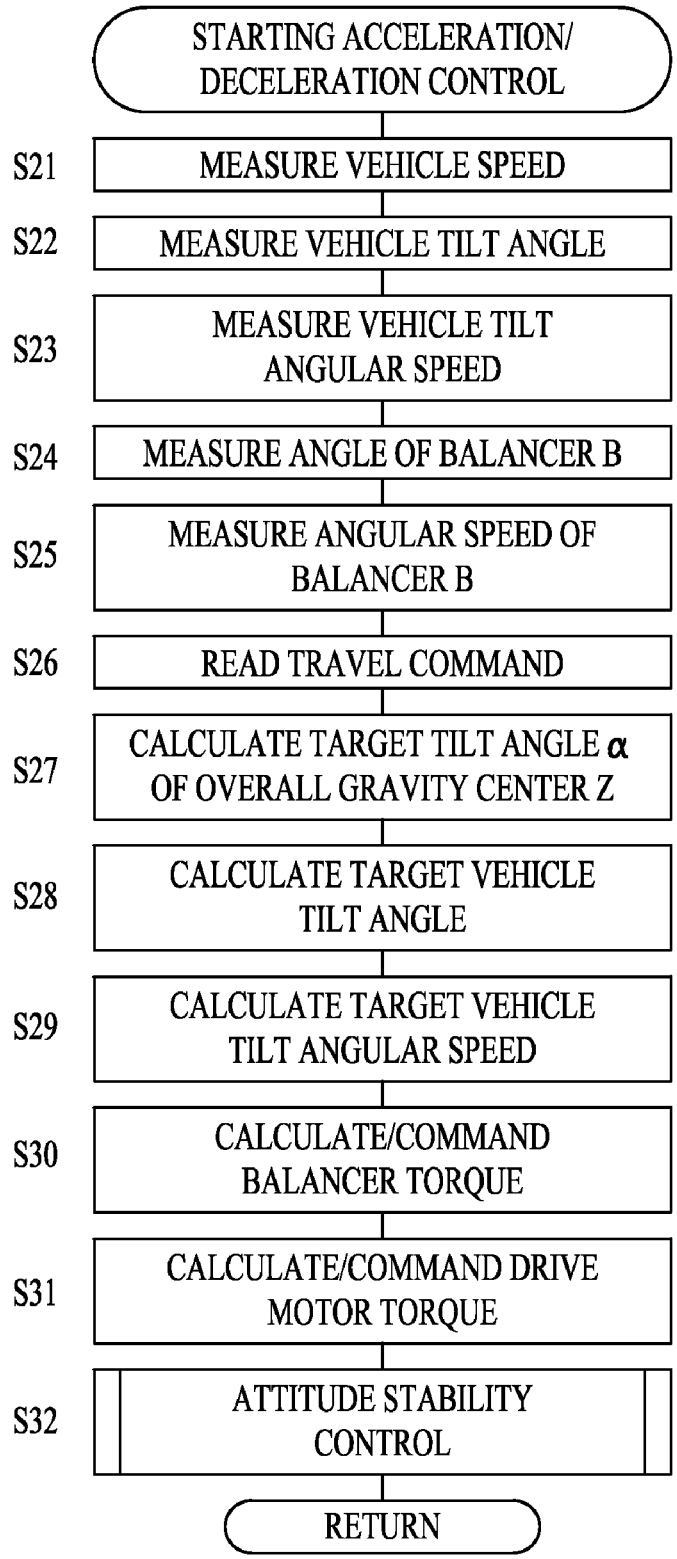
FIG. 12 is a flowchart of a control routine upon start and acceleration/deceleration in the second operation.

FIG. 12 is a flowchart of a control routine for the starting and acceleration/deceleration performed by the second operation.

Referring to FIG. 12, the main control unit 161 detects current states of the vehicle (occupant A) and the balancer B just before the starting and acceleration/deceleration (the operation will be referred to as the starting and other operations) in steps S21 to S25.

Specifically, the main control unit 161 measures the vehicle speed in step S21.

This vehicle speed is used for improving the accuracy for detecting the vehicle tilt angular speed in step S23.

The measured value is usable for calculating the values of the inertia and gravitational force in the formula (8) with higher accuracy.

The detection of the vehicle speed may be omitted.

The main control unit 161 measures the tilt angle and the tilt angular speed of the vehicle (occupant A) in steps 22 and 23.

The tilt angular acceleration of the vehicle is calculated from the measured tilt angular speed.

The main control unit 161 measures the angle (tilt angle) and the angular speed of the balancer B.

The angular acceleration of the balancer B may be calculated based on the measured angular speed.

When measurement of the current states of the vehicle and the balancer B is finished, the main control unit 161 reads the travel command (operation signal) output from the operation unit 15 in step S26.

In step S27, the main control unit 161 calculates a target tilt angle α of the overall gravity center Z after the starting or acceleration/deceleration corresponding to the current states of the vehicle and the balancer B detected in steps S21 to S25, and the travel command read in step S26.

The main control unit 161 calculates the target tilt angle and the target tilt angular speed of the vehicle (occupant A) required for controlling the overall gravity center Z to the calculated target tilt angle α in steps S28 and S29.

The target tilt angle and the target tilt angular speed of the vehicle required for establishing the target tilt angle α may be derived from the aforementioned motion equations, weights of the vehicle (occupant A) and the balancer B, distances r1 and r2 to the gravity centers, inertia and the like.

The main control unit 161 calculates the balancer torque T3 required for the vehicle body to establish the calculated target tilt angle and target tilt angular speed such that the output command is output to the motor control unit 163 in step S30.

The motor control unit 163 supplies the current value corresponding to the output balancer torque T3 to the balancer drive unit 18 in reference to the torque-current map for the balancer motor 181 so as to move the vehicle (occupant A) and the overall gravity center Z.

The main control unit 161 calculates the drive motor torque T1 required for the vehicle to be brought into the starting or acceleration/deceleration state from the current state so as to output the output command to the motor control unit 163 in step S31.

The motor control unit 163 drives the drive motor 12 (drive wheel 11) at the current value corresponding to the drive motor torque T1 supplied in reference to the torque-current map for the drive motor 12 for starting or acceleration/deceleration.

After the starting or acceleration/deceleration, the main control unit 161 executes the attitude stability control (attitude control) in step S32, and returns to the main routine.

The controlling operation for the starting and acceleration/deceleration performed by the second operation has been described. The controlling for the starting and other operations performed by the first operation may be executed as follows.

As the balancer B is not moved, the positional relationship among the vehicle (occupant A), the balancer B and the overall gravity center Z is not changed.

The value obtained by adding the difference between the target tilt angle α and the tilt angle α0 of the overall gravity center Z just before the starting and other operations calculated in step S27, that is, Δα to the vehicle tilt angle measured in step S22 is set to the target vehicle tilt angle in steps S28 and S29.

The main control unit 161 calculates drive motor torque required for the starting or acceleration/deceleration by moving the vehicle body at the calculated target tilt angle and target tilt angular speed, and outputs the command in step S32.

In the aforementioned case, execution of step S30 may be omitted.

The first and the second operations cause the vehicle (occupant A) to tilt in the travel direction (tilt forward for traveling ahead) upon the starting and acceleration, and tilts in the direction opposite the starting direction upon deceleration. This may prevent the occupant from feeling discomfort while riding the vehicle.

The structure of the balancer used in the embodiment and various modified examples will be described referring to FIGS. 13 to 15.

Figure 13:
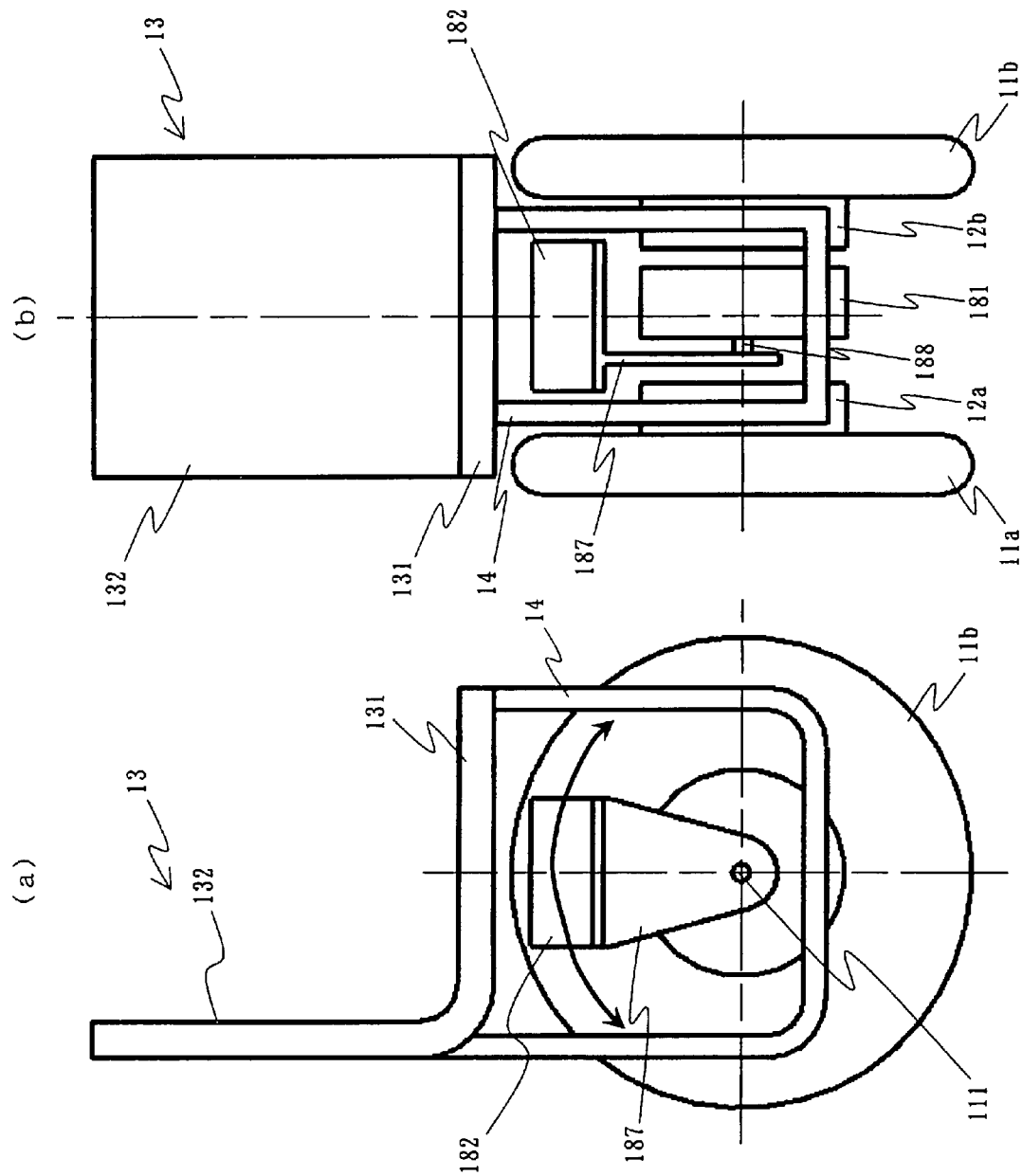
FIGS. 13A and 13B show the structure of the balancer which is rotatable at 360°.
Figure 14:
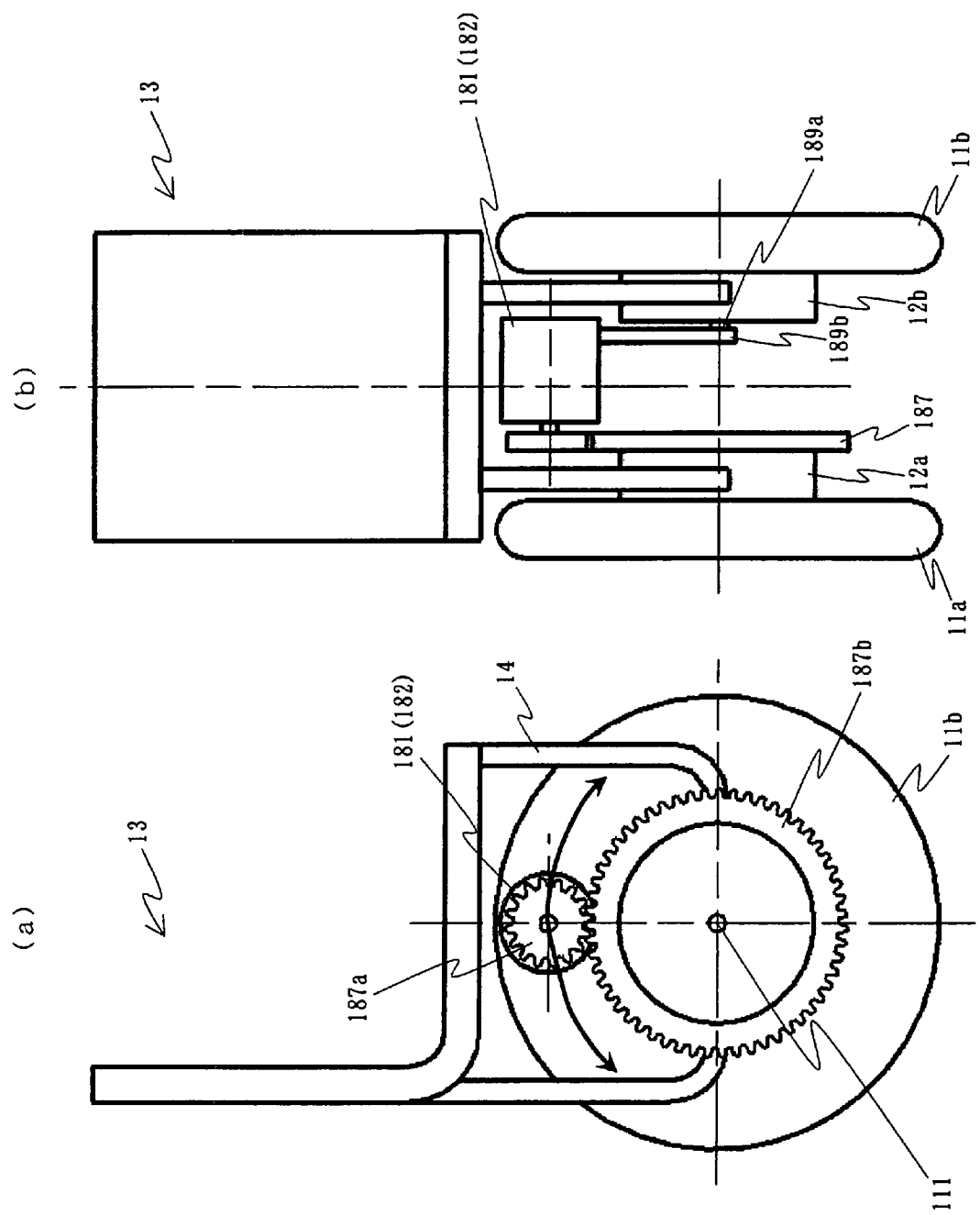
FIGS. 14A and 14B show the balancer formed as a balancer motor.
Figure 15:
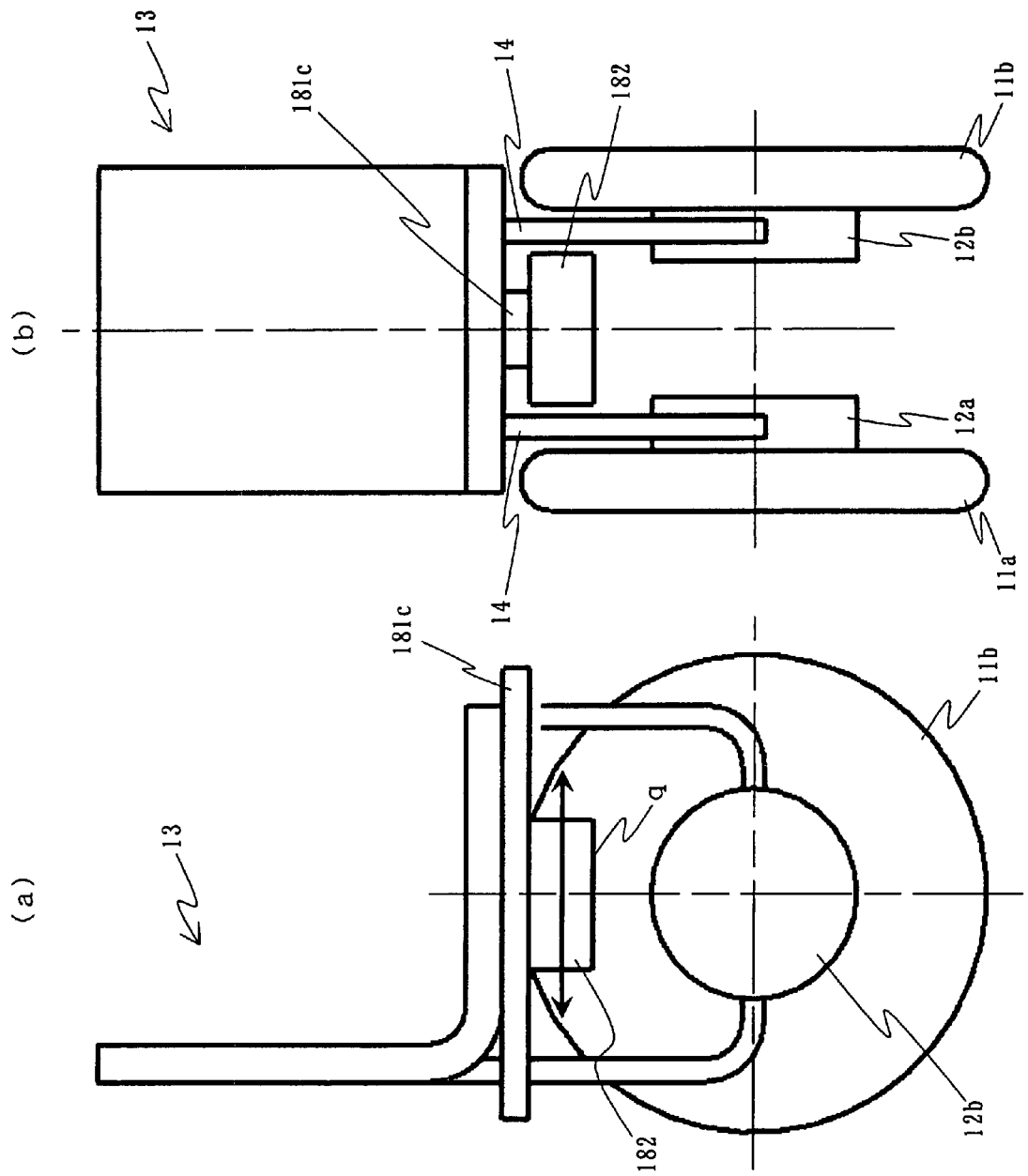
FIGS. 15A and 15B show the balancer which moves on the horizontal plane in the longitudinal direction of the vehicle.

As the views shown in FIGS. 13 to 15 are intended for explaining the structure of the balancer, the operation unit 15, the control unit 16 and the like shown in FIG. 1 may be omitted. The control unit 16 may be provided below the seating surface 131.

FIG. 13 shows the structure of the balancer 182 which is rotatable at 360°.

Referring to FIG. 13, the balancer motor 181 is interposed between the drive motor 12a for the drive wheel 11a and the drive motor 12b for the drive wheel 11b.

A balancer drive shaft 188 of the balancer motor 181 is coaxially provided with the rotary shaft 111 of the drive wheels 11a and 11b, and provided with the balancer 182 via a balancer support member 187.

In FIG. 13, the balancer support member 187 is provided on the balancer drive shaft 188 at one side of the balancer motor 181. The balancer motor 181 may be interposed between the balancer drive shafts 188 such that the balancer is supported at two balancer support members 187, 187.

FIG. 14 shows the balancer 182 formed as the balancer motor 181.

Referring to FIG. 14, an enclosure for the drive motor 12b includes a shaft 189a coaxially provided to the drive wheel 11. The shaft 189a is provided with a balancer support member 189b via a bearing. The balancer motor 181 serving as the balancer is attached to the balancer support member 189b.

The rotary shaft of the balancer motor 181 is provided with a motor gear 187a in mesh with a fixed gear 187b provided on the enclosure for the drive motor 12a opposite the drive wheel 11a.

When the balancer motor 181 is driven, the motor gear 187a rotates together with the balancer motor 181 around the fixed gear 187b while being in mesh therewith.

The balancer motor 181 rotates and has the shaft 189a axially supported as the rotary shaft via the balancer support member 189b.

As the balancer is formed as the balancer motor 181, the member required for allowing the balancer to be operated may be compact, thus effectively using the space below the seat unit 13.

The weight of the balancer motor as that of the occupant A may be set to the weight of the balancer.

FIG. 15 shows the balancer 182 which does not rotate around the rotary shaft 111 but moves on the horizontal plane in the longitudinal direction of the vehicle.

Referring to FIG. 15, a fixed portion 181c with a length in the longitudinal direction of the vehicle and fixed to the side opposite the seating surface 131 is provided.

The balancer 182 is structured to move in the longitudinal direction of the vehicle as shown by arrow q while being guided by the fixed portion 181c.

The drive by the use of the fixed portion 181c and the balancer 182 may be performed by either the ball screw type or the linear motor type.

In case of the ball screw type, the balancer motor (not shown) rotates the ball screw so as to move the balancer 182 in the longitudinal direction.

In case of the linear motor type, the fixed portion 181c and the balancer 182 are provided with a stator and a rotor, respectively. The balancer 182 moves in the longitudinal direction along the longitudinal guide formed in the fixed portion 181c.

(7) Fourth Embodiment

A fourth embodiment will be described.

In the fourth embodiment, the longitudinal attitude control is not executed but the lateral attitude control is executed.

In the aforementioned embodiments, the balancer 182 is used for the inverted control (attitude control) in the longitudinal direction. In the fourth embodiment, the balancer is moved in the lateral direction to execute the lateral attitude control.

In the fourth embodiment, the vehicle has the single drive wheel 11 as the balancer is used for the attitude control with respect to the lateral tilt.

Figure 16:
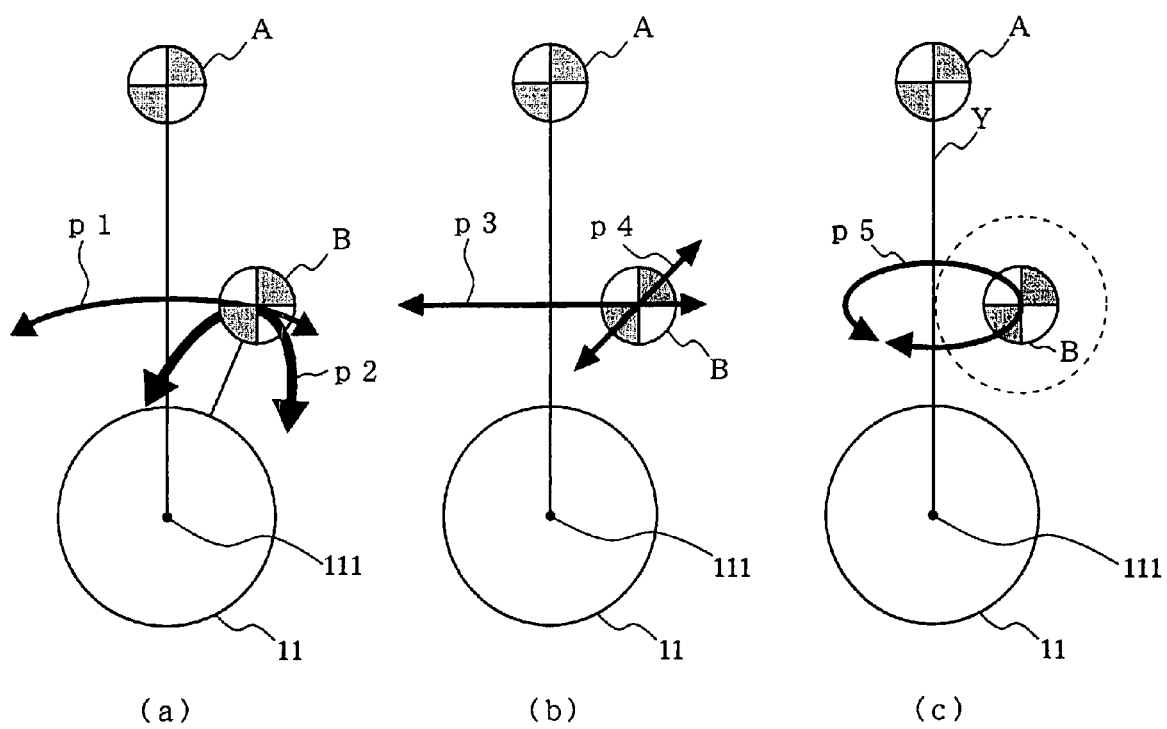
FIGS. 16A to 16C show the movement of the balancer according to a fourth embodiment.

FIG. 16 shows movement of the balancer in the fourth embodiment.

In the embodiment shown in FIG. 16A, the balancer B moves on the arc in the longitudinal direction of the vehicle with respect to the rotary shaft 111 of the drive wheel 11 as indicated by arrow p1, and also moves on the arc in the lateral direction with respect to the rotary shaft 111 as indicated by arrow p2.

In the embodiment shown in FIG. 16B, the balancer B moves on the horizontal plane in the longitudinal direction as indicated by arrow p3, and also moves in the lateral direction as indicated by arrow p4.

In FIGS. 16A and 16B, the balancer moves on the lines p1 to p4 set in the longitudinal and lateral directions. The balancer may be structured to move arbitral route on the curve with respect to the rotary shaft 111 and on the horizontal plane within a predetermined range.

In the embodiment shown in FIG. 16C, the balancer B is structured to rotatably move around a vehicle line Y formed by connecting the rotary shaft 111 to the (gravity center of) the occupant A. In FIG. 16C, the area indicated by the dotted line around the balancer B conceptually shows the outer shape of the balancer. That is, the balancer as a whole is disposed in contact with the vehicle line Y.

In this case, the vehicle line Y tilts accompanied with the tilting vehicle (occupant A), and the balancer B rotates around the vehicle line Y not on the horizontal plane but on the plane orthogonal to the vehicle line Y as indicated by arrow p5.

Note that the balance B may be structured to rotate around the plumb line on the horizontal plane regardless of the tilt of the vehicle.

The lateral attitude is controlled by the balancer to improve the travel stability of the vehicle.

The position of the overall gravity center Z is forcibly moved in the lateral direction by moving the balancer, which allows the travel direction to be changed to the direction in which the overall gravity center Z moves. For example, the balancer is moved leftward, and the resultant reaction force is used to tilt the overall gravity center and the vehicle (occupant A) rightward so as to establish curving rightward.

The attitude control in the lateral direction by the balancer as described above may be executed likewise the attitude control explained in the first to third embodiments. The overall gravity center Z is forcibly moved in the same way as in the second operation.

A fifth embodiment will be described in detail referring to FIGS. 17 to 21.

(8) Outline of Fifth Embodiment

In the vehicle according to the embodiment, the balancer for the attitude control is formed as the flywheel which rotates around the shaft coaxial with the axle.

That is, when the balancer is rotated or braked, the angular acceleration owing to the increase/decrease in the rotating speed occurs in the balancer. The inertia of the balancer generates the torque (reaction torque) for rotating the vehicle in the direction opposite the acceleration direction of the balancer around the shaft thereof. The torque is used for executing the attitude control of the vehicle.

After stabilizing the attitude of the vehicle by increase/decrease in the rotating speed of the balancer, the vehicle according to the embodiment freely rotates the balancer (in the state where the rotating speed is kept constant).

As the balancer is formed as the flywheel, the stroke may be set limitlessly.

As the gravity center is not moved by driving the balancer, the attitude control may be easily executed.

The balancer may be compact and light-weight, thus making the vehicle compact.

As the balancer may be maintained without resisting the gravity, the energy consumption may be reduced.

(9) Detailed Description of Fifth Embodiment

Figure 17:
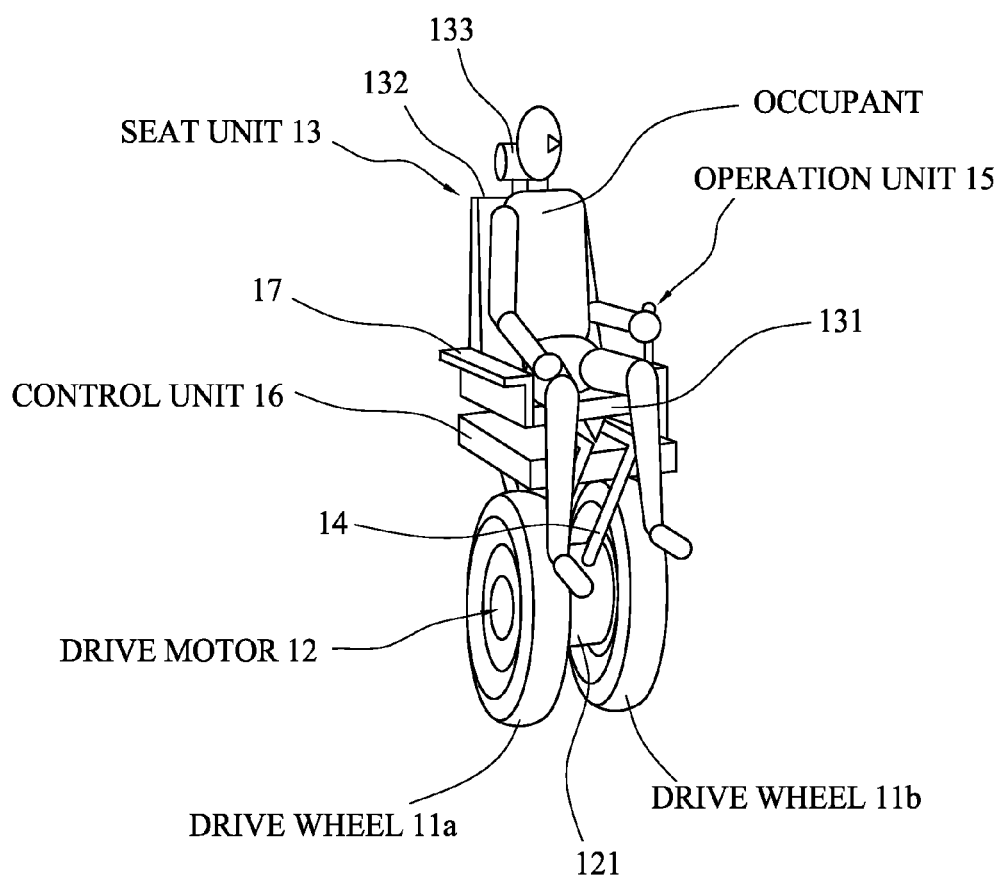
FIG. 17 is a view schematically showing a vehicle according to a fifth embodiment.

FIG. 17 schematically shows an example of the vehicle.

The vehicle according to the embodiment is formed of the inverted pendulum vehicle which is structured to travel while executing the attitude control to maintain the balance in the longitudinal direction in which the drive wheel is driven in accordance with the detected attitude of the seat unit.

Various control methods disclosed in, for example, U.S. Pat. No. 6,302,230, Japanese Patent Application Publication Nos. JP-A-S63-35082, JP-A-2004-129435 and JP-A-2004-276727 may be employed as the attitude control for the embodiment.

Referring to FIG. 17, the inverted pendulum vehicle is provided with two coaxially arranged drive wheels 11a and 11b.

The drive wheels 11a and 11b are driven by the drive motor (wheel motor) 12 stored in the wheel motor enclosure 121.

The balancer formed as the flywheel (not shown) and the balancer motor for accelerating the rotation of the balancer are located between the drive wheels 11a and 11b, and are disposed in the wheel motor enclosure 121 coaxially with the drive wheels 11a and 11b.

The seat unit 13 on which the driver is seated is provided above the drive wheels 11a and 11b (both the drive wheels 11a and 11b will be simply referred to as a drive wheel 11 hereinafter), and the drive motor 12.

The seat unit 13 includes a seating surface 131, a seatback 132, and a headrest 133.

The seat unit 13 is supported at a support member 14 (frame) fixed to the wheel motor enclosure 121.

An operation unit 15 is disposed at the left side of the seat unit 13. The operation unit 15 is operated by the driver to command acceleration, deceleration, turn, rotation, stop, braking and the like of the inverted pendulum vehicle.

In the embodiment, the operation unit 15 is fixed to the seating surface 131. However, a remote controller through wired or wireless connection may be employed as the operation unit. Alternatively, an armrest may be provided to allow the operation unit to be disposed thereon.

In the embodiment, the acceleration, deceleration and the like may be controlled based on the travel command through the operation of the operation unit 15. The control operation may be selectable, for example, to the attitude control and the travel control of the vehicle in response to the tilt angle established by changing the front tilt moment with respect to the vehicle and the longitudinal tilt angle by the driver as disclosed in Japanese Patent Application Publication No. JP-A-H10-67254.

A display/operation unit 17 is disposed at the right side of the seat unit. The display/operation unit 17 includes a display unit 172 formed of a liquid crystal device (not shown) and an input unit 171 formed of a touch panel and exclusive function keys arranged on the surface of the display unit 172.

The display/operation unit 17 may be formed as the remote controller similar to or the same as the operation unit 15. The arrangement of the display/operation unit 17 and the operation unit 15 at the left side and the right side of the seat may be reversed. Alternatively, they may be arranged at the same side.

A control unit 16 is interposed between the seat unit 13 and the drive wheel 11.

In the embodiment, the control unit 16 is installed on the lower surface of the seating surface 131 of the seat unit 13. However, it may be installed to the support member 14.

The principle of the attitude control with the balancer formed as the flywheel will be described.

FIG. 18A is a front view of the vehicle seen from the forward travel direction, showing an exemplary model of the vehicle according to the embodiment.

In the model, the vehicle is formed of the seat unit 13, the drive motor 12 connected to the seat unit 13 via a frame, the drive wheel 11 driven by the drive motor 12, a balancer motor 22 connected to the seat unit 13 via the frame, and the balancer 21 driven by the balancer motor 22. The mass of the frame is not considered herein.

Referring to the vehicle shown in FIG. 17, the gravity center of the vehicle except the drive motor 12, the drive wheel 11, the balancer motor 22 and the balancer 21 corresponds to the seat unit 13 shown in FIG. 18A.

It is assumed that the balance on the horizontal plane in the direction vertical to the travel direction (lateral direction seen from the driver) is maintained, and the balance in the travel direction is controlled.

FIG. 18B is a side view of the modeled vehicle seen from the balancer 21. The balancer motor 22 is omitted.

Referring to FIG. 18B, the direction in which the seat unit 13 rotates (tilts) forward around the axle 25 is defined as the positive direction, and the opposite direction is defined as the negative direction.

The balancer 21 as a rotating body with the mass has the gravity center on the axle 25. The rotary shaft of the balancer motor 22 is coaxial with the axle 25 such that the balancer motor 22 rotates the balancer 21 at the designated angular acceleration to the designated direction.

In other words, when the designated angular acceleration is a positive value, the balancer motor 22 rotates the balancer 21 in the positive direction at the designated angular acceleration. Meanwhile, when the designated angular acceleration is a negative value, the balancer motor 22 rotates the balancer 21 in the negative direction at the designated angular acceleration.

When the balancer motor 22 accelerates the rotation of the balancer 21, the inertia of the balancer 21 generates the torque for rotation in the direction opposite the acceleration direction of the balancer 21 at the stator side of the balancer motor 22.

As the balancer motor 22 is fixed to the vehicle, the aforementioned torque acts to rotate the seat unit 13 in the direction opposite the acceleration direction of the balancer 21. In the embodiment, such torque will be referred to as the reaction force.

That is, the reaction force is generated as the counteraction resulting from the torque caused by the balancer motor 22 to act on the balancer 21.

According to the principle, when the rotation of the balancer 21 is accelerated in the positive direction, the negatively tilting reaction force acts on the seat unit 13. Meanwhile, when the rotation of the balancer 21 is accelerated in the negative direction, the positively tilting reaction force acts on the seat unit 13.

The reaction force to the acceleration of the balancer 21 acts as the force for tilting the seat unit 13 forward or backward, which may be used for executing the attitude control of the vehicle.

In the case where the seat unit 13 is tilted by the external force and the like from the position at the target tilt angle with respect to the axle 25 (target tilt angle), the rotation of the balancer 21 is accelerated in the tilting direction of the seat unit. The reaction force acts in the direction to bring the seat unit 13 to the target tilt angle. In this way, the positioning control to bring the tilt of the seat unit to the target tilt angle may be executed.

Figure 19:
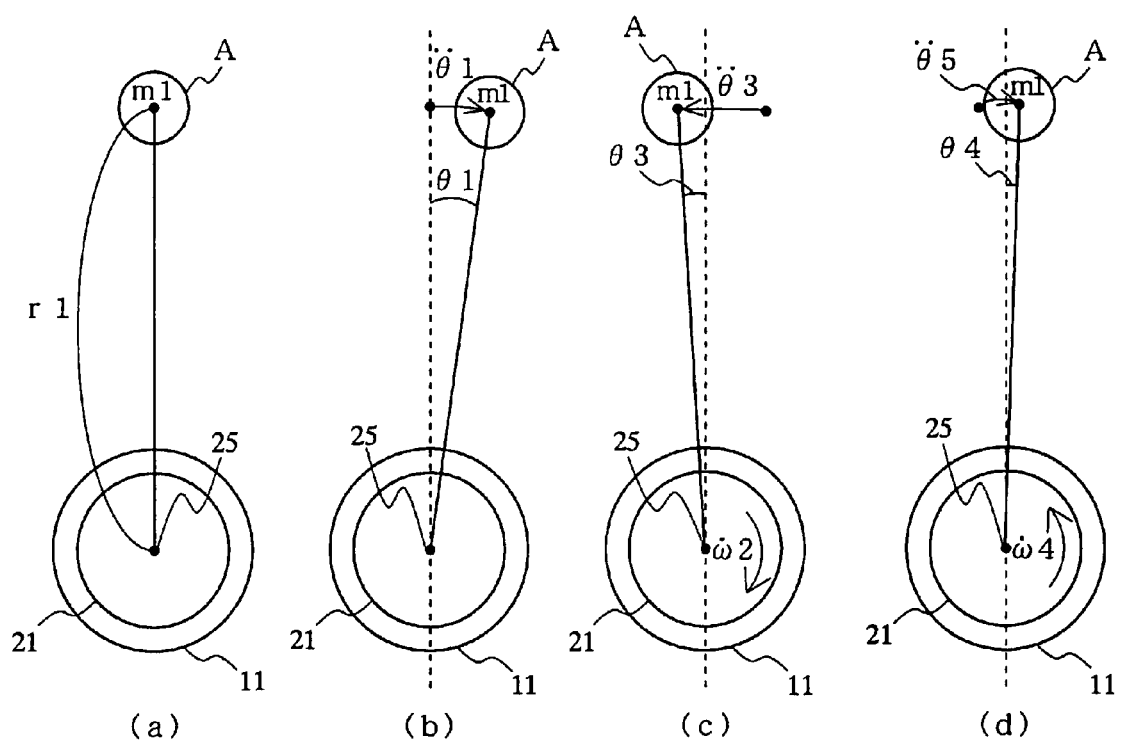
FIGS. 19A to 19D show the principle of the attitude control of the inverted pendulum vehicle according to the fifth embodiment.

FIG. 19 shows the principle of the attitude control for the inverted pendulum vehicle.

As shown in FIG. 19A, it is assumed that m1 and r1 denote the weight of the occupant A and the distance from the center of the drive wheel 11 (rotary shaft) to the gravity center of the occupant, respectively.

In the specification, the angular acceleration will be expressed as $\{\ddot{\theta}\}$ and $\{\dot{\omega}\}$ which are expressed as the code of $\theta$ having two dots on the top and $\omega$ having a dot on the top in the drawing, respectively.

The weight of the occupant A, that is, m1 is the value obtained by subtracting the weight of the balancer 21 from the whole weight M of the rotating portion in the state where the occupant is seated and the drive wheel 11 is fixed. Such value may be approximated to the weights of the seat unit 13 and the occupant.

It is assumed that from the state shown in FIG. 19A, the gravity center of the occupant A (hereinafter referred to as the occupant gravity center) is tilted forward under the external force at the angular acceleration $\{\ddot{\theta}1\}$ as shown in FIG. 19B.

The tilt angle $\theta 1$ and the angular acceleration $\{\ddot{\theta}1\}$ owing to the tilt of the occupant gravity center are detected by the gyro sensor 162.

Upon detection of the tilt of the occupant gravity center, the rotation of the balancer 21 is accelerated at the angular acceleration $\{\dot{\omega}2\}$ in the direction where the occupant A tilts as shown in FIG. 19C.

The acceleration tilting direction may be determined based on the positive/negative value of the tilt angle $\theta$ with respect to the reference line (plumb line passing through the axle 25 as shown in FIG. 19). That is, the rotation in the forward travel direction of the vehicle is set to the positive value, and the rotation in the direction opposite the forward travel direction is set to the negative value.

The angular acceleration $\{\dot{\omega}2\}$ for moving the balancer 21 establishes the relationship of $\{\dot{w}2\} > K\{\ddot{\theta}1\}$ where K denotes a constant. The process for obtaining the constant K will be described later.

In case of acceleration of the balancer 21, the acceleration $\{\dot{\omega}2\}$ in the positive direction may be obtained by increasing the detected rotating speed of the balancer 21 so long as the rotating direction of the balancer is positive (the balancer is currently rotating in the same direction as the one for acceleration).

If the balancer 21 is rotating in the direction opposite the one for acceleration, the positive or negative acceleration is performed by decreasing the rotating speed. If the rotating speed is decreased to 0, the speed of the rotation in the direction opposite the previous direction is increased.

When the balancer 21 is rotated at the angular acceleration $\{\dot{\omega}2\}$, the reaction force against the torque for moving the balancer 21 serves to move the occupant A backward (direction opposite the previous tilt direction) as shown in FIG. 19C.

When it is detected that the angle of the occupant A becomes $\theta 3$ (<0) over the plumb line through the backward movement of the occupant A, that is, the tilt angle $\theta$ with respect to the plumb line is inverted, the balancer 21 is accelerated (in the negative direction) to the direction of the angle $\theta 3$ (opposite direction).

In other words, the angular acceleration $\{\ddot{\theta}3\}$ upon inversion of the tilt angle of the occupant A is also detected by the gyro sensor 162. The balancer 21 is then accelerated at the angular acceleration $\{\dot{\omega}4\}(\{\dot{\omega}4\} > K\{\ddot{\theta}3\})$ corresponding to the angular acceleration $\{\ddot{\theta}3\}$.

The acceleration in the case of the example shown in FIG. 19 is in the negative direction. That is, the balancer 21 is rotated in the positive direction (clockwise in the drawing) just before the acceleration. The acceleration of the balancer 21 is in the negative direction by reducing the rotating speed (decelerating) (the rotating speed is decreased to 0, and then the inverted rotation is performed).

Referring to FIG. 19D, the reaction force against the torque for moving the balancer 21 backward serves to move the occupant A forward at the angular acceleration $\{\ddot{\theta}5\}$ again.

Thereafter, the balancer 21 is accelerated to the direction of the tilt angle at the angular acceleration $\{\dot{\omega}\}$ corresponding to the angular acceleration $\{\ddot{\theta}\}$ upon detection of the inverted tilt angle of the occupant A with respect to the plumb line. The operation for returning the occupant A toward the plumb line is repeatedly performed under the reaction force generated by moving the balancer 21. Such pendulum motion of the occupant A gradually converges the tilt angle θ with respect to the plumb line to 0 such that the normal attitude as shown in FIG. 19A is returned.

The tilt angle of the occupant A is apparently made large as shown in FIG. 19 for the explanatory purpose. Actually, however, the tilt may be negligible for the occupant as the balancer 21 is accelerated immediately after detection of the tilt angle θ1 or the angular acceleration {θ1}.

When the position of the seat unit 13 is returned on the plumb line as the target (target tilt angle) as shown in FIG. 19A, that is, the seat unit 13 is at the predetermined position and no reaction force is required, the vehicle makes the torque added to the balancer 21 to 0, and the balancer 21 by the balancer motor 22 to freely rotate (free running).

The balancer 21 may be freely rotated when the reaction force of the balancer 21 is not required in order to prevent generation of the unnecessary reaction force under the control (braking, for example).

The free rotation of the balancer 21 causes no power consumption or movement of the gravity center of the vehicle, resulting in no inconvenience for operating the vehicle.

The freely rotating balancer 21 is gradually stopped by the friction of the bearing, or accelerated by the balancer motor 22 again before it stops.

In a certain case, upon acceleration of the rotation of the balancer 21 by the balancer motor 22, the balancer 21 has been already rotated by the previous acceleration.

In the case where the balancer 21 has been already rotating upon acceleration of the rotation of the balancer 21, the balancer motor 22 further accelerates the balancer 21 at the current rotating speed.

When the balancer 21 freely rotating in the positive direction is accelerated in the positive direction, the balancer motor 22 accelerates the rotation of the balancer 21 at further higher speeds. Meanwhile, the rotation of the balancer 21 is accelerated in the negative direction by decelerating the balancer 21 to reduce the rotating speed.

In the embodiment, the balancer motor 22 is structured to accelerate the balancer 21 in the negative direction. For example, the acceleration in the negative direction may be performed using the physical braking device such as the brake.

Assuming that the balancer 21 is provided with the brake unit, the balancer 21 rotating in the positive direction is accelerated in the negative direction by applying the braking force of the brake unit to the balancer 21. The rotation of the balancer 21 is then decelerated (that is, accelerated in the negative direction) to generate the reaction force.

The explanation with respect to the constant K will be described.

The torque T1 required for moving the occupant A forward at the angular acceleration {θ1} may be derived from the following formula (1).

$$T1 = m1 \times (r1 \times r1) \times \{\theta 1\} \quad (1)$$

When the balancer 21 is accelerated in the positive direction, the magnitude of the torque T2 (reaction force) acting on the occupant A (seat unit 13) in the negative direction may be derived from the following formula (2).

The balancer 21 is a disk with the diameter of D, the thickness of L, the mass of m, and the acceleration (angular acceleration) of dω/dt. The code ω denotes the angular speed of the balancer 21.

$$T2 = m \cdot (D \times D/16 + L \times L/12) \times \{\omega\} \quad (2)$$

If the torque T2 is larger than the T1, the occupant A (seat unit 13) may be returned to the direction opposite the tilting direction, that is, backward with the torque of (reaction force of the torque T2−T1).

The following formula (3) is derived from the formulae (1) and (2).

$$\{\omega 2\} > ((m1 \times r1 \times r1)/m \cdot (D \times D/16 + L \times L/12))\{\theta 1\} \quad (3)$$

The constant K is derived from the following formula:

$$K = (m1 \times r1 \times r1)/(m \cdot (D \times D/16 + L \times L/12))$$

Actually, the balancer motor 22 is controlled to be driven such that the drive torque of the balancer 21 by the balancer motor 22, that is, T2 establishes the relationship of T2>T1.

The angular acceleration {θ1} is detected by the gyro sensor 162.

The weight of the occupant A, that is, m1 is obtained by summing the weight of the device and the weight of the occupant, that is, m1a+m1b. The device weight m1a is predetermined at each vehicle. The occupant weight m1b may be set to the maximum weight to be estimated, for example, 90 kg. The T2 is determined based on the maximum weight value to satisfy the condition of T2>T1. Even if the occupant's weight is lighter than the maximum weight, the occupant A may be returned to the opposite direction by the movement of the balancer 21 while the condition of T2>T1 is satisfied.

The scale (weight measurement unit) for measuring the weight of the occupant may be placed on the seating surface 131 of the seat unit 13 on which the driver is seated such that the measured value may be used as the weight of the occupant m1b.

The attitude control with respect to the vehicle may be executed with the reaction force resulting from acceleration of the rotation of the balancer 21.

If substantially high external force is applied to the seat unit 13 to be tilted at the high angular acceleration, the maximum reaction force Tbmax generated by the balancer 21 may be insufficient for the attitude control.

In the aforementioned case, the vehicle according to the embodiment supplements the insufficiency by the tilt drive torque of the drive motor 12.

In order to vertically restore the seat unit 13 which has been tilted under the large external force (large angular acceleration) in the positive direction, the maximum balancer torque is generated by the balancer 21, and the drive motor 12 is driven to accelerate the vehicle forward.

Upon acceleration of the vehicle forward, the vehicle is expected to rotate in the direction opposite the forward direction resulting from the law of inertia, and the torque in the opposite direction is generated in the seat unit 13. The torque applied to the drive wheel 11 by the drive motor 12 for tilting the vehicle in the forward or backward direction will be referred to as the tilt drive torque.

The seat unit 13 receives the reaction force obtained by combining the maximum reaction force Tbmax in the negative direction generated by the balancer 21 and the tilt drive torque so as to be returned to the direction opposite the previous tilt direction. Then after the swinging motion, the seat unit 13 is controlled to the plumb position as described referring to FIG. 19.

After the angular acceleration {θ} of the seat unit 13 (occupant A) is reduced in the middle of the pendulum motion and the reaction force generated by the acceleration of the balancer 21 becomes sufficient, the control with the tilt drive torque by the drive motor 12 is no longer necessary.

The hardware structure of the vehicle will be described referring to FIG. 20.

Figure 20:
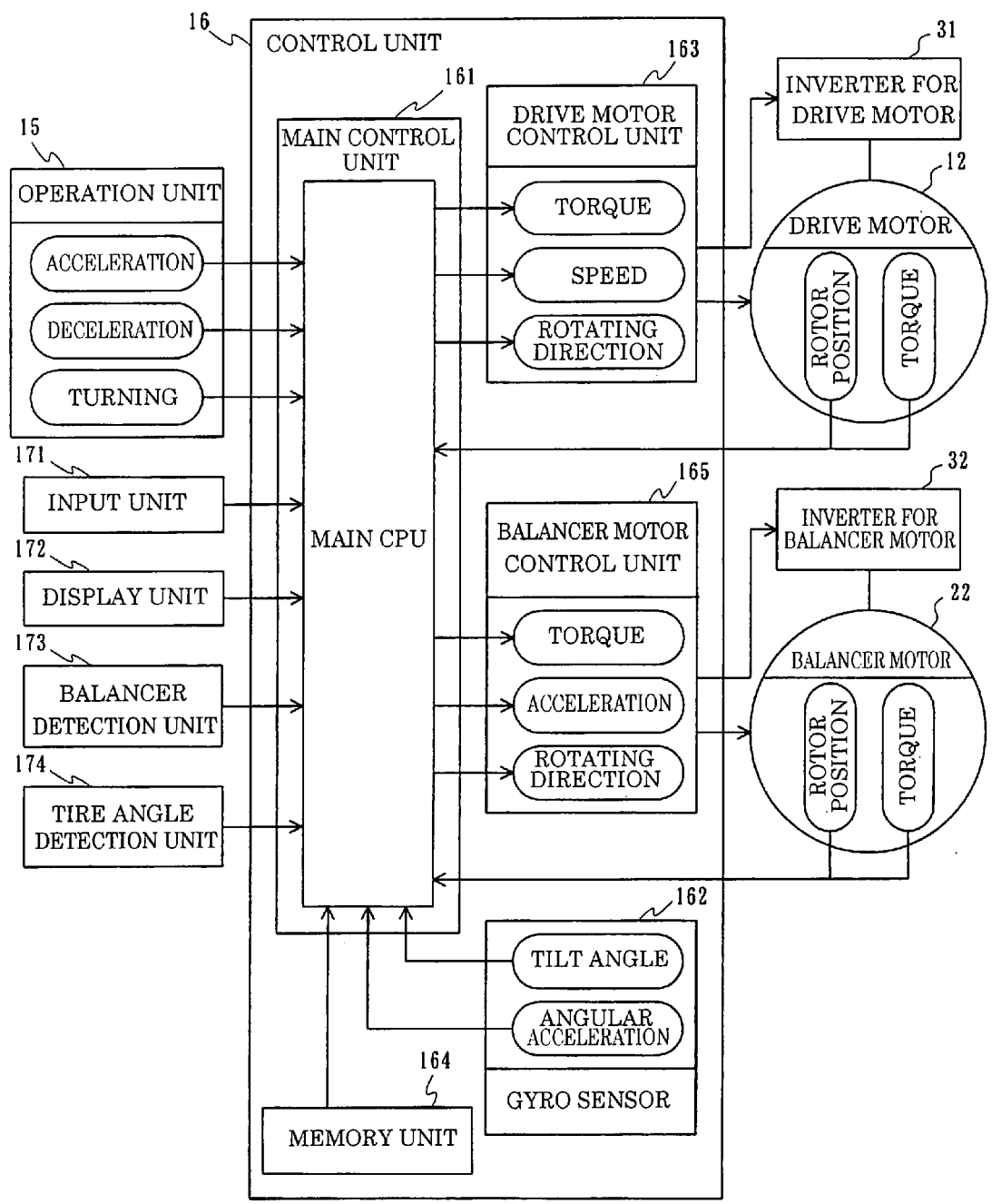
FIG. 20 is an explanatory view showing a hardware structure of the vehicle according to the fifth embodiment.

FIG. 20 shows the structure of the control unit 16.

The control unit 16 is structured to allow the vehicle to perform inverted pendulum traveling under the attitude control with the balancer 21.

The respective components of the control unit 16 will be described hereinafter.

The control unit 16 includes a main control unit 161, a gyro sensor 162, a drive motor control unit 163, a balancer motor control unit 165, and a memory unit 164.

The control unit 16 is connected to peripheral devices, such as an operation unit 15, an input unit 171, a display unit 172, a balancer detection unit 173, a tire angle detection unit 174, an inverter 31 for drive motor, a drive motor 12, an inverter 32 for balancer motor, a balancer motor 22 and a not shown battery.

The main control unit 161 equipped with a main CPU is formed as a computer system including a ROM which contains various programs and data, a RAM used as a working area, an external memory unit, and an interface unit which are not shown.

The ROM stores various programs such as an attitude control program for maintaining the attitude of the inverted pendulum vehicle with the balancer 21, and a travel control program for controlling the travel based on various travel commands from the operation unit 15. The main control unit 161 executes the process by performing the aforementioned various programs. Those programs may be stored in the memory unit 164 so as to be read by the main CPU.

The attitude control program is executed by allowing sensors (later described) to detect the tilt angle and tilt angular speed of the vehicle, based on which the drive motor 12 and the balancer motor 22 are controlled such that the vehicle travels in accordance with the travel command sent from the driver.

The gyro sensor 162 serves as the attitude sensor for detecting the attitude of the seat unit 13.

The gyro sensor 162 detects the tilt angle and the angular acceleration of the seat unit 13 as the physical value which denotes the tilt of the seat unit 13.

The main control unit 161 is structured to recognize the tilting direction based on the tilt angle detected by the gyro sensor 162.

In the embodiment, the gyro sensor 162 detects the angular acceleration and the tilt angle so as to be supplied to the main control unit 161. However, it may be structured to detect the angular acceleration only.

In the aforementioned case, the main control unit 161 stores data of the angular acceleration supplied from the gyro sensor 162 to obtain the tilt angle through calculation using the angular acceleration and the angle.

Besides the gyro sensor 162, various sensors for outputting the signal corresponding to the angular acceleration upon tilting of the seat unit 13, for example, a liquid rotor type angular acceleration meter, an eddy-current type angular acceleration meter may be employed as the attitude sensor.

The liquid rotor type angular acceleration meter detects the motion of the fluid instead of the pendulum of the servo-type acceleration meter to measure the angular acceleration with the feedback current for balancing the motion of the fluid with the servo mechanism. Meanwhile, the angular acceleration meter with the eddy-current includes the magnetic circuit with a permanent magnet. A cylindrical aluminum rotor is provided in the circuit to detect the angular acceleration based on the magnetic electromotive force generated in response to the change in the rotating speed of the rotor.

The drive motor control unit 163 controls the inverter 31 for drive motor such that the drive motor 12 is controlled.

The drive motor control unit 163 contains the torque-current map for the drive motor 12 to control the inverter 31 for the drive motor to output the current corresponding to the drive torque commanded from the main control unit 161 to the drive motor 12 in reference to the torque-current map.

The inverter 31 for the drive motor is connected to the not shown battery such that the direct current supplied from the battery is converted to the alternate current based on the command of the drive motor control unit 163 so as to be supplied to the drive motor 12.

In this way, the main control unit 161, the drive motor control unit 163, the inverter 31 for the drive motor, and the drive motor 12 are operated in cooperation with one another to form the drive wheel drive unit.

The balancer motor control unit 165 controls the inverter 32 for the balancer motor for controlling the balancer motor 22.

The balancer motor control unit 165 contains the torque-current map for the balancer motor 22 to control the inverter 32 for the balancer motor to output the current corresponding to the drive torque commanded from the main control unit 161 to the balancer motor 22 in reference to the torque-current map.

The inverter 32 for the balancer motor is connected to the battery as well as the inverter 31 for the drive motor such that the direct current supplied from the battery is converted into the alternate current based on the command of the balancer motor control unit 165 so as to be supplied to the balancer motor 22.

The balancer motor 22 rotates at the commanded angular acceleration in the rotating direction commanded by the balancer motor control unit 165.

The main control unit 161, the balancer motor control unit 165, the inverter 32 for the balancer motor, and the balancer motor 22 are operated in cooperation with one another for forming the attitude control unit to control the attitude of the vehicle (attitude of the drive operation unit) to the predetermined position.

The memory unit 164 stores not only the programs but also navigation program, and map data for navigation.

The input unit 171 is disposed on the display/operation unit 17 (see FIG. 17), serving as an input device for inputting various data, commanding, and selecting.

The input unit 171 includes a touch panel disposed on the display unit 172, and an exclusive selection button. On the touch panel, the position selected by depressing (touching) various selection button displayed on the display unit 172 performed by the driver is detected. The selected content is obtained based on the depressed position and the displayed content.

The display unit 172 is disposed on the display/operation unit 17. The display unit 172 displays the buttons to be selected or input from the input unit 171, and the descriptions.

The tire angle detection unit 174 may be formed of a resolver, for example, to detect the angle of the drive wheel 11 so as to be supplied to the main control unit 161.

The main control unit 161 differentiates the angle supplied from the tire angle detection unit 174 by time to obtain the angular speed of the drive wheel. The angular speed is further differentiated by time to obtain the angular acceleration.

The main control unit 161 compares the obtained angular acceleration of the drive wheel with the target angular acceleration such that the feedback control is executed with respect to the drive motor control unit 163.

The balancer detection unit 173 detects the rotating speed and the angle of the balancer 21 so as to be supplied to the main control unit 161.

The main control unit 161 differentiates the angle supplied from the balancer detection unit 173 by time to obtain the angular speed of the balancer 21 such that the rotating direction of the balancer 21 is confirmed.

The main control unit 161 calculates the angular acceleration of the balancer required for executing the attitude control of the seat unit 13 using the confirmed rotating direction and the rotating speed of the balancer 21 supplied from the balancer detection unit 173. That is, the rotating speed of the balancer 21 as the initial value may be increased (acceleration in the positive direction) or decreased (acceleration in the negative direction).

Figure 21:
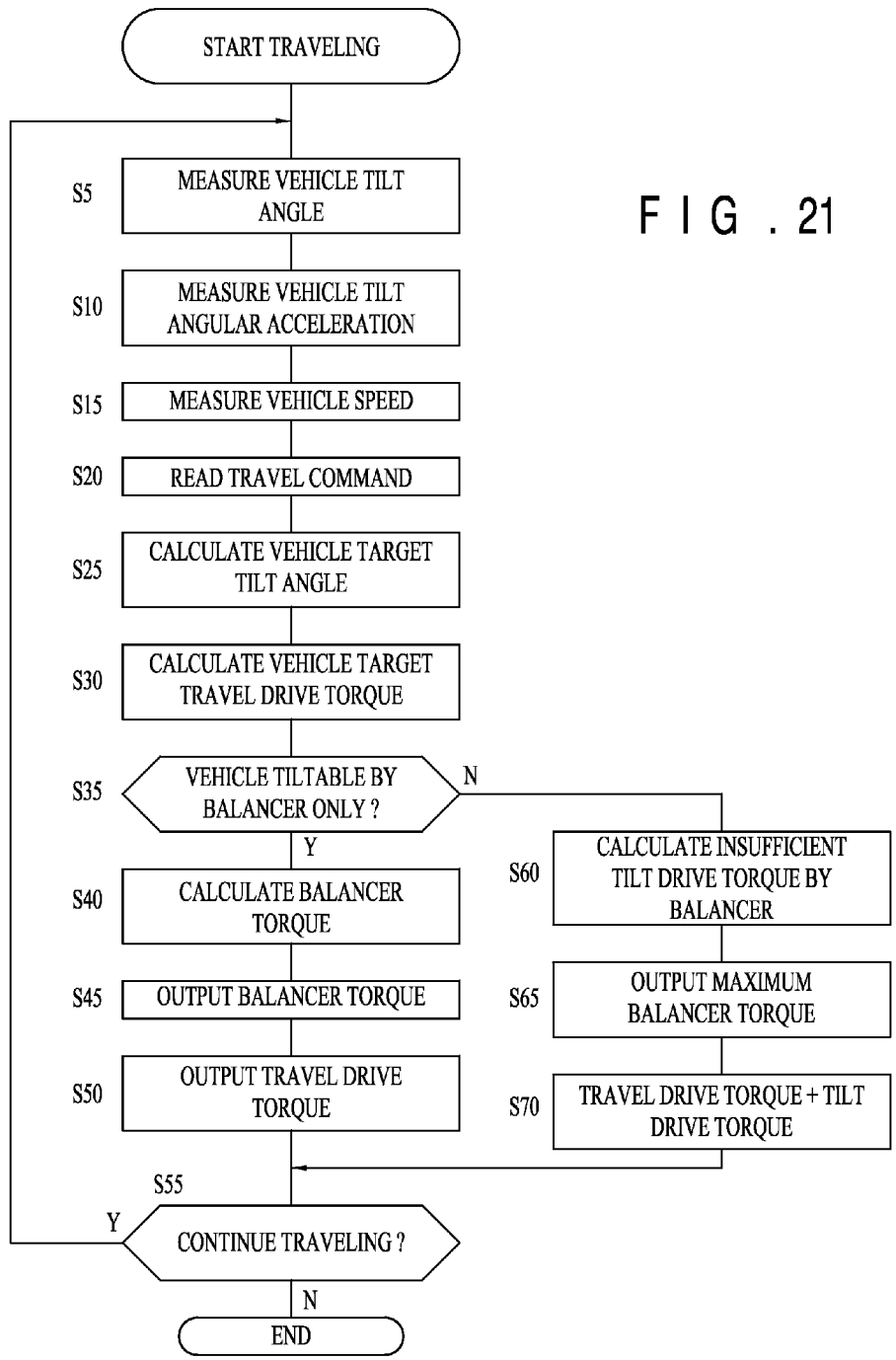
FIG. 21 is a flowchart of an attitude control routine executed in the control unit according to the fifth embodiment.
Figure 22:
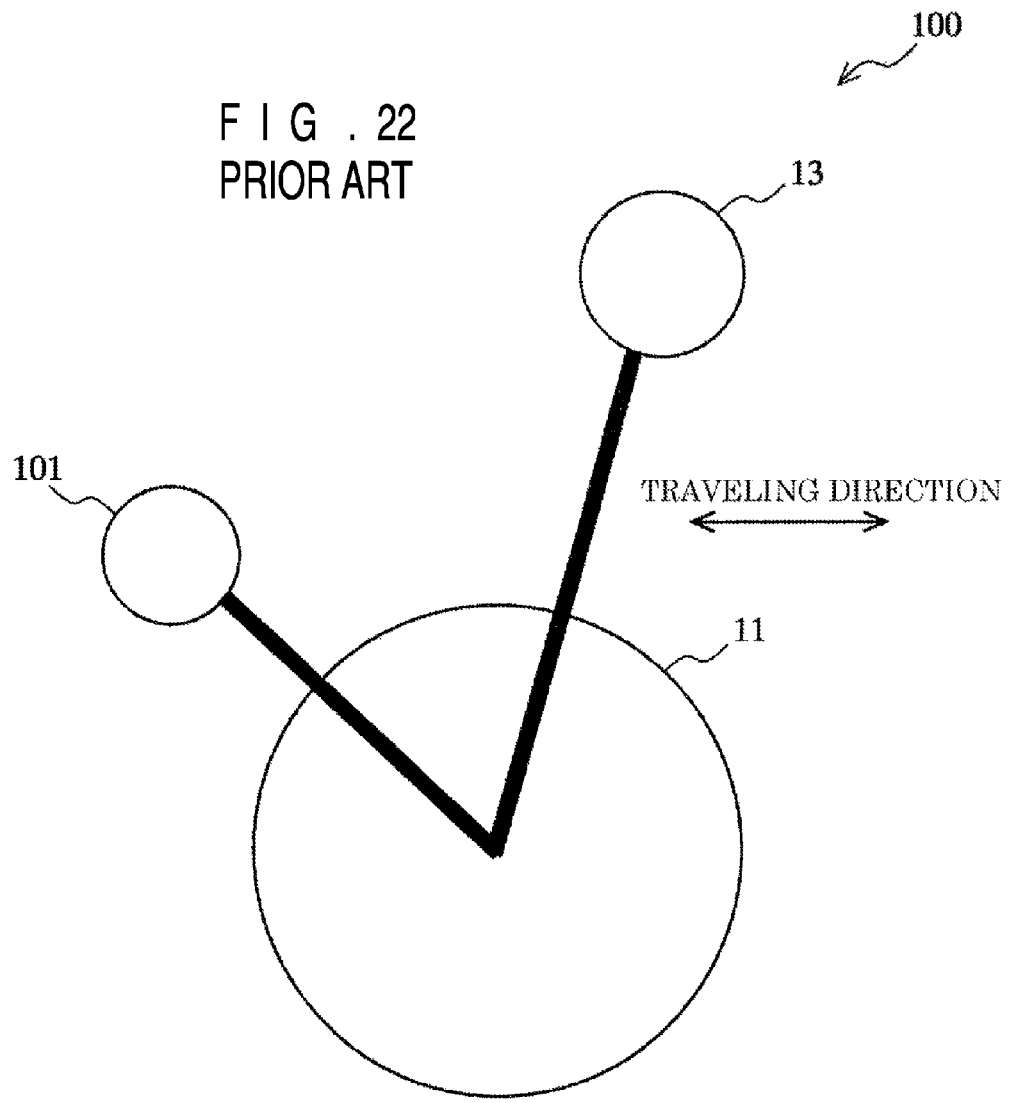
FIG. 22 is an explanatory view showing the attitude control using a generally employed balancer.

The attitude control routine executed in the control unit 16 will be described referring to the flowchart shown in FIG. 21.

When the vehicle starts traveling, the control unit 16 measures the tilt angle θ of the vehicle from the detection value of the gyro sensor 162 in step S5.

The control unit 16 further measures the tilt angular acceleration of the vehicle from the detection value of the gyro sensor 162 in step S10.

The control unit 16 measures the vehicle speed from the detection value of the tire angle detection unit 174 in step S15.

The control unit 16 reads the input (travel command) performed by the driver through the operation unit 15 in step S20. The travel command functions in commanding the vehicle speed instructed by the driver.

The control unit 16 calculates the target tilt angle of the vehicle for traveling in accordance with the travel command in step S25.

Then the control unit 16 calculates the target value of the travel drive torque generated in the drive motor 12 for traveling at the vehicle speed commanded by the travel command in step S30.

The control unit 16 determines whether or not the target tilt of the vehicle is established only by the reaction force of the balancer 21 in step S35.

In other words, the control unit 16 calculates the torque T1 applied to the seat unit 13 (occupant A) from the tilt angular acceleration {θ} of the seat unit 13 measured in step S10 with the aforementioned formula (1). The calculated value is compared with the maximum reaction force Tbmax that can be generated by acceleration of the balancer 21.

If it is determined that the target tilt of the vehicle is established only by the reaction force of the balancer 21, that is, T1<Tbmax (Y in step S35), the control unit 16 calculates the angular acceleration for allowing the balancer 21 to generate the target reaction force. The torque for allowing the balancer motor 22 to generate the torque for realizing the calculated angular acceleration, that is, the balancer torque Tb is further calculated in step S40.

The balancer torque Tb is larger than the torque T1 calculated with the formula (1), that is, Tb>T1.

The control unit 16 controls the inverter 32 for the balancer motor to output the current corresponding to the calculated balancer torque Tb in reference to the torque-current map stored in the balancer motor control unit 165 to the balancer motor 22 in step S45.

The rotation of the balancer 21 is accelerated, and the resultant reaction force realizes the target tilt of the vehicle.

Simultaneously with the operation in step S45, the control unit 16 commands the drive motor control unit 163 to output the calculated travel drive torque to the drive motor 12 in step S50.

The vehicle is allowed to travel at the target vehicle speed.

Meanwhile, when it is determined that the maximum reaction force Tbmax of the balancer 21 fails to restore the tilt of the vehicle, that is, T1≧Tbmax (N in step S35), the control unit 16 calculates the tilt drive torque (=T1−maximum reaction force Tbmax) for supplementing the insufficiency of the maximum reaction force Tbmax of the balancer 21 in step S60.

The control unit 16 controls the inverter 32 for the balancer motor to output the current corresponding to the maximum value Tbmax to the balancer motor 22 in reference to the torque-current map stored in the balancer motor control unit 165 in step S65.

Simultaneously with the process in step S65, the control unit 16 commands the inverter 31 for the drive motor to output the drive torque obtained by summing the previously calculated travel drive torque and the previously calculated tilt drive torque to the drive motor 12 in step S70.

The target tilt angle of the vehicle is realized by the reaction force of the balancer and the tilt drive torque, allowing the vehicle to travel at the target vehicle speed with the travel drive torque.

If the target tilt angle of the vehicle cannot be realized only by the balancer torque, the reaction force of the balancer 21 and the tilt drive torque are combined to realize the target value.

The control unit 16 realizes the desired tilt angle and the vehicle speed in step S50 or S70. If the traveling is continued (Y in step S55), the process returns to step S5. If the traveling is not continued (N in step S55), the vehicle is stopped to end the routine.

The above-described fifth embodiment provides the following effects.

(1) The stroke of the balancer may be set to the limitless value.

(2) As the gravity center of the balancer is on the rotary shaft, the gravity center of the vehicle does not move accompanied with the drive of the balancer, resulting in easy attitude control.

(3) The wheel is freely rotated after the use of the reaction force, thus preventing generation of unnecessary reaction force.

(4) The use of the wheel distributes the mass around the rotary shaft, resulting in the compact (small) and light-weight balancer.

(5) As the balancer does not have to be maintained against the gravitational force, the energy consumption required for maintaining the balancer may be reduced.

A sixth embodiment will be described in detail referring to FIGS. 23 to 28.

(10) Outline of Sixth Embodiment

The vehicle according to the sixth embodiment is provided with a plurality of balancers each can be separately disposed from the seat unit, freely moved in the longitudinal direction (traveling direction), and independently controlled to maintain the gravity center of the whole vehicle at the predetermined position.

Two or more balancers may be employed. In the embodiment, the vehicle is provided with the first and the second balancers which are able to be rotated independently around the axle of the vehicle.

In the vehicle, the angular acceleration values of the first and the second balancers are calculated as well as the reaction torque required for the attitude control for bringing the seat unit at the predetermined position so as to generate the reaction torque required for the attitude control, and maintain the gravity center of the vehicle at the predetermined position.

The first and the second balancers are connected to the respective drive motors. The vehicle is structured to drive the individual drive motors to control the angular acceleration to the value calculated by those balancers.

The vehicle is allowed to generate the reaction torque required for the attitude control while maintaining the overall gravity center at the predetermined position.

Execution of the attitude control suppresses the tilt of the seat unit both in the traveling and stopped states for maintaining the seat unit on the plumb line.

The pendulum motion of the seat unit upon the movement may be suppressed to improve the stability of the seat unit.

(11) Detailed Description of the Sixth Embodiment

In the fifth embodiment, the balancer is formed as the flywheel. Meanwhile in the sixth embodiment, the balancer is formed as the first and the second balancers. Any other external structure is the same as that of the fifth embodiment. The description referring to FIG. 17 in the fifth embodiment corresponds to the one of the external structure according to the sixth embodiment.

The principle of the attitude control using the first and the second balancers will be described referring to FIGS. 23 and 24.

Figure 23:
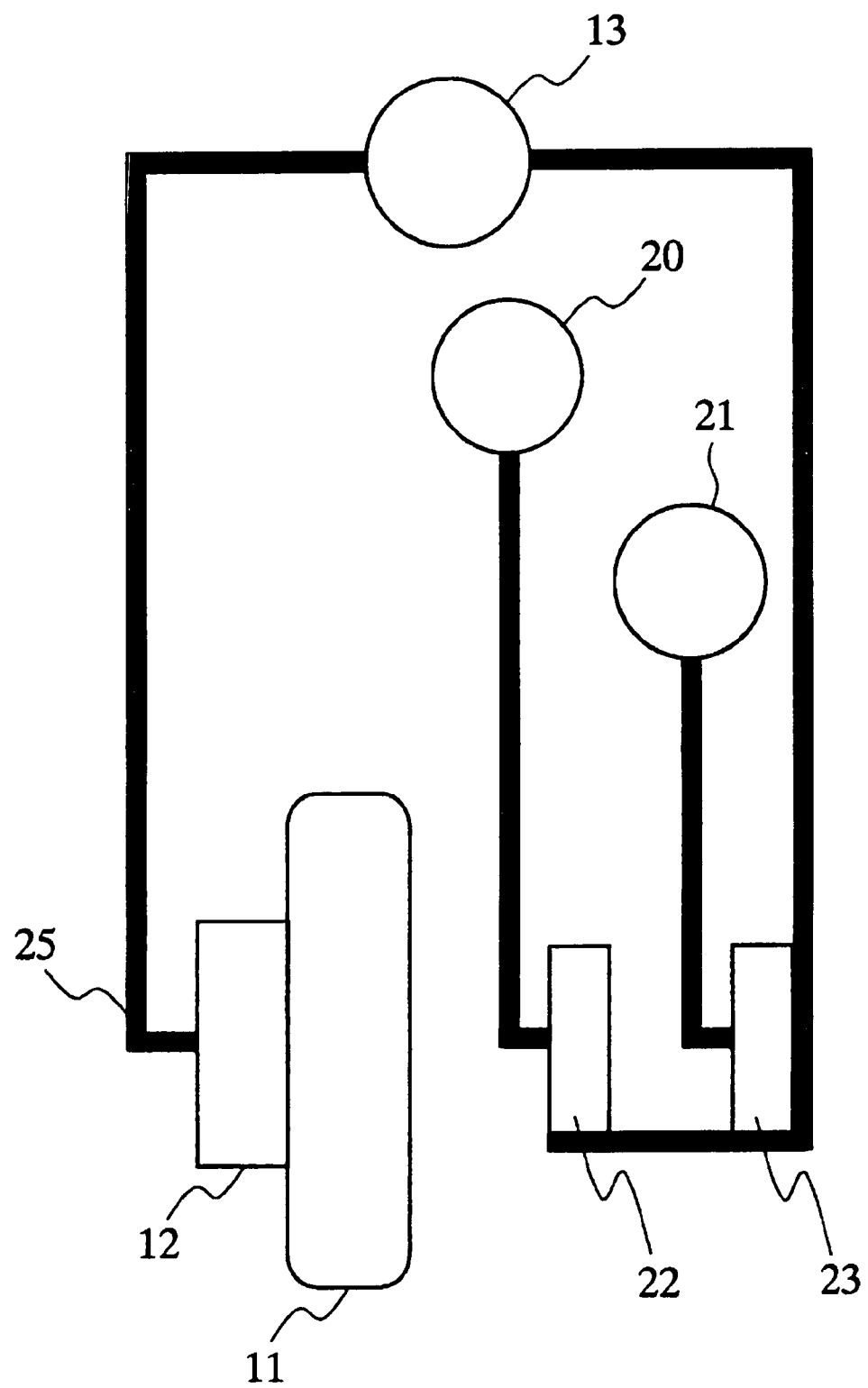
FIG. 23 is an explanatory view showing the principle of the attitude control using the balancer according to a sixth embodiment.

FIG. 23 is a front view of the modeled vehicle seen from the forward direction.

The modeled vehicle is formed of the seat unit 13, the drive motor 12 connected to the seat unit 13 via the frame, the drive wheel 11 driven by the drive motor 12, the first balancer motor 22 connected to the seat unit 13 via the frame, the first balancer 20 driven by the first balancer motor 22, a second balancer motor 23 connected to the seat unit 13 via the frame, and a second balancer 21 driven by the second balancer motor 23. The mass of the frame is not considered herein.

Each rotary shaft of the first and the second balancer motors 22 and 23 is arranged so as to be coaxial with the axle 25.

Each of the first and the second balancers 20 and 21 is structured such that the mass distributes above the rotary shaft, and is bidirectionally rotatable individually by the first and the second balancer motors 22 and 23 within the limited stroke.

The balancer is structured such that the mass distribution becomes asymmetric with respect to the rotary shaft. The gravity center may be moved by rotating the balancer.

Figure 24:
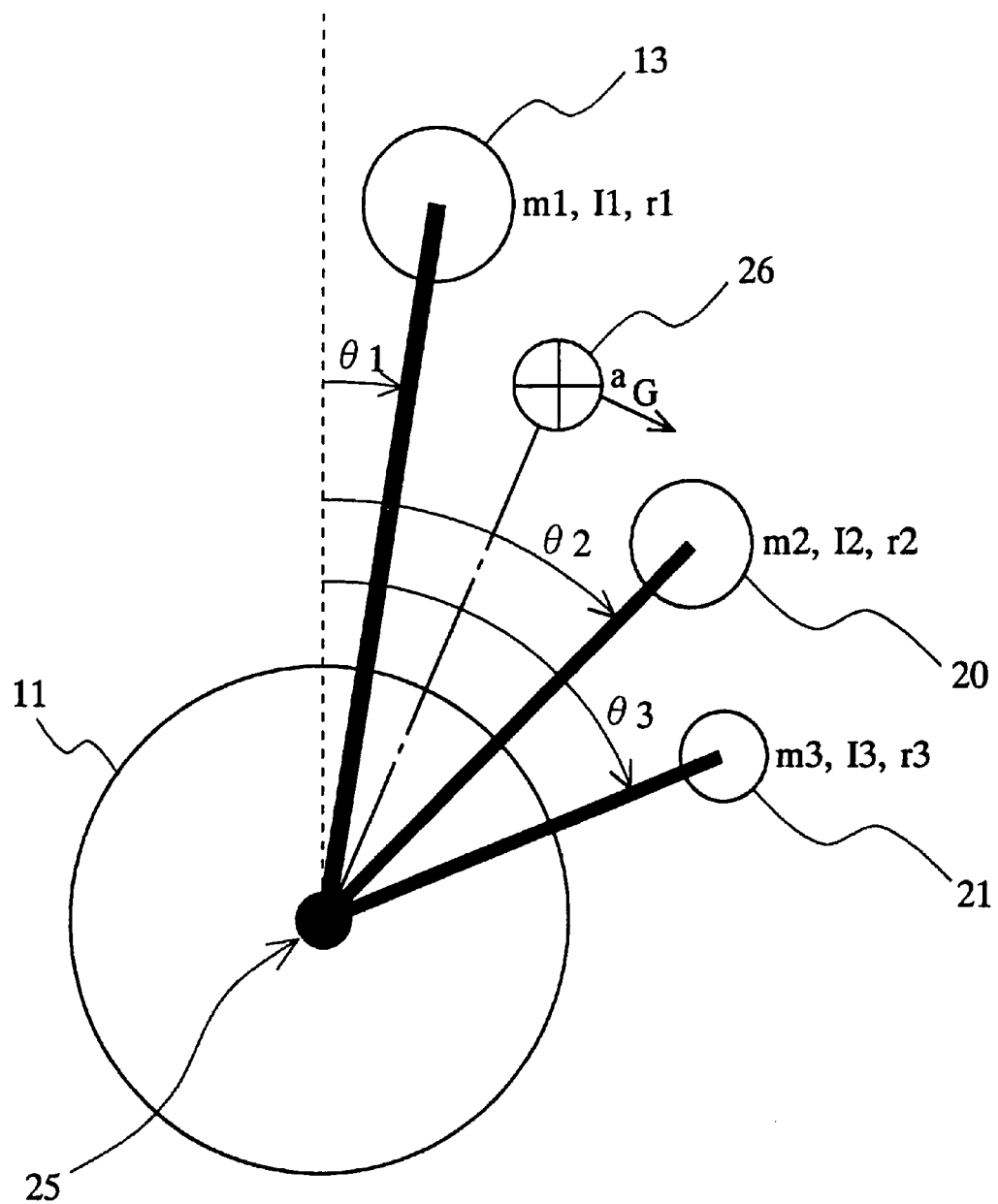
FIG. 24 is an explanatory view showing the principle of the attitude control using the balancer according to the sixth embodiment.

FIG. 24 is a side view of the modeled vehicle shown in FIG. 23 seen from the forward direction.

The first and the second balancer motors 22 and 23 will be omitted for simplification.

FIG. 24 shows the gravity center of the entire vehicle including the driver set as the gravity center 26.

It is assumed that the seat unit 13 has the mass m1, the inertia moment around the gravity center I1, the distance from the gravity center to the support point r1, and the tilt angle of the seat unit from the vertical axis θ1, which may be determined in consideration with the case where the driver is seated on the seat unit 13.

The vehicle functions in measuring the weight of the driver and correcting the values of m1, I1 and r1 to those for the case including the driver.

Alternatively, the normal weight value of the driver may be preliminarily set to fix the calculation value.

In the similar way, it is assumed that the first balancer 20 has the mass m2, the inertia moment around the gravity center I2, the distance from the gravity center to the support point r2, and the tilt angle θ2 in the vertical direction, and the second balancer 21 has the mass m3, the inertia moment around the gravity center I3, the distance from the gravity center to the support point r3, and the tilt angle θ3 in the vertical direction.

In the following formulae, the temporal differentiation is expressed as the code { }. The angular speed ω is the temporal differentiation of the angle θ, and expressed as ω={θ}. The angular acceleration α is the temporal differentiation by the angular speed, and expressed as α={ω}={{θ}}.

In order to establish the angular acceleration α1 to {{θ1}}, that is, α1={{θ1}}, for the attitude control of the seat unit 13, the acceleration conditions of the first and the second balancers 20 and 21 so as not to accelerate the gravity center 26 are obtained.

The angular acceleration α1 is the one upon tilting of the seat unit 13 under the external force, and detected by the gyro sensor 162 to be described later.

In the case where the angular accelerations α2 and α3 are applied to the first and the second balancers 20 and 21, the following formula (1) is established.

In the following formula, the power of a number n is expressed as (^n). The third power of p, for example, may be expressed by p×p×p=(p^3).

$$(I2+m2(r2^2))\alpha 2+(I3+m3(r3^2))\alpha 3=-(I1+m1(r1^2))\alpha 1 \quad (1)$$

The term $(I2+m2(r2^2))\alpha 2$ corresponds to the balancer torque τ2 applied to the first balancer 20 by the first balancer motor 22, and the term $(I3+m3(r3^2))\alpha 3$ corresponds to the balancer torque τ3 applied to the second balancer 21 by the second balancer motor 23.

Meanwhile, the condition where the acceleration aG in the peripheral direction of the gravity center becomes 0 is expressed by the following formula (2).

$$aG=A1\cos(\theta G-\theta 1-\beta 1)+A2\cos(\theta G-\theta 2-\beta 2)+A3\cos(\theta G-\theta 3-\beta 3)=0 \quad (2)$$

where Ai (i=1, 2, 3 . . . ) is a function of αi, and expressed as:

$$Ai=(mi/M)ri\sqrt{((\alpha i^2)+(\omega i^4))}.$$

The codes ωi and M are equal to {θi} and Σmi, respectively. The code Σ denotes the sum of the number i, and the following relationship is established:

$$M=\Sigma mi=m1+m2+m3.$$

The tan θG is defined by the relationship θG=Σmiri sin θi/Σmiri cos θi, and βi is defined as $$\tan \beta i=(\omega i^2)/\alpha i.$$

The code Σ denotes the sum of i, and the code βi is expressed as the function of αi.

When the α2 and α3 are given to establish the formula (2), the acceleration in the peripheral direction of the gravity center aG becomes 0, that is, aG=0. This makes it possible to execute the positional control with respect to the seat unit 13 without moving the overall gravity center in the peripheral direction of the axle.

The terms α2 and α3 for establishing the formulae (1) and (2) are calculated through the numerical analysis to allow the first balance motor 22 to output the balancer torque, that is τ2=(I2+m2(r2^2))α2, and the second balancer motor 23 to output the balancer torque, that is, τ3=(I3+m3(r3^2))α3. This makes it possible to execute the positional control with respect to the seat unit 13 without rotating the gravity center of the entire vehicle in the peripheral direction.

The hardware structure of the vehicle will be described referring to FIG. 25.

Figure 25:
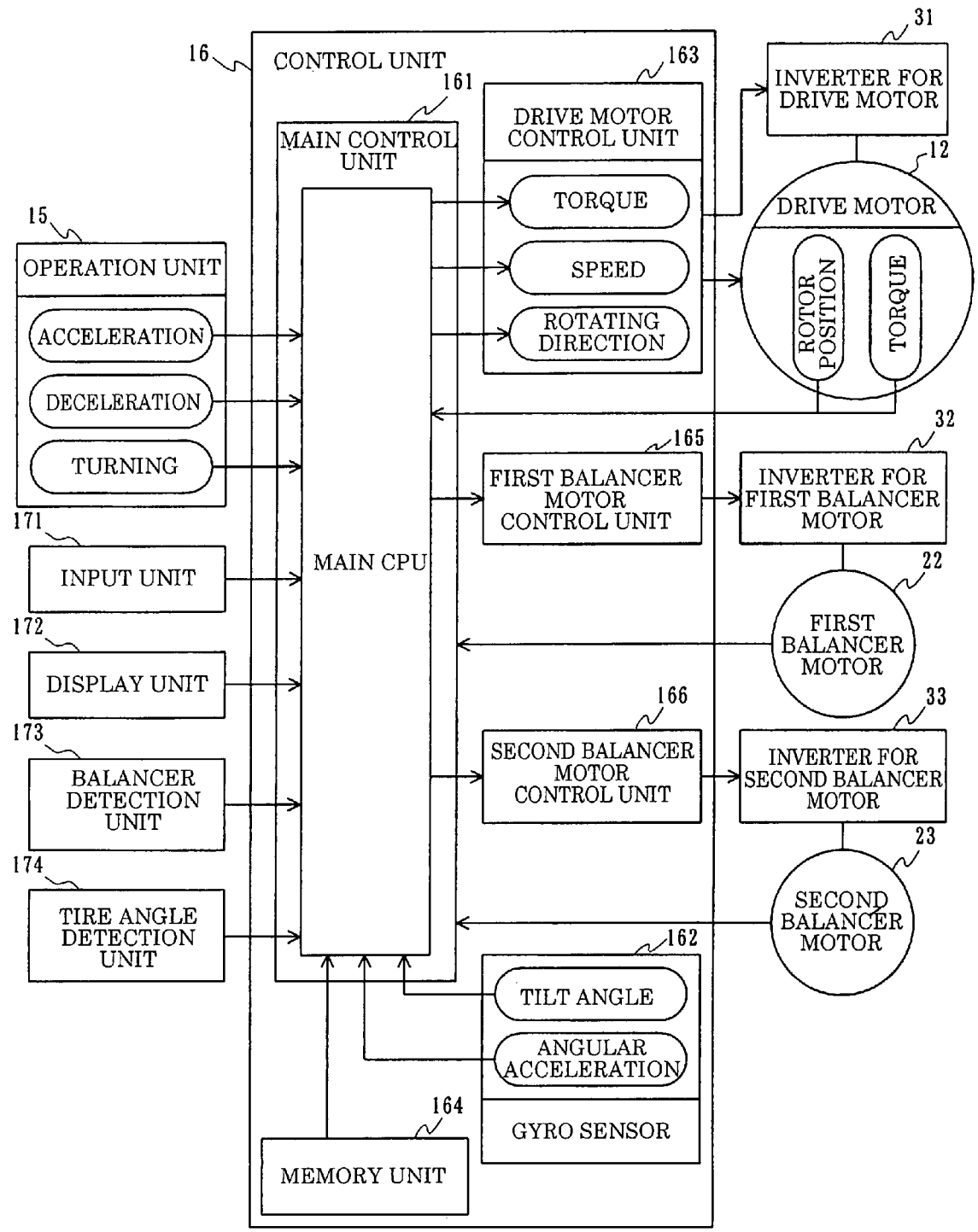
FIG. 25 is an explanatory view showing a hardware structure of the vehicle according to the sixth embodiment.

FIG. 25 shows the structure of the control unit 16.

The control unit 16 is structured to allow the vehicle to perform inverted pendulum traveling under the attitude control with the first and the second balancers 20 and 21.

The respective components of the control unit 16 will be described hereinafter.

The control unit 16 includes a main control unit 161, a gyro sensor 162, a drive motor control unit 163, a first balancer motor control unit 165, a second balancer motor control unit 166, and a memory unit 164.

The control unit 16 is connected to peripheral devices such as the operation unit 15, an input unit 171, a display unit 172, a balancer detection unit 173, a tire angle detection unit 174, an inverter 31 for a drive motor, a drive motor 12, an inverter 32 for a first balancer motor, a first balancer motor 22, an inverter 33 for a second balancer motor, a second balancer motor 23, and a not shown battery.

The main control unit 161 equipped with a main CPU is formed as a computer system including a ROM which contains various programs and data, a RAM used as a working area, an external memory unit, and an interface unit which are not shown.

The ROM stores various programs such as an attitude control program for maintaining the attitude of the inverted pendulum vehicle with the balancers 20 and 21, and a travel control program for controlling the travel based on the various travel commands from the operation unit 15. The main control unit 161 executes the process by performing the aforementioned various programs. Those programs may be stored in the memory unit 164 so as to be read by the main CPU.

The attitude control program is executed by allowing sensors (later described) to detect the tilt angle and tilt angular speed of the vehicle and to calculate the balancer torques $\tau 1$ and $\tau 2$, based on which the drive motor 12, the first balancer motor 22 and the second balancer motor 23 are controlled such that the vehicle travels in accordance with the travel command instructed from the driver.

The gyro sensor 162 serves as the attitude sensor for detecting the attitude of the seat unit 13.

The gyro sensor 162 detects the tilt angle $\theta 1$ and the angular acceleration $\alpha 1$ of the seat unit 13 as the physical value which denotes the tilt of the seat unit 13.

The main control unit 161 is structured to recognize the tilting direction based on the tilt angle $\theta 1$ detected by the gyro sensor 162.

In the embodiment, the gyro sensor 162 detects the angular acceleration $\alpha 1$ and the tilt angle $\theta 1$ so as to be supplied to the main control unit 161. However, it may be structured to detect the angular acceleration only.

In the aforementioned case, the main control unit 161 stores data of the angular acceleration supplied from the gyro sensor 162 to obtain the tilt angle through calculation of the angular acceleration $\alpha 1$ and the angle $\theta 1$.

Besides the gyro sensor 162, various sensors for outputting the signal corresponding to the angular acceleration upon tilting of the seat unit 13, for example, a liquid rotor type angular acceleration meter, an eddy-current type angular acceleration meter may be employed as the attitude sensor.

The liquid rotor type angular acceleration meter detects the motion of the fluid instead of the pendulum of the servo-type acceleration meter to measure the angular acceleration with the feedback current for balancing the motion of the fluid with the servo mechanism. Meanwhile, the angular acceleration meter with the eddy-current includes the magnetic circuit with a permanent magnet. A cylindrical aluminum rotor is provided in the circuit to detect the angular acceleration based on the magnetic electromotive force generated in response to the change in the rotating speed of the rotor.

The drive motor control unit 163 controls the inverter 31 for the drive motor such that the drive motor 12 is controlled.

The drive motor control unit 163 contains the torque-current map for the drive motor 12 to control the inverter 31 for drive motor to output the current corresponding to the drive torque commanded from the main control unit 161 to the drive motor 12 in reference to the torque-current map.

The inverter 31 for the drive motor is connected to the not shown battery such that the direct current supplied from the battery is converted to the alternate current based on the command of the drive motor control unit 163 so as to be supplied to the drive motor 12.

In this way, the main control unit 161, the drive motor control unit 163, the inverter 31 for the drive motor, and the drive motor 12 are operated in cooperation with one another to form the drive wheel drive unit.

The balancer motor control unit 165 controls the inverter 32 for the first balancer motor such that the first balancer motor 22 is controlled.

The first balancer motor control unit 165 contains the torque-current map for the first balancer motor 22 to allow the inverter 32 for the first balancer motor to output the current corresponding to the balancer torque $\tau 1$ commanded from the main control unit 161 to the first balancer motor 22 in reference to the torque-current map.

The inverter 32 for the first balancer motor is connected to the battery as well as the inverter 31 for the drive motor such that the direct current supplied from the battery is converted into the alternate current based on the command of the first balancer motor control unit 165 so as to be supplied to the first balancer motor 22.

The first balancer motor 22 rotates at the commanded angular acceleration in the rotating direction commanded by the first balancer motor control unit 165.

The second balancer motor control unit 166 controls the inverter 33 for the second balancer motor such that the second balancer motor 23 is controlled.

The second balancer motor control unit 166 contains the torque-current map for the second balancer motor 23 to control the inverter 33 for the second balancer motor to output the current corresponding to the balancer torque $\tau 2$ commanded from the main control unit 161 in reference to the torque-current map.

The currents corresponding to the balancer torques $\tau 1$ and $\tau 2$ are supplied to the balancer motors 22 and 23, respectively, such that the balancers 20 and 21 are drive at the angular accelerations $\alpha 2$ and $\alpha 3$. The acceleration in the peripheral direction of the gravity center aG in the formula (2) becomes 0. This makes it possible to control the position of the seat unit 13 without moving the overall gravity center in the peripheral direction of the axle.

The inverter 33 for the second balancer motor is connected to the battery as well as the inverter 31 for the drive motor and the inverter 32 for the first balancer motor such that the direct current supplied from the battery is converted into the alternate current based on the command of the second balancer motor control unit 166 so as to be supplied to the second balancer motor 23.

The second balancer motor 23 rotates at the commanded angular acceleration in the rotating direction commanded by the second balancer motor control unit 166.

The main control unit 161, the first balancer motor control unit 165, the inverter 32 for the first balancer motor, the first balancer motor 22, the first balancer 20, the second balancer motor control unit 166, the inverter 33 for the second balancer motor, the second balancer motor 23, and the second balancer 21 are operated in cooperation with one another for forming the attitude control unit to control the attitude of the vehicle (attitude of the drive operation unit) to the predetermined position.

The memory unit 164 stores not only the programs but also navigation program, and map data for navigation.

The input unit 171 is disposed on the display/operation unit 17 (see FIG. 1), serving as an input device for inputting various data, commanding, and selecting.

The input unit 171 includes a touch panel disposed on the display unit 172, and an exclusive selection button. On the touch panel, the position selected by depressing (touching) various selection button displayed on the display unit 172 performed by the driver is detected. The selected content is obtained based on the depressed position and the displayed content.

The display unit 172 is disposed on the display/operation unit 17. The display unit 172 displays the buttons to be selected or input from the input unit 171, and the descriptions.

The tire angle detection unit 174 may be formed of a resolver, for example, to detect the angle of the drive wheel 11 so as to be supplied to the main control unit 161.

The main control unit 161 differentiates the angle supplied from the tire angle detection unit 174 by time to obtain the angular speed of the drive wheel. The angular speed is further differentiated by time to obtain the angular acceleration.

The main control unit 161 compares the obtained angular acceleration of the drive wheel with the target angular acceleration such that the feedback control is executed with respect to the drive motor control unit 163.

The balancer detection unit 173 detects the tilt angles of the first and the second balancers 20 and 21 so as to be supplied to the main control unit 161.

The first and the second balancers 20 and 21 cannot be rotated over the angle determined by the limited strokes.

After driving the first and the second balancers 20 and 21, the main control unit 161 restores the first and the second balancers 20 and 21 to the predetermined position in the direction opposite the drive direction of the first and the second balancers 20 and 21 at the low rotating speed so as not to influence the attitude control of the vehicle while referring to the detection values of the balancer detection unit 173. The first and the second balancers 20 and 21 are allowed to keep the strokes for the subsequent attitude control.

Figure 26:
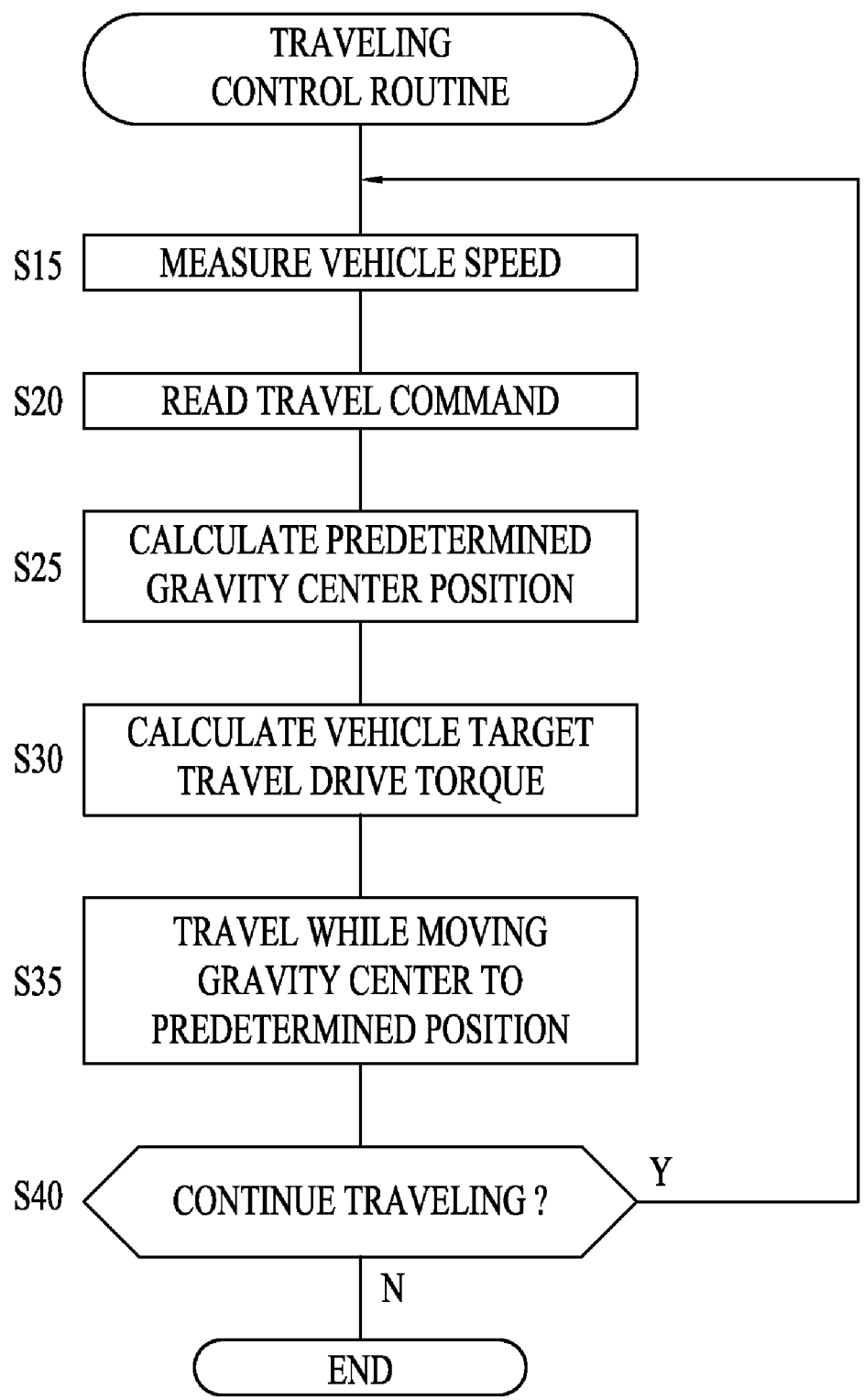
FIG. 26 is a flowchart showing the travel control routine executed in the control unit according to the sixth embodiment.

The travel control routine executed in the control unit 16 will be described referring to the flowchart in FIG. 26.

The control unit 16 measures the vehicle speed from the detection value of the tire angle detection unit 174 in step S15.

The control unit 16 then reads an input (travel command) performed by the driver through the operation unit 15 in step S20. The vehicle speed instructed by the driver is commanded as the travel command.

In step S25, the control unit 16 calculates the position of the vehicle gravity center for allowing the vehicle to travel based on the travel command.

The position of the gravity center may be set by moving the first and the second balancers 20 and 21 while maintaining the seat unit 13 in a vertical position, or by tilting the vehicle in the forward direction. Alternatively, it may be set by combining the aforementioned operations.

The control unit 16 calculates the target value of the travel drive torque to be generated in the drive motor 12 for the traveling at the vehicle speed commanded by the travel command in step S 30.

The control unit 16 rotates the first and the second balancers 20 and 21 to set the predetermined gravity center calculated in step S25 as the one for the entire vehicle. In step S35, the vehicle is started by driving the drive motor 12 with the travel drive torque calculated in step S30.

The control unit 16 determines whether or not the traveling is continued in step S40. If it is determined that the traveling is continued (Y in step S40), the process returns to step S15. If it is determined that the traveling is not continued (N in step S40), the vehicle is stopped and the routine ends.

Figure 27:
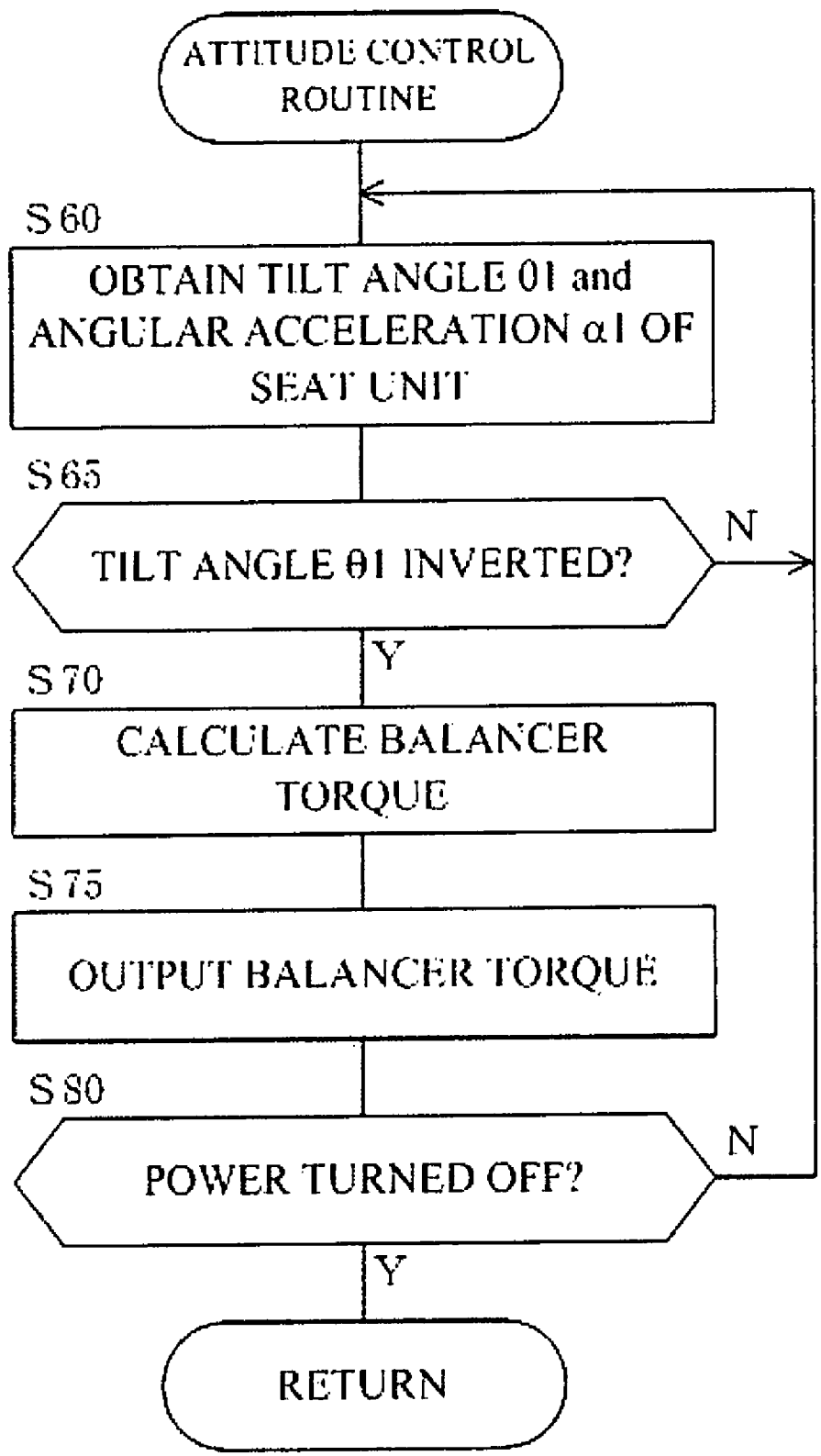
FIG. 27 is a flowchart showing the attitude control routine executed in the control unit according to the sixth embodiment.
Figure 28:
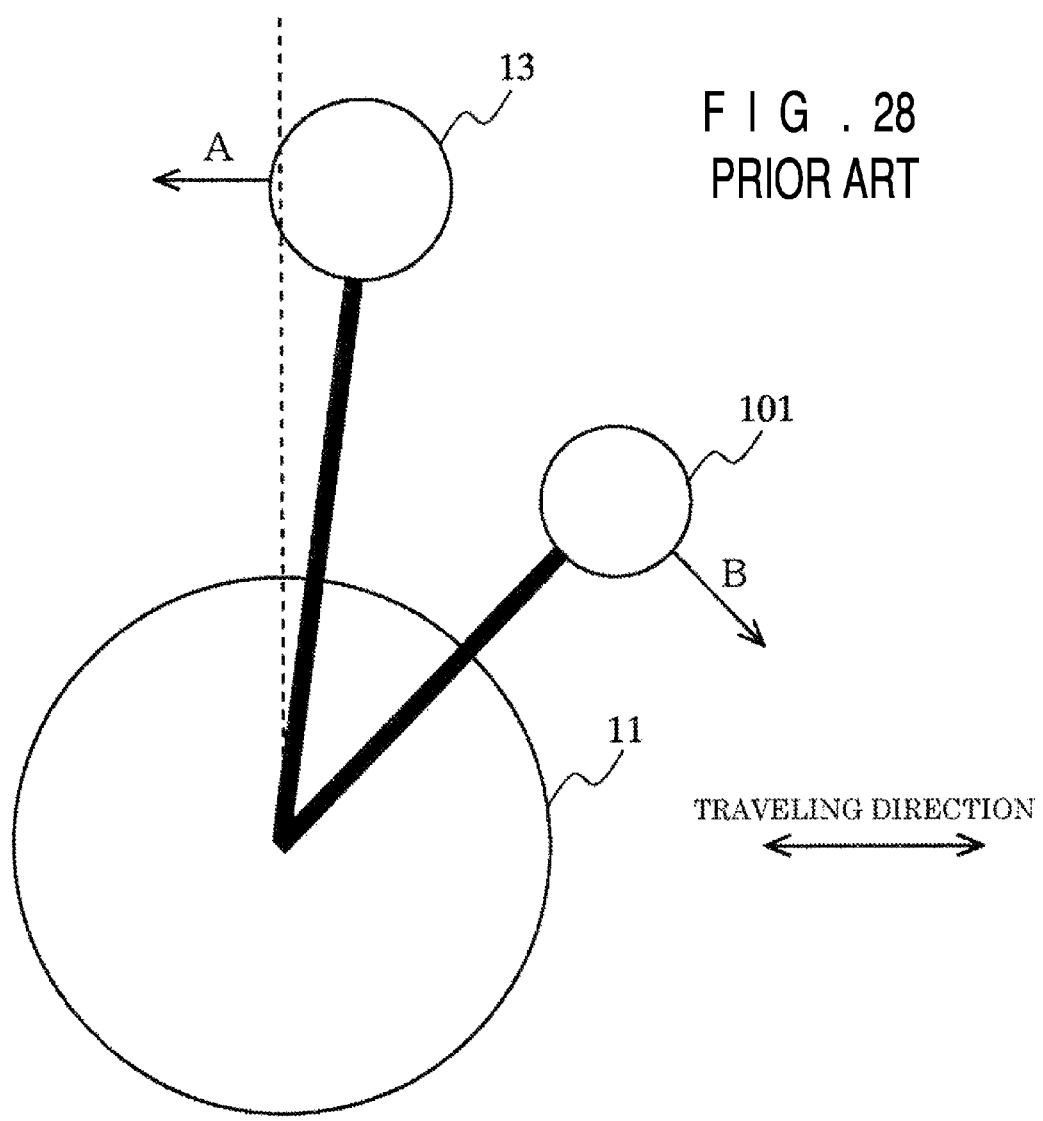
FIG. 28 is an explanatory view showing the attitude control using a generally employed balancer.

The attitude control routine executed in the control unit 16 will be described referring to the flowchart in FIG. 27.

The control unit 16 derives the tilt angle $\theta 1$ and the tilt angular acceleration $\alpha 1$ of the seat unit 13 from the gyro sensor 162 in step S60. It is determined whether or not the tilt angle has been inverted in step S65.

The tilt angle with respect to the predetermined reference line passing the axle of the drive wheels 11a and 11b is detected as the tilt angle $\theta 1$. When the transition of the state between the relationships of tilt angle $\theta 1 > 0$ and tilt angle $\theta 1 < 0$ is detected, it is determined that the tilt angle has been inverted. The change in the state from the tilt angle $\theta 1 = 0$ (stable state) to such relationships of tilt angle $\theta 1 > 0$ and tilt angle $\theta 1 < 0$ may also be considered as the inversion of the tilt angle.

The plumb line passing the axle is set as the reference line in the embodiment. However, the reference line may be tilted at the predetermined angle $\Theta$ from the plumb line. In this case, the state where the seat unit 13 is tilted at the predetermined angle $\Theta$ with respect to the plumb line establishes the relationship of $\theta 1 = 0$. During traveling (in the forward and backward direction), for example, the seat unit is tilted at the predetermined angle $\Theta$ in the traveling direction so as to eliminate the uncomfortable feel. As the vehicle speed increases, the predetermined angle may be increased to set the $\Theta(V)$ as the function of the vehicle speed V.

If the tilt angle has not been inverted (N in step 65), the control unit 16 returns to step S60 where monitoring of the attitude is continued.

Meanwhile, if inversion of the tilt angle is detected (Y in step S65), the control unit 16 assigns the angular acceleration $\alpha 1$ of the seat unit 13 obtained in step S60, and $\theta 2$ and $\theta 3$ detected in the balancer detection unit 173 to the formulae (1) and (2) to calculate the balancer torque $\tau 2$ and $\tau 3$ to be output from the first and the second balancer motors 22 and 23 in step S70.

In more details, the balancer torques $\tau 2$ and $\tau 3$ are functions of the angular accelerations $\alpha 2$ and $\alpha 3$ of the first and the second balancers 20 and 21. The control unit 16 obtains those angular accelerations through the formulae (1) and (2), which will be used for calculating the balancer torques $\tau 2$ and $\tau 3$. In this way, the control unit 16 functions as the angle acceleration calculation unit.

The parameters such as mi, Ii, and ri are preliminarily stored in the memory unit 164.

The measurement device, for example, the scale is provided on the seat unit 13 such that the control unit 16 corrects the parameters mi, Ii, and ri of the seat unit 13 using the output value of the measurement device, for example, the driver's weight.

The control unit 16 commands the first and the second balancer motor control units 165 and 166 to output the calculated balancer torques $\tau 1$ and $\tau 2$.

The first and the second balancer motor control units 165 and 166 control the inverters 32 and 33 for the first and the second balancer motors to allow the first and the second balancer motors 22 and 23 to output the balancer torques $\tau 1$ and $\tau 2$, respectively in step S75.

The attitude of the seat unit 13 may be controlled while maintaining the gravity center of the entire vehicle at the predetermined value calculated in step S25.

In the case where the seat unit 13 is tilted under the external force by the angle θ1 with respect to the reference line in the vehicle traveling direction, the first and the second balancers 20 and 21 are rotated to restore the seat unit 13 toward the reference line (direction opposite the one downward tilting direction under the external force) without moving the gravity center of the entire vehicle.

The control unit 16 determines whether or not the power has been turned OFF in step S80. If the power has been turned OFF (Y), the routine ends. If the power has not been turned OFF (N), the process returns to step S60 where the attitude control is continued.

The seat unit 13 restored toward the reference line is tilted in the direction opposite the previous direction over the reference line. However, the process returns to step S60 where the determination is made that the tilt angle has been inverted at the time point when the seat unit passes over the reference line (Y in step S65). The attitude control toward the reference line is executed again.

In a similar way, the balancers 20 and 21 are rotated with the balancer torques τ1 and τ2 corresponding to the angular acceleration α1 obtained when the inversion of the tilt angle of the seat unit 13 with respect to the reference line is detected. Then the operation for returning the seat unit 13 toward the reference line with the reaction force generated by moving the balancer 21 will be repeatedly performed. The aforementioned swinging motion of the seat unit 13 allows the maximum tilt angle θ1 with respect to the reference line to be gradually converged to 0 so as to restore the attitude in the normal state.

The following effects may be obtained by the sixth embodiment as described above.

(1) As the reaction torques of a plurality of the balancers are combined, the attitude control of the reaction torque type may be executed without moving the gravity center of the entire vehicle.

(2) As the reaction torque may be generated without moving the gravity center so as to simplify the attitude control.

(3) The stability of the driver is enhanced, thus further improving the comfort for the driver.

(4) The tilt of the driver in the traveling or stopped state of the vehicle in the traveling direction may be suppressed for improving the comfort for the driver.

The embodiments of the vehicle according to the invention have been described. The invention is not limited to those described above, but may be modified into various forms without departing from the scope of the invention.

For example, in the embodiments as described above, the rotary shaft of the balancer motor 181 is disposed on the parallel axis on the plumb line of the drive shaft 11 for the purpose of rotating the balancer gear. The rotary shaft of the balancer motor 181 may be disposed on the axis which orthogonally crosses the rotary shaft of the balancer gear 184 so as to be rotated by the worm gear.

In the aforementioned embodiments, the balancer gear serves as the external gear. However, it may serve as the internal gear.

Various transfer mechanisms, for example, belt in addition to the gear may be employed as the mechanism for transferring the torque generated in the balancer motor 181 to the balancer B.

The direction for moving the balancer 182 is set to the rotating direction around the rotary shaft 111 of the drive wheel 11. The balancer 182 may be structured to reciprocably move in parallel with the control unit 16.

In the aforementioned case, as shown in FIGS. 29 and 30 of Japanese Patent Application Publication No. JP-A-2004-129435, the balancer drive unit 18 is provided to move the balancer using the linear motor.

As shown in FIG. 13 of Japanese Unexamined Patent Application Publication No. 2004-276727, the balancer may be axially moved by the rotation of the screw shaft attached to the rotary shaft of the motor.

In the aforementioned embodiments, under the attitude control, the torque T1 derived from the tilt angular acceleration {θ} of the occupant A is balanced by the reaction force −T2 of the movement torque T2 of the balancer B for maintaining the vehicle attitude in the steady state.

However, the attitude control may be executed with the torque T3 derived from the movement torque T2 of the balancer B and the drive of the wheel drive motor 12 for balancing the torque T1 caused by the tilt of the occupant A.

If the attitude control cannot be executed by merely moving the balancer B, for example, the torque T1 for generating the angular acceleration {θ} of the occupant A is larger than the maximum output torque T2 of the balancer B, the attitude control is executed by driving the wheel drive motor 12 such that the drive wheel 11 is driven.

Specifically, if the vehicle is stopped, the torque T3 is generated by driving the wheel drive motor 12 such that the vehicle moves in the tilting direction of the occupant A. The total torque of the resultant reaction force −T3 and the reaction force −T2 owing to the movement of the balancer B, that is, −(T2+T3) is used for balancing the torque generated by the tilt of the occupant A.

In the steady travel state of the vehicle, if the vehicle tilts forward (θ>0), the wheel drive motor 12 is controlled to accelerate by the torque T3 generated by the wheel drive motor 12.

Meanwhile, if the vehicle tilts backward (θ<0), the wheel drive motor 12 is controlled to decelerate by the torque T3.

In this way, the insufficiency of the torque caused by moving the balancer B may be compensated with the drive torque T3 generated by the wheel drive motor 12 for coping with the tilt of the occupant A caused by the large torque.

In the embodiments, the balancer 182 is separately provided. However, the balancer motor 181 may be used as the balancer.

In this case, the balancer motor 181 is structured to reciprocally move on the arc around the rotary shaft of the drive wheel 11 or to reciprocally move on the horizontal plane.

Both the balancer motor 181 and the balancer 182 may be structured to be movable. In the aforementioned case, the balancer motor 181 and the balancer 182 may be integrally moved. Alternatively, only the balancer 182 is movable in the normal state, and the balancer motor is moved only when the torque equal to or larger than the predetermined value is required, or vice versa.

Instead of individually providing the balancer 182, the on-board device may be employed or added to the balancer 182.

For example, the battery 160 may be used as the balancer, or the control unit including the battery 160 may be used as the balancer.

In the embodiment, the attitude control is executed to control the attitude on the plumb line as the reference line. For example, under the attitude control described referring to FIG. 5, the attitude is controlled such that the tilt angle θ with respect to the plumb line becomes 0.

Meanwhile, the reference line set for the attitude control may be tilted from the plumb line at the predetermined angle Θ.

For example, during traveling of the vehicle (traveling forward and marching are included), the reference line may be tilted in the traveling direction at the predetermined angle Θ to eliminate the discomfort felt by the driver.

The function of the vehicle speed V of the Θ(V) may be defined by increasing the angle Θ as the vehicle speed becomes higher.

In the aforementioned case, it is determined whether or not the tilt angle θ has been inverted in reference to the angle tilted in the traveling direction from the plumb line at Θ in step S51 of FIG. 5.

In this case, the transition from the stable state of the tilt angle θ=0 (tilted at Θ from the plumb line) to the state of the tilt angle θ>0 or θ<0 may be considered as the inversion of the tilt angle θ.

In the embodiments described referring to FIGS. 1 and 6, the balancer drive unit 18 or the balancer 182 (hereinafter referred to as the balancer 18 and the like) is disposed below the seat unit 13. It may be placed at the arbitrary position.

In this case, the balancer drive unit may be disposed such that the balancer gravity center is higher than the gravity center of the occupant.

For example, the balancer 18 and the like may be installed inside the armrest attached to the seat unit 13.

The balancer and the like may be installed inside the side surface of the vehicle (at least one side) of the door portion for covering the seat unit of the main body which covers the vehicle according to the embodiment.

The balancer 18 and the like may further be installed in a roof portion disposed above the vehicle.

In the respective cases, the balancer 182 may be driven by either rotating motion or linear motion.

As the balancer 182 is disposed such that the gravity center of the balancer is higher than that of the occupant, the angular acceleration (rotary motion) and the acceleration (linear motion) for driving the balancer may be reduced to the value smaller than that of the embodiment as described above. This makes it possible to reduce the size of the balancer motor.

In the aforementioned embodiment, the balancer 182 is rotated around the predetermined shaft on the plane orthogonal to the horizontal plane and in parallel with the traveling direction. The balancer 182 may be rotated around the predetermined shaft in the horizontal plane.

Specifically, the balancer 182 is disposed at the lower portion of the control unit 16 so as to be rotated in the horizontal plane around the predetermined position as substantially the center of the seating surface 131 as the rotary shaft.

In addition, the balancer 182 which rotates in the horizontal plane around the predetermined rotary shaft as substantially the center of the roof of the vehicle may be disposed on the horizontal plane of the roof.

As the balancer 182 is rotated on the horizontal plane, the space within the vehicle may be efficiently used.

Under the attitude control in the embodiment, the balancer 182 is moved in the tilting direction when the inversion of the tilt angle θ is detected in step S51 (FIGS. 5, 8 and 10).

However, the balancer 182 may be moved to the opposite side (the side opposite the θ1) at the angle θ1 just before establishment of the relationship of θ=0.

The angle θ1 is determined depending on the angular acceleration {θz} of the balancer when passing the reference line of θ=0 (plumb line or the line tilted from the plumb line at Θ) in the case where the balancer 182 is not moved to the opposite side.

In the aforementioned case, the angle θ1 is increased as the angular acceleration {θz} becomes higher.

This makes it possible to restore the attitude onto the reference line further earlier.

In the embodiment, when the tilt angle θ=0 is changed to θ≠0, it is determined that the tilt angle has been inverted in step S51.

However, when the tilt angle θ of the seat unit (occupant A) exceeds the predetermined allowable angle θa, that is, θ>θa, it may be determined that the tilt angle has been inverted such that the attitude control is executed.

In the aforementioned case, the angular acceleration {θ1} of the occupant A for calculating the torque T1 from the formula (1) is set to the one obtained when the relationship θ>θa is established. However, the angular acceleration obtained when the relationship θ≠0 is established may be used.

In the second and the third embodiments, no specific threshold value for the adjustment torque T3 generated by the drive motor 12 is set.

All the drive torque output from the drive motor 12 is not used for rotating the drive wheel 11, but partially used for the road surface resistance (rolling resistance) and deformation of the tire (rubber). Therefore, the drive wheel 11 is not started immediately upon driving of the drive motor 12.

In the case where the torque T1 generated by moving the occupant A is smaller than a first threshold value corresponding to the starting torque value with which the driving of the drive wheel 11 starts from the stopped state, the attitude control may be executed by establishing the relationship, that is, of the adjustment torque T3 generated by the drive motor 12>T1 (<first threshold value).

In the aforementioned case, if the torque T1 is equal to or larger than the first threshold value and smaller than a second threshold value, the adjustment torque T3 generated by the drive motor 12 is set to the predetermined value smaller than the first threshold value, and the torque T2 generated by moving the balancer B is set to the value T1−first threshold value.

The second threshold value is smaller than Tmax+first threshold value.

If the torque T1 is equal to or larger than the second threshold value, the adjustment torque T3 generated by the drive motor 12 is set to establish the relationship of T3>T1−T2max where the torque T2 by moving the balancer B denotes Tmax.

In the modified example, if the torque T1 is smaller than the first threshold value, the attitude control may be executed without moving the vehicle (in the stopped state) and changing the traveling speed (in the traveling state).

In addition, as the balancer B is not moved, the position of the balancer B is maintained at the predetermined position, for example, on the plumb line against application of substantially large external force.

In the embodiment, the motor for the stability control (attitude control) may be selectively used depending on the load and efficiency of the balancer drive motor and the wheel drive motor in the traveling state.

For example, in the stopped state of the vehicle, the balancer motor may be preferentially used. Meanwhile, in the traveling state of the vehicle, the drive motor is preferentially used.

The cases where the torque T1 is equal to or larger than T2max, and the torque of the balancer B establishes the relationship of T2=T2max have been described. When the torque T2 is smaller than T2max, the torque T1 may be replaced with the torque T2 and the adjustment torque T3 at the predetermined ratio.

The fifth embodiment may be modified as follows.

For example, the axle 25 is not necessarily arranged coaxially with the rotary shaft of the balancer 21. However, the attitude control process may be simplified by coaxially arranging the rotary shaft of the balancer 21 with the axle 25.

As long as the rotary shaft of the balancer 21 is not orthogonally arranged to the axle 25, they are not necessarily in parallel with each other. If the rotary shaft of the balancer 21 is in parallel with the axle 25, the effect of the reaction force may be enhanced.

The sixth embodiment may be modified as follows.

For example, any one of the first and the second balancers 20 and 21 may be formed into the flywheel. This allows the balancer movement to be released from limitation by the stroke.

Note that in the case where both the first and the second balancers 20 and 21 are formed into the flywheels, the gravity center of the entire vehicle cannot be controlled even if those balancers are driven. Accordingly, at least one of the balancers is required to have an asymmetrical shape with respect to the portion around the rotary shaft.

In the sixth embodiment, there is no specific distinction between the first and the second balancers 20 and 21. However, one of those balancers may be set as the gravity center balancer for generating the reaction torque, and the other may be set as the counter balancer for maintaining the gravity center.

In the aforementioned case, parameters effective for performing the respective functions may be set, for example, making the inertia moment of the gravity center balancer larger than that of the counter balancer.

In the embodiment, the rotary shafts of the first and the second balancers 20 and 21 are coaxially arranged with the axle 25. However, they are not necessarily coaxially arranged.

In the sixth embodiment, the formula (2) is used to calculate α2 and α3 under the attitude control. However, they may be approximated using the following formula (3).

Specifically, in the case where the vehicle is positioned substantially on the plumb line, each value of θ1, θ2, θ3, ω1, ω2 and ω3 becomes substantially 0. The formula (2), thus may be approximated to the formula (3).

The use of the formula (3) allows easy calculation of the α2 and α3.

$$aG = m1r1\alpha1/M + m2r2\alpha2/M + m3r3\alpha3/M \quad (3)$$

The vehicle according to the embodiment may have the following structures.

(1) Structure A

The vehicle includes:
drive wheels coaxially arranged;
a seat unit;
an attitude sensor for detecting a physical value based on a tilt of the seat unit;
a balancer movably arranged with respect to the seat unit;
a drive control unit for controlling to drive the drive wheels in accordance with a drive command from an occupant and an adjustment torque value; and
an attitude control unit for executing an attitude control of the seat unit in accordance with the detected physical value of the seat unit by:
  supplying a first adjustment torque value of the drive wheel required for the attitude control to the drive control unit when the physical value is smaller than a first threshold value;
  moving the balancer to a direction where the seat unit tilts so as to generate a reaction torque corresponding to the physical value when the physical value is equal to or larger than the first threshold value and equal to or smaller than a second threshold value; and
  moving the balancer to the direction where the seat unit tilts so as to generate the reaction torque corresponding to the second threshold value, and supplying the second adjustment torque of the drive wheels required for the attitude control to the drive control unit when the physical value is larger than the second threshold value.

(2) Structure B

In the vehicle having the structure A, the first threshold value is the physical value corresponding to the starting torque value for the drive wheels in the stopped state to start driving.

What is claimed is:

1. A vehicle comprising:
a drive wheel arranged on a shaft:
a seat unit;
an attitude sensor for detecting angular acceleration of the seat unit based on a tilt of the seat unit;
a balancer movably arranged with respect to the seat unit;
a drive control unit for controlling to drive the drive wheel in accordance with a drive command from an occupant;
an attitude control unit for executing an attitude control of the seat unit by moving the balancer in a direction where the seat unit tilts; and
a main controller for calculating a torque T1 required for tilting the seat unit at the detected angular acceleration and a torque T2 required for moving the balancer forward, for comparing T1 with T2max, T2max being the maximum value of the torque which can be generated by moving the balancer, and for outputting commands to the drive control unit and the attitude control unit based on the results of the comparison;
wherein:
when the calculated torque T1 exceeds T2max, responsive to a command for T2max from the main controller, the attitude control unit moves the balancer to generate a reaction torque corresponding to T2max, and the main controller supplies an adjustment torque value T3 for the drive wheel, required for the attitude control, to the drive control unit, wherein T3>(T1−T2max);
when the calculated torque T1 is equal to or smaller than T2max, the attitude control unit, responsive to a command for T2 from the main controller, moves the balancer to generate a reaction torque corresponding to T2; and the drive control unit controls the drive wheel to be driven in accordance with the drive command and the adjustment torque value T3.

2. The vehicle according to claim 1, further comprising a balancer motor for moving the balancer, wherein the attitude control unit causes the balancer motor to move the balancer in a direction which tilts the seat unit.

3. The vehicle according to claim 2, wherein the attitude control unit causes the balancer motor and the balancer to be moved in a direction which tilts the seat unit.

4. The vehicle according to claim 3, wherein the balancer is a power source for supplying power to the balancer motor.

5. The vehicle according to claim 1 having drive wheels totaling two in number, wherein the two drive wheels are mounted on opposing ends of a single axle.

* * * * *